(12) United States Patent
Pilmore et al.

(10) Patent No.: US 11,593,291 B2
(45) Date of Patent: Feb. 28, 2023

(54) METHODS AND APPARATUS FOR HIGH-SPEED DATA BUS CONNECTION AND FABRIC MANAGEMENT

(71) Applicant: GigaIO Networks, Inc., Carlsbad, CA (US)

(72) Inventors: Eric Pilmore, San Diego, CA (US); Doug Meyer, El Cajon, CA (US); Michael Haworth, Lake Elsinore, CA (US); Scott Taylor, Cardiff (CA); Jerry Coffin, Poway, CA (US); Eric Badger, Carlsbad, CA (US)

(73) Assignee: GigaIO Networks, Inc., Carlsbad, CA (US)

( * ) Notice: Subject to any disclaimer, the term of this patent is extended or adjusted under 35 U.S.C. 154(b) by 0 days.

(21) Appl. No.: 16/566,829

(22) Filed: Sep. 10, 2019

(65) Prior Publication Data

US 2020/0081858 A1 Mar. 12, 2020

Related U.S. Application Data

(60) Provisional application No. 62/729,251, filed on Sep. 10, 2018.

(51) Int. Cl.
*G06F 13/00* (2006.01)
*G06F 13/40* (2006.01)

(52) U.S. Cl.
CPC ...... *G06F 13/4022* (2013.01); *G06F 13/4063* (2013.01)

(58) Field of Classification Search
CPC ... G06F 13/00; G06F 13/4022; G06F 13/4063
See application file for complete search history.

(56) References Cited

U.S. PATENT DOCUMENTS 6,721,316 B1 4/2004 Epps et al.
8,037,345 B1 10/2011 Iyer et al.
(Continued)

FOREIGN PATENT DOCUMENTS

CN 100401709 C 7/2008
CN 102196503 A 9/2011
(Continued)

OTHER PUBLICATIONS

University of Oslo, Department of Informatics, "PCIe Device Lending Using Non-Transparent Bridges to Share Devices" by Lars Bjorlykke Kristiansen, Master's Thesis Spring 2015, 96 pages.
(Continued)

*Primary Examiner* — Henry Tsai
*Assistant Examiner* — Kim T Huynh
(74) *Attorney, Agent, or Firm* — Patent Beach PC

(57) ABSTRACT

Methods and apparatus for efficient scaling of fabric architectures such as those based on PCIe technology, including up to very large fabrics and numbers of hosts/devices for use in ultra-high performance applications such as for example data centers and computing clusters. In one aspect, methods and apparatus for using Non-Transparent Bridge (NTB) technology to export Message Signaled Interrupts (MSIs) to external hosts are described. In a further aspect, an IO Virtual Address (IOVA) space is created is used as a method of sharing an address space between hosts, including across the foregoing NTB(s). Additionally, a Fabric Manager (FM) entity is disclosed and utilized for programming e.g., PCIe switch hardware to effect a desired host/fabric configuration.

7 Claims, 49 Drawing Sheets

(56) References Cited

U.S. PATENT DOCUMENTS

| | | | |
|---|---|---|---|
| 8,271,996 B1 | 9/2012 | Gould et al. | |
| 8,463,934 B2 | 6/2013 | Maitra | |
| 8,868,777 B2 | 10/2014 | Maitra | |
| 8,949,483 B1 | 2/2015 | Martin | |
| 9,152,597 B2 | 10/2015 | Maitra | |
| 9,223,737 B1* | 12/2015 | Serebrin | G06F 13/404 |
| 9,448,957 B2 | 9/2016 | Maitra | |
| 9,450,780 B2 | 9/2016 | Wang et al. | |
| 9,626,324 B2* | 4/2017 | Chawla | G06F 13/4027 709/221 |
| 10,756,816 B1 | 8/2020 | Dreier | |
| 10,887,238 B2 | 1/2021 | Ramey et al. | |
| 2001/0026546 A1 | 10/2001 | Schieder et al. | |
| 2002/0012356 A1 | 1/2002 | Li et al. | |
| 2003/0105826 A1 | 6/2003 | Mayraz | |
| 2004/0090919 A1 | 5/2004 | Callon et al. | |
| 2004/0095883 A1 | 5/2004 | Chu et al. | |
| 2004/0125804 A1 | 7/2004 | Lee | |
| 2006/0174251 A1 | 8/2006 | Pope et al. | |
| 2006/0239287 A1* | 10/2006 | Johnsen | H04L 45/566 370/412 |
| 2006/0282603 A1 | 12/2006 | Onufryk et al. | |
| 2006/0288129 A1 | 12/2006 | Pope et al. | |
| 2008/0010648 A1 | 1/2008 | Ando et al. | |
| 2008/0092148 A1 | 4/2008 | Moertl et al. | |
| 2008/0186917 A1 | 8/2008 | Wu et al. | |
| 2009/0077277 A1 | 3/2009 | Vidal et al. | |
| 2009/0125666 A1 | 5/2009 | Freking et al. | |
| 2009/0240874 A1 | 9/2009 | Pong | |
| 2009/0248947 A1* | 10/2009 | Malwankar | G06F 13/4022 710/316 |
| 2010/0064079 A1* | 3/2010 | Harvey | G06F 3/0227 710/73 |
| 2011/0202701 A1* | 8/2011 | Maitra | H04L 49/35 710/316 |
| 2012/0033680 A1 | 2/2012 | Gopinath et al. | |
| 2012/0281536 A1 | 11/2012 | Gell et al. | |
| 2013/0212165 A1 | 8/2013 | Vermeulen et al. | |
| 2013/0290967 A1 | 10/2013 | Calciu et al. | |
| 2014/0181454 A1 | 6/2014 | Manula et al. | |
| 2014/0237156 A1* | 8/2014 | Regula | G06F 13/4027 710/314 |
| 2014/0344947 A1* | 11/2014 | Kalyanasundharam | G06F 21/62 726/26 |
| 2014/0372657 A1* | 12/2014 | Jones | G06F 13/4027 710/313 |
| 2015/0026384 A1 | 1/2015 | Maitra | |
| 2015/0143016 A1* | 5/2015 | Egi | G06F 13/24 710/313 |
| 2015/0222705 A1* | 8/2015 | Stephens | G06F 3/0611 709/214 |
| 2015/0261709 A1* | 9/2015 | Billi | G06F 13/404 710/316 |
| 2017/0070363 A1 | 3/2017 | Watkins et al. | |
| 2018/0095914 A1 | 4/2018 | Kondiles et al. | |
| 2018/0247187 A1 | 8/2018 | Chung et al. | |
| 2018/0341619 A1* | 11/2018 | Slik | G06F 3/067 |
| 2019/0163378 A1 | 5/2019 | Carlough et al. | |
| 2020/0117676 A1 | 4/2020 | Ben Moshe et al. | |
| 2020/0117844 A1 | 4/2020 | Choi et al. | |
| 2020/0310994 A1 | 10/2020 | Chofleming et al. | |
| 2021/0073158 A1 | 3/2021 | Badger | |
| 2021/0075745 A1 | 3/2021 | Badger | |
| 2021/0103535 A1 | 4/2021 | Badger | |
| 2021/0124706 A1 | 4/2021 | Meyer | |

FOREIGN PATENT DOCUMENTS

| | | |
|---|---|---|
| CN | 103353851 A | 10/2013 |
| CN | 106850803 A | 6/2017 |
| CN | 112579263 A | 3/2021 |
| EP | 3850493 A1 | 7/2021 |
| JP | 3809674 B2 | 8/2006 |
| WO | WO-2008157470 A1 | 12/2008 |

OTHER PUBLICATIONS

Buntinas D., et al., "Implementation and Evaluation of Shared-Memory Communication and Synchronization Operations in MPICH2 using the Nemesis Communication Subsystem," Parallel Computing, Jun. 2007, pp. 1-17. URL: <url: https://www.mcs.anl.gov/uploads/cels/papers/P1346A.pdf</url: <a>.

Dittia Z., et al., "DMA Mechanisms for High Performance Network Interfaces," 2007, [Retrieved from Internet] (URL:https://www.semanticscholar.org/paper/DMA-Mechanisms-for-High-Performance-Network-Dittia-Cox/23fae6a2d6ce3ce922fc8571e0ada0519ffe8057).

PCI Express Base Specification Version 1.0a, 2003.
PCI Express Base Specification Version 1.1 dated Mar. 8, 2005.
PCI Express Base Specification Version 2.0 dated Dec. 20, 2006.
PCI Express Base Specification Version 2.1 dated Mar. 4, 2009.
PCI Express Base Specification Version 3.0 dated Oct. 23, 2014.
PCI Express Base Specification Version 3.1 dated Dec. 7, 2015.
PCI Express Base Specification Version 5.0 dated Jun. 5, 2018.
PCI Express Base Specification Revision 4.0 dated Oct. 5, 2017.

Shipman G. M., et al., "Investigations on InfiniBand: Efficient Network Buffer Utilization at Scale," Investigations on InfiniBand, 2007, pp. 178-186. URL: <url: http://citeseerx.ist.psu.edu/viewdoc/download?doi=10.1.1.89.3001&rep=rep1&type=pdf</url: <a>.

Yu, W., et al., "Adaptive Connection Management for Scalable MPI over InfiniBand," IEEE Xplore, Jun. 2006, pp. 1-10. URL: <url: https://ieeexplore.ieee.org/document/1639338</url: <a>.

Tu, Cheng-Chun, et al., "Marlin: A Memory-Based Rack Area Network", Oct. 20-21, 2014, published in: 2014 ACM/IEEE Symposium on Architectures for Networking and Communications Systems (ANCS).

* cited by examiner

METHODS AND APPARATUS FOR HIGH-SPEED DATA BUS CONNECTION AND FABRIC MANAGEMENT

PRIORITY AND RELATED APPLICATIONS

This application claims priority to U.S. Provisional Patent Application Ser. No. 62/729,251 filed Sep. 10, 2018 and entitled "METHODS AND APPARATUS FOR HIGH-SPEED DATA BUS CONNECTION AND FABRIC MANAGEMENT" which is incorporated herein by reference in its entirety.

This application is also generally related to the subject matter of U.S. Provisional Patent Application Ser. No. 62/898,489 filed contemporaneously herewith on Sep. 10, 2019 and entitled "METHODS AND APPARATUS FOR NETWORK INTERFACE FABRIC SEND/RECEIVE OPERATIONS" which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data buses, interconnects and networking and specifically, in one or more exemplary embodiments, to methods and apparatus for providing interconnection and data routing within fabrics comprising multiple host devices.

2. Description of Related Technology

Existing PCI/PCIe Topology—

FIG. 1 illustrates a typical prior art PCIe—based architecture 100, wherein a parallel bus approach is utilized. Generally speaking, PCIe buses have a tree topology with fan-out capabilities at each interior node. As shown in FIG. 1, the <bus, device, function> hierarchy is employed; i.e., a bus 102 supports one or more devices 104 which each may support a plurality of functions 106. PCIe (single lane (x1)) uses 18 pins (there are x4, x8, and x16 variants with higher pin counts).

PCIe uses a "Master/Slave" control model; the root complex 101 (FIG. 1) is a single master to the PCIe bus. The root complex 101 is the trunk of the tree topology; subsequent layers of hierarchy are the branches.

PCIe bus enumeration provides a memory-mapped interface, wherein transactions are direct accesses to memory; a read to virtual address is a read to the physical address that corresponds to that virtual address. Memory-mapped accesses are generally faster and more powerful than non-memory-mapped interfaces (e.g., packet based accesses, etc.).

FIG. 2 illustrates a typical prior art PCIe memory-mapping architecture 200. As illustrated, the exemplary processor 202 in the architecture 200 can access (read/write) any physical address by: 1) performing the access according to a virtual address ($32b$); 2) the MMU 204 translates the processor's virtual address to a physical address ($48b$); and 3) the MMU 204 converts the physical address to the IO virtual address (Xb).

Non-Transparent Bridges (NTBs)—

Virtually, PCIe NTBs allow TLPs (transaction layer packets) to be translated between multiple roots. Roots can communicate with one another (each root views the other as a device, subject to certain limitations), as well as devices 104 further down in the hierarchy as shown in FIG. 3.

As shown in FIG. 4, each processor 202a, 202b has its own memory-map implemented via its respective MMU 204a, 204b.

Existing NTBs are designed for peripherals, and do not scale for multiple processors. Even though each processor 202a, 202b can interact with the other processors as "devices," this interaction is significantly limited; for example, there are limited access rights, limited interrupt translations (programmable IO to MSI), and other associated overhead. Existing implementations of NTB are effectively limited to N=2 to 4 roots 101 (e.g., processors 204a, 204b), as shown in FIG. 5.

Doorbells and Message Signaled Interrupts (MSIs)—

Existing interrupts on PCIe systems may include so-called "doorbells" (for peripherals only). For example, a host process may write an interrupt message to a dedicated memory region, and ring an out-of-band programmable IO (PIO) (the doorbell). Responsive to the doorbell, the peripheral retrieves the interrupt message.

Doorbells are used for peripherals because a single host can easily ring many peripherals with just a register write.

Also, Message Signaled Interrupts (MSIs) may be used (by a host vs. peripheral). For example, a peripheral may write an interrupt message into a packet, and send the packet to the host, such as via in-band signaling. The receiving host extracts the payload and writes to appropriate memory space, and services the interrupt accordingly.

MSIs are used for hosts because a host must receive interrupts from many different sources.

Under existing interrupt schemes, when each host 202a-c views other hosts as respective "devices," then each processor must provide doorbells for all other processors; see FIG. 6. Doorbells are internally translated into a single MSI at each root (some have to be ignored).

Unfortunately, the foregoing interrupt mechanisms cannot effectively scale for large architectures or fabrics, because inter alia, there are not enough PIOs for all the necessary doorbells.

Solutions Needed—

Hence, in summary, for extant NTBs: (i) each processor separately bridges to the underlying network; (ii) the memory maps of each processor are independently managed (i.e., no common or shared memory map exists); (iii) while each processor can communicate with other processors, the processors view each other as "devices;" and (iv) existing NTB frameworks do not provide suitable techniques for scale (i.e., existing frameworks enable use of only roughly 2 to 4 hosts).

The lack of suitable mechanisms for interrupts in large-scale systems or fabrics further exacerbates the foregoing NTB issues.

Accordingly, based on the foregoing, there is a salient need for improved methods and apparatus that enable, inter alia, efficient and effective support of larger numbers of processors or other root devices, as well as larger fabric topologies. Ideally, such improved methods and apparatus would both support sufficiently high numbers of devices, and data throughput, while leveraging much of the existing high-speed data protocols (e.g., PCIe) and hardware.

SUMMARY

The present disclosure satisfies the foregoing needs by providing, inter alia, methods and apparatus for improved data bus and fabric operation and configuration.

In one aspect, a fabric manager (FM) architecture is disclosed. In one embodiment, the FM architecture includes an FM Master entity and at least one Node Minion and Switch Minion. The Minions communicate data with the FM Master to, inter alia, implement various fabric functions and configurations. In one implementation, the FM manages and arbitrates a fabric address space utilized by e.g., remote peers or other architectural elements.

In a further aspect, a topological (fabric) architecture is disclosed. In one embodiment, the architecture includes a plurality of endpoints (EPs) or nodes, IO Switches, Edge Switches, and hybrid switches arranged such that various ports on each are in communication with other ports on other components. In one implementation, the Edge Switches include a plurality NT EPs, while IO Switches include upstream and downstream ports (USPs and DSPs).

In another implementation, the architecture is configured to expose a memory semantic such that remote peer devices (e.g., those across the fabric) can access particular locations or devices via the exposed "proxy."

In another aspect, a route naming protocol and convention are disclosed. In one embodiment, the naming protocol comprises a spelling convention utilizing alpha-numeric designators of endpoints (EPs), IO Switches, Edge Switches, and hybrid switches contained with a prescribed route.

In another aspect, a computer readable apparatus is disclosed. In one embodiment, the apparatus includes a storage medium with at least one computer program disposed thereon an operative to be executed by a digital processing device, such as on a fabric switch or node entity or host.

In another aspect, methods and apparatus for using Non-Transparent Bridge (NTB) technology to export Message Signaled Interrupts (MSIs) to external hosts are disclosed.

In a further aspect, method and apparatus for using an IO Virtual Address (IOVA) space as a method of sharing an address space between hosts across a NTB are disclosed.

In yet another aspect, a system is disclosed. In one embodiment, the system includes a large number (e.g., 100 or more) host devices disposed within an operative data fabric.

In a further aspect, methods for operating a high speed data fabric are disclosed.

In a further aspect, a host device configured for use within a high speed data fabric is disclosed.

In yet another aspect, an MMU architecture is disclosed, In one embodiment, the MMU architecture comprises (i) a local element, and (ii) a fabric or distributed element.

In another aspect, a fabric manager (FM) entity is disclosed.

In a further aspect, a master/minion architecture using the aforementioned FM entity is disclosed.

In yet another aspect, a computerized network entity for use within a host device is disclosed. In one embodiment, the entity comprises a PCIe card-like form factor which is plugged into a PCIe slot of the host and which enables various of the functionalities described herein. In one variant, the host device is a server.

In a further aspect, methods and apparatus for "hiding" register or other address space are disclosed. In one embodiment, at least a portion of a BAR (base address register) space is hidden from other entities, including the host device (e.g., BIOS). In one variant, the requested address space is allocated from a "private" PCI address space; e.g., one managed and assigned by a fabric manager (FM) entity.

In one particular implementation, a local device (e.g., card or other form factor) hides the NT EP PCI device BARs 0, 2 and 4 below it from the BIOS. These BARs are assigned private PCI bus addresses by the FM and are visible to the device DMA engines.

In another aspect, methods and apparatus for local PCI device data movement to/from private address space are disclosed. In one embodiment, any local PCI device can access the private PCI address space via e.g., making a subset of the private PCI address space accessible via a mapping function contained within a new BAR space (aka "BAR Z" in one implementation). BAR Z is configured to be smaller size than the total private PCI address space, but it is programmable via e.g., page tables. In one variant, data movements targeting the private address space can map to remote system memory, MSI interrupt mechanisms, or PCI device BAR addresses.

In still a further aspect, methods and apparatus for device lending are disclosed. In one embodiment, a "local" system or device is configured to access all BARs of a "remote" PCI system or device via e.g., DMA engines, peer to peer transaction, or programmed IO, thereby allowing for a remote device to be controlled and "lent" to a local system for use, thereby obviating high latency and otherwise deleterious operations such as shut down or reboot or either the local or remote devices/systems.

In another aspect, methods and apparatus for identifier mapping conservation are disclosed. In one embodiment, the identifier comprises a RID (requester ID) used with a PCIe-based system, and the inventive methods and apparatus are configured to multiplex a subset of local RIDs to a single private RID upon ingress into the private PCI domain. In one variant, bits within a given PCI TLP are multiplexed by redefining the meaning of the 8 bit PCI TLP "read tag" field to include a "RID mux" portion and a read tag portion.

In yet a further aspect, methods and apparatus for queue structure management are disclosed. In one embodiment, a subset of an "all-to-all" communication mechanism utilizing dynamic queue pairs is employed.

In still another aspect, methods and apparatus for "receiver-less" data receipt is disclosed. In one embodiment, hardware and memory associated with typical prior art network adapter cards is obviated based on utilization of the load/store semantic of the inventive fabric described herein. "Sender" hardware moves data directly to a receiver's memory, and hence the receiver hardware as described above; i.e., the receive DMA buffer and the receive DMA unit in one configuration. This reduces one-way latency as well as elimination of store-and-forward mechanisms on the receiver device.

In another aspect, a method for using non-transparent bridge (NTBs) entities for transmitting interrupt data across a data fabric is disclosed, wherein in one variant the data fabric is part of a fabric architecture comprising at least 100 host devices, and the method includes performing at least one of perform at least one of base address register (BAR) space hiding or BAR space conservation.

In another variant of the method the data fabric is part of a fabric architecture comprising at least 1,000 host devices.

In still another variant, the transmitting interrupt data comprises transmitting MSIs (Message Signaled Interrupts).

In a further variant, the method further includes utilizing an IO Virtual Address (IOVA) space for sharing an address space between at least a portion of a plurality of host devices.

In another variant, the method further comprises utilizing a fabric manager (FM) process to configure at least a portion of the NTBs.

In a further variant, the method further comprises utilizing at least one edge switch, hub switch, and IO switch within the fabric to perform routing of the transmitted interrupt data.

In another aspect, network apparatus for use in a multi-host device system is disclosed. In one embodiment, the network apparatus is configured to interface between a host process and a switch element, the network apparatus configured to perform at least one of base address register (BAR) space hiding or BAR space conservation in order to enable accommodation of a plurality of host devices which would otherwise exceed a BAR space capability of the system without either of said hiding or conservation.

In a further aspect, a network architecture for use with a plurality of host devices and a plurality of processors is disclosed. In one embodiment, the processors comprise at least one respective root complex, and the architecture includes computerized logic configured to utilize a known topology to statically define a single common IO virtual address map associated with a memory space.

In one variant, each of the plurality of processors is configured to define how the memory space is translated via a respective IOMMU (IO memory management unit).

These and other aspects shall become apparent when considered in light of the disclosure provided herein.

Figure 1:
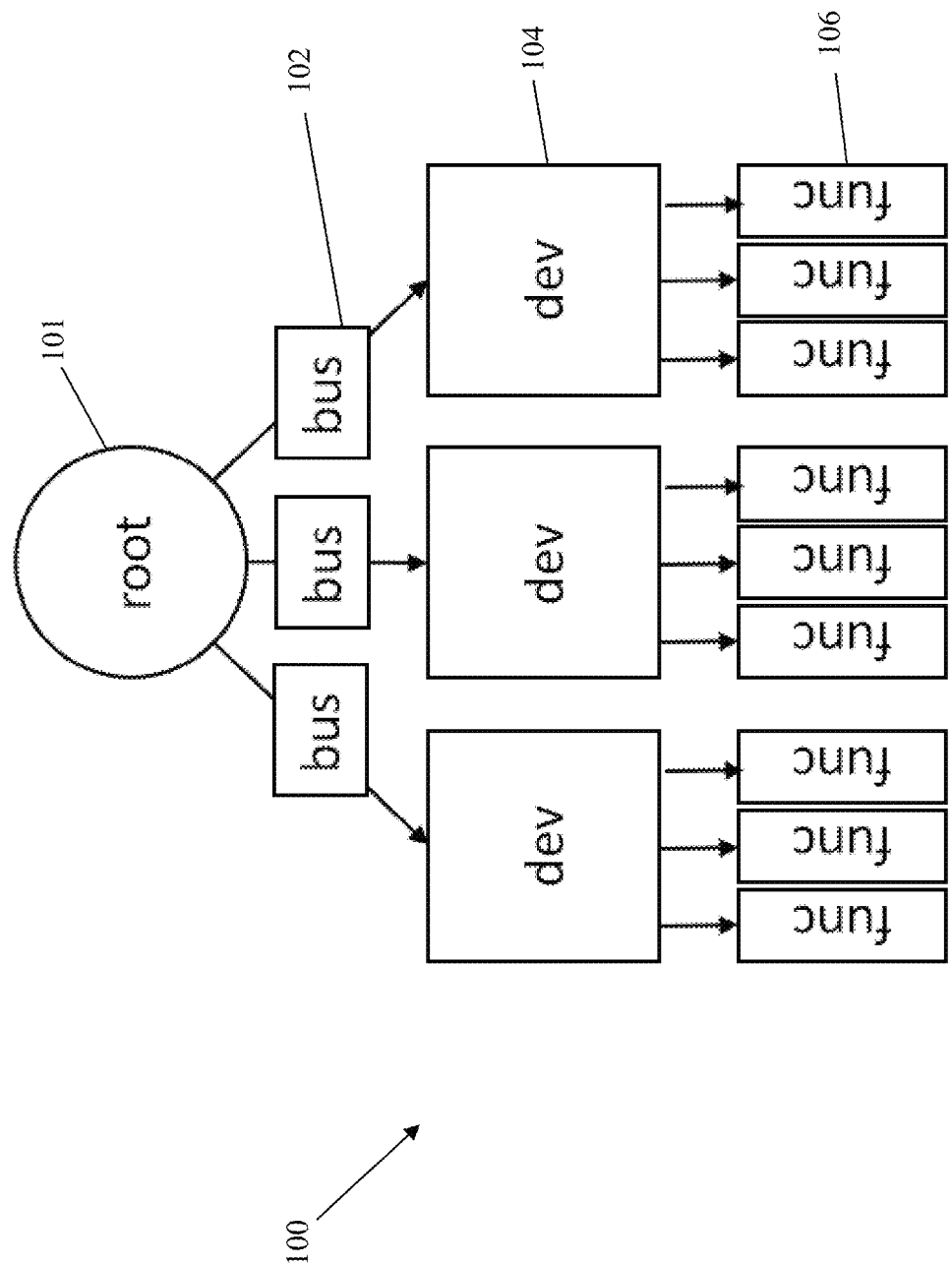
FIG. 1 is a block diagram of a prior art single-root device topology.

Copyright © 2018-2019 GigaIO, Inc. All Rights Reserved

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the terms "device" or "host device" include, but are not limited to, servers or server farms, set-top boxes (e.g., DSTBs), gateways, modems, personal computers (PCs), and minicomputers, whether desktop, laptop, or otherwise, as well as mobile devices such as handheld computers, PDAs, personal media devices (PMDs), tablets, "phablets", smartphones, vehicle infotainment systems or portions thereof, distributed computing systems, VR and AR systems, gaming systems, or any other computerized device.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, GPUs (graphics processing units), microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal or data interface with a component or network including, without limitation, those of the PCIe, FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), InfiniBand (Mallanox), NVLink or NVSwitch families.

As used herein, the term PCIe (Peripheral Component Interconnect Express) refers without limitation to the technology described in PCI-Express Base Specification, Version 1.0a (2003), Version 1.1 (Mar. 8, 2005), Version 2.0 (Dec. 20, 2006), Version 2.1 (Mar. 4, 2009), Version 3.0 (Oct. 23, 2014), Version 3.1 (Dec. 7, 2015), Version 4.0 (Oct. 5, 2017), and Version 5.0 (Jun. 5, 2018), each of the foregoing incorporated herein by reference in its entirety, and any subsequent versions thereof.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, SSDs, optical media (e.g., CD-ROMs, Laserdiscs, Blu-Ray, etc.), or any other devices or media capable of storing content or other information.

Overview

The present disclosure describes methods and apparatus for, among other things, efficient scaling of fabric architectures such as those based on PCIe technology, including up to very large fabrics and numbers of hosts/devices, such scaling not achievable using prior known technologies. Such large scale architectures enable ultra-high performance applications such as for example data centers and computing clusters.

Specifically, in one aspect, methods and apparatus for using Non-Transparent Bridge (NTB) technology to export Message Signaled Interrupts (MSIs) to external hosts are described.

In a further aspect, an IO Virtual Address (IOVA) space is created and used as a method of sharing an address space between hosts, including across the foregoing NTB(s).

Additionally, a Fabric Manager (FM) entity is disclosed and utilized for programming e.g., PCIe switch hardware to effect a desired host/fabric configuration.

Methods and apparatus for (i) "hiding" register or other address space, (ii) local PCI device data movement to/from private address space, (iii) device lending, (iv) identifier (e.g., RID) mapping conservation, (v) queue structure management, and (vi) "receiver-less" data receipt for use with inter alia, the exemplary FM and architecture described above, are also disclosed.

Detailed Description of Exemplary Embodiments

Referring now to FIGS. 7-41 (and Appendices I-III), exemplary embodiments of the apparatus and methods of the present disclosure are now described in detail. While these exemplary embodiments are described in the context of PCIe functionality such as that set forth in the PCIe Base Specification e.g., Revision 3.0, 4.0, or later, each incorporated herein by reference in its entirety) and certain aspects of PCIe-based systems such as e.g., those set forth in U.S. Pat. Nos. 9,448,957, 9,152,597, 8,868,777, and 8,463,934, each entitled "Unified system area network and switch" and incorporated herein by reference in its entirety, the various aspects of the present disclosure are in no way so limited, and in fact may be used in any number of other applications and/or system architectures or topologies (whether PCIe-based or otherwise), the foregoing being merely exemplary.

Common I/O Virtual Address Space (IOVA)—

Figure 7:
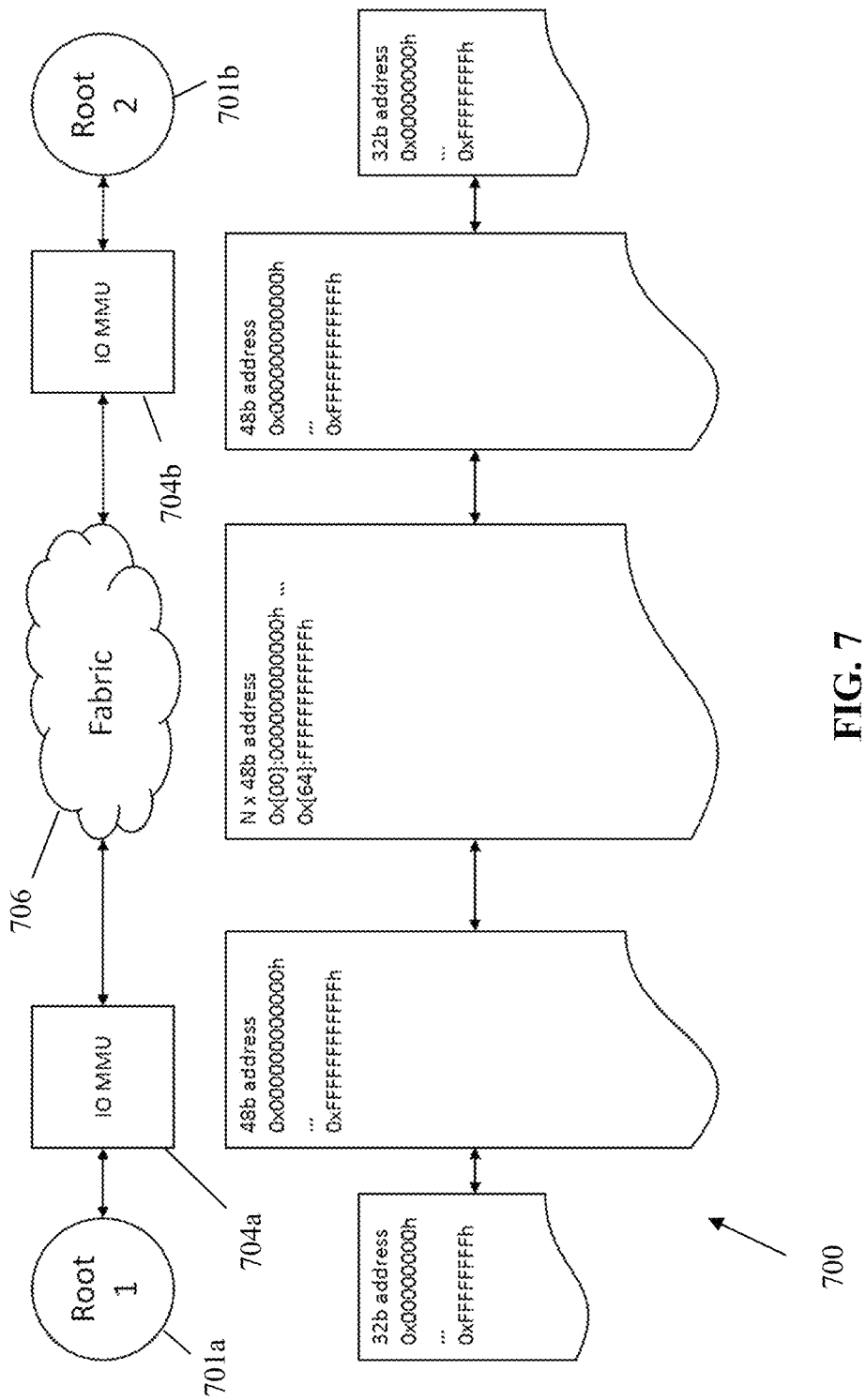
FIG. 7 is a graphical representation of one embodiment of an address mapping architecture according to the present disclosure.
Figure 8:
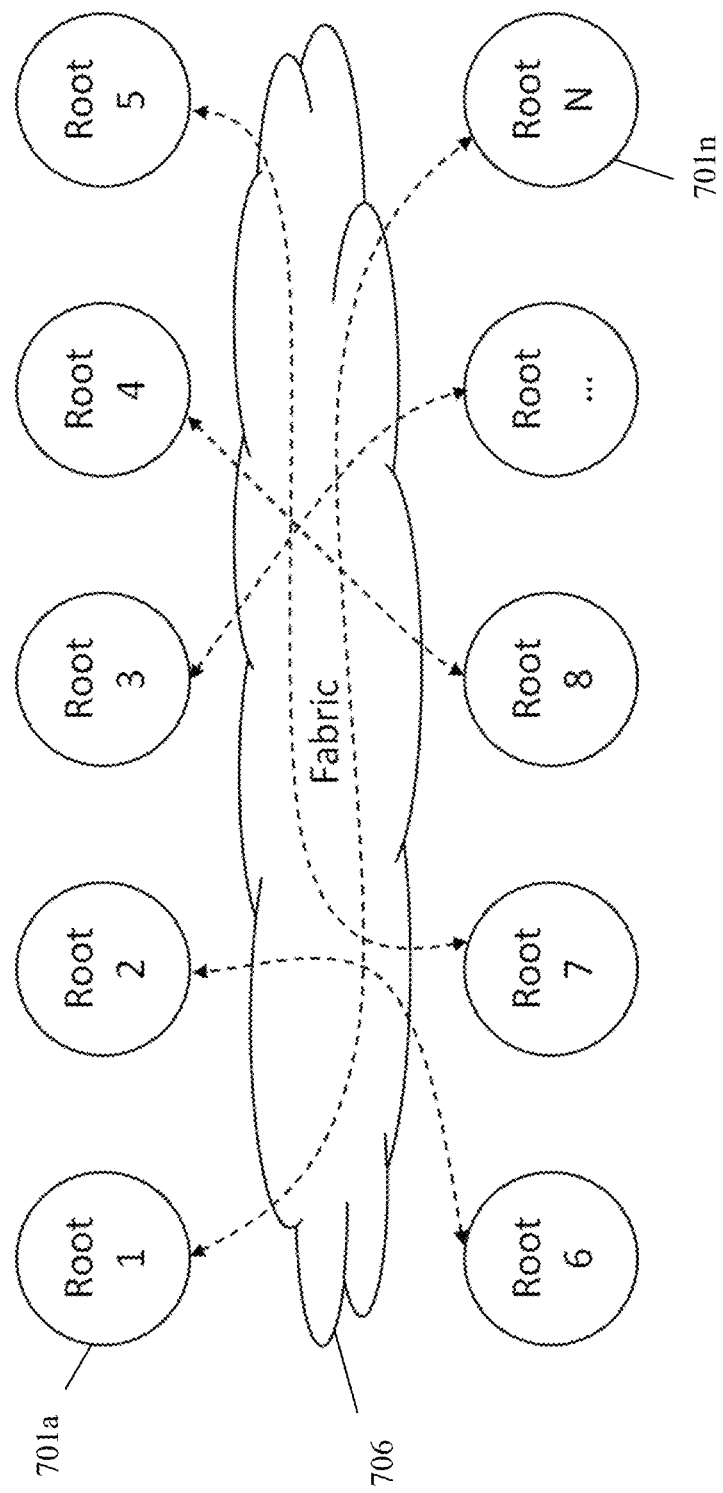
FIG. 8 is a graphical representation of one embodiment of a multi-root system connected by a fabric according to the present disclosure.
Figure 9:
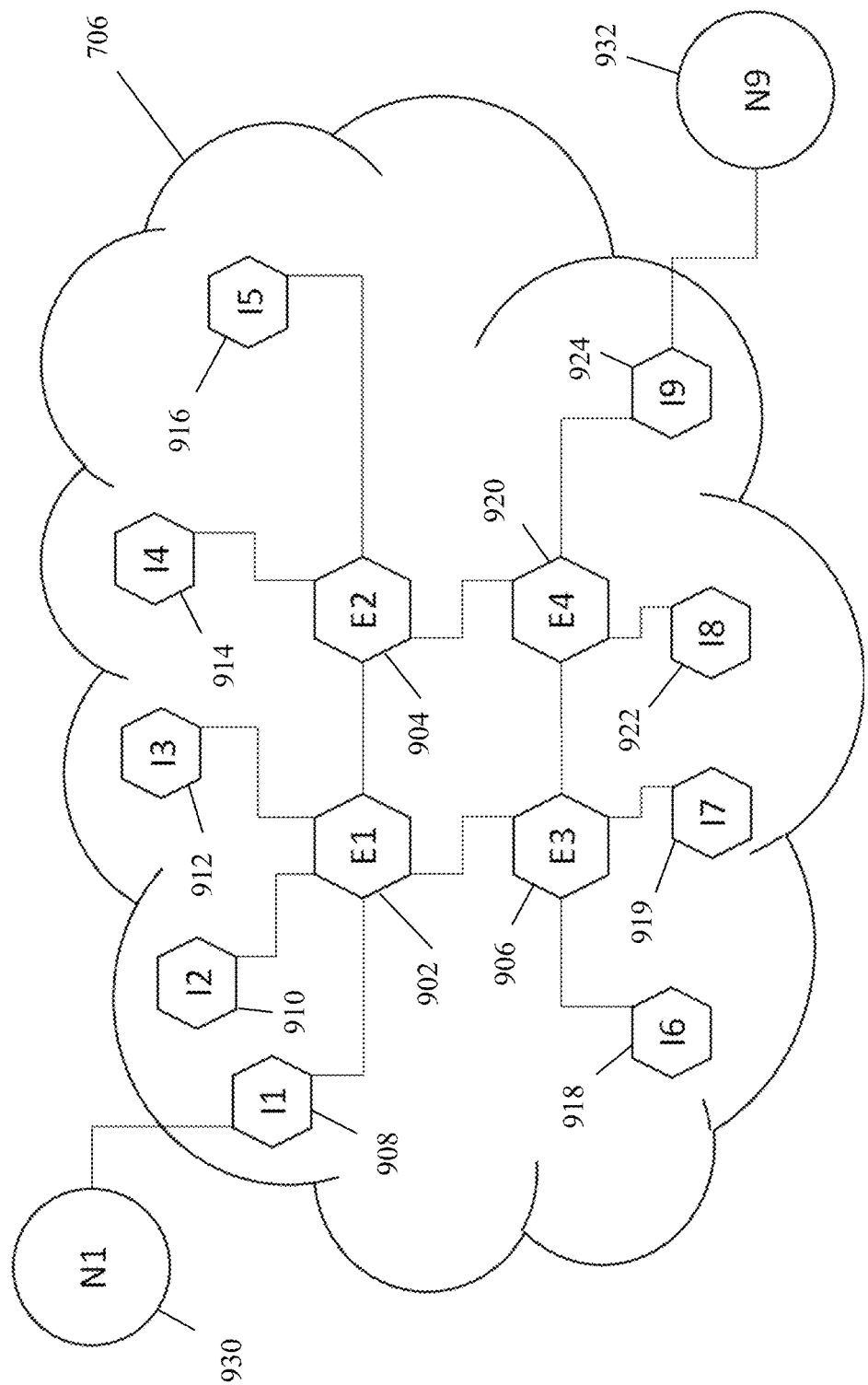
FIG. 9 is a graphical representation of one embodiment of two nodes connected by an IO/EP-based fabric according to the present disclosure.
Figure 10:
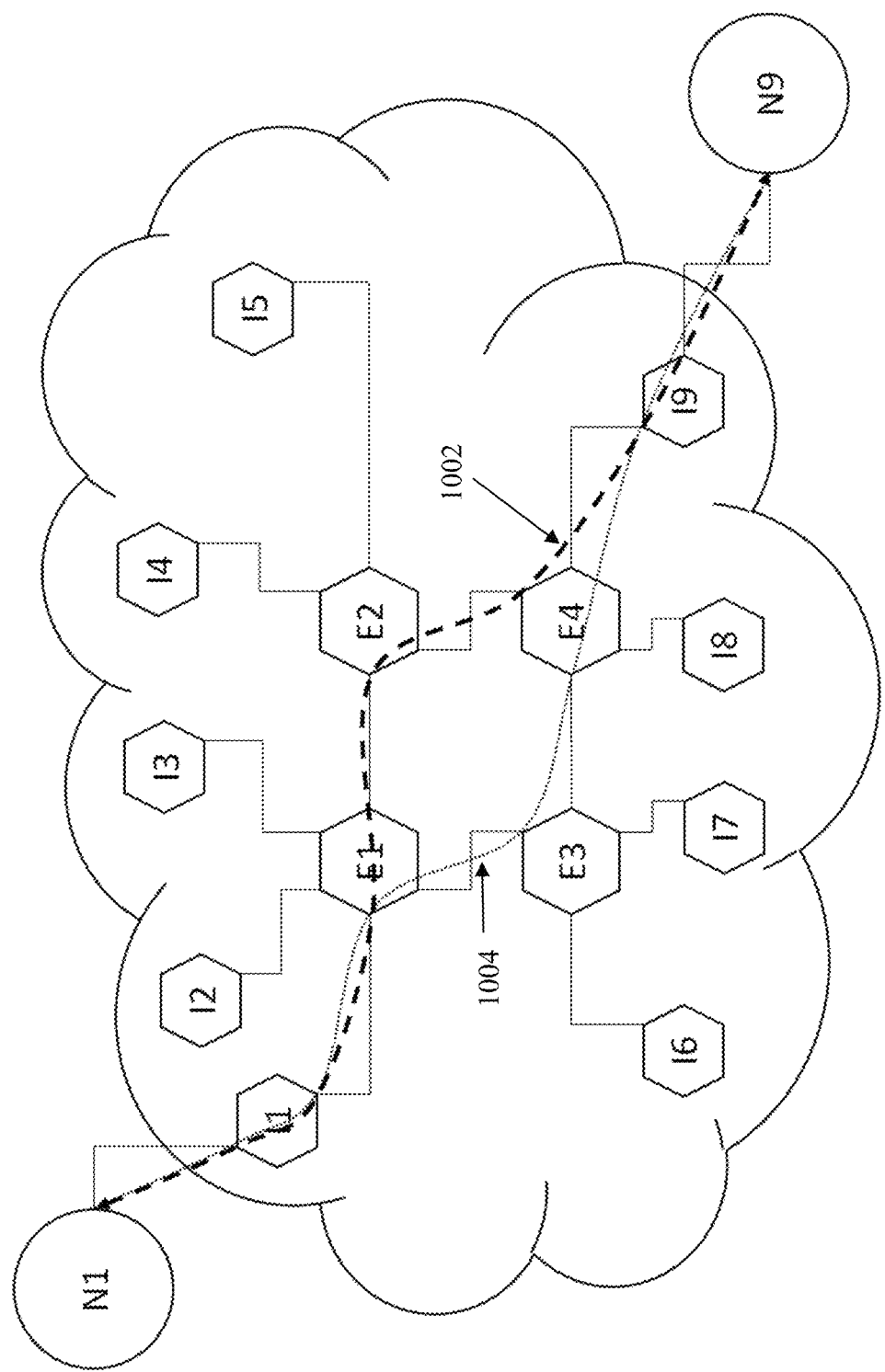
FIG. 10 is a graphical representation of one embodiment of the two nodes connected by the IO/Edge switch-based fabric of FIG. 9 via one particular logical path.

Referring now to FIGS. 7 and 8, one exemplary embodiment of the architecture 700 using the common IOVA according to the present disclosure is shown and described.

Figure 2:
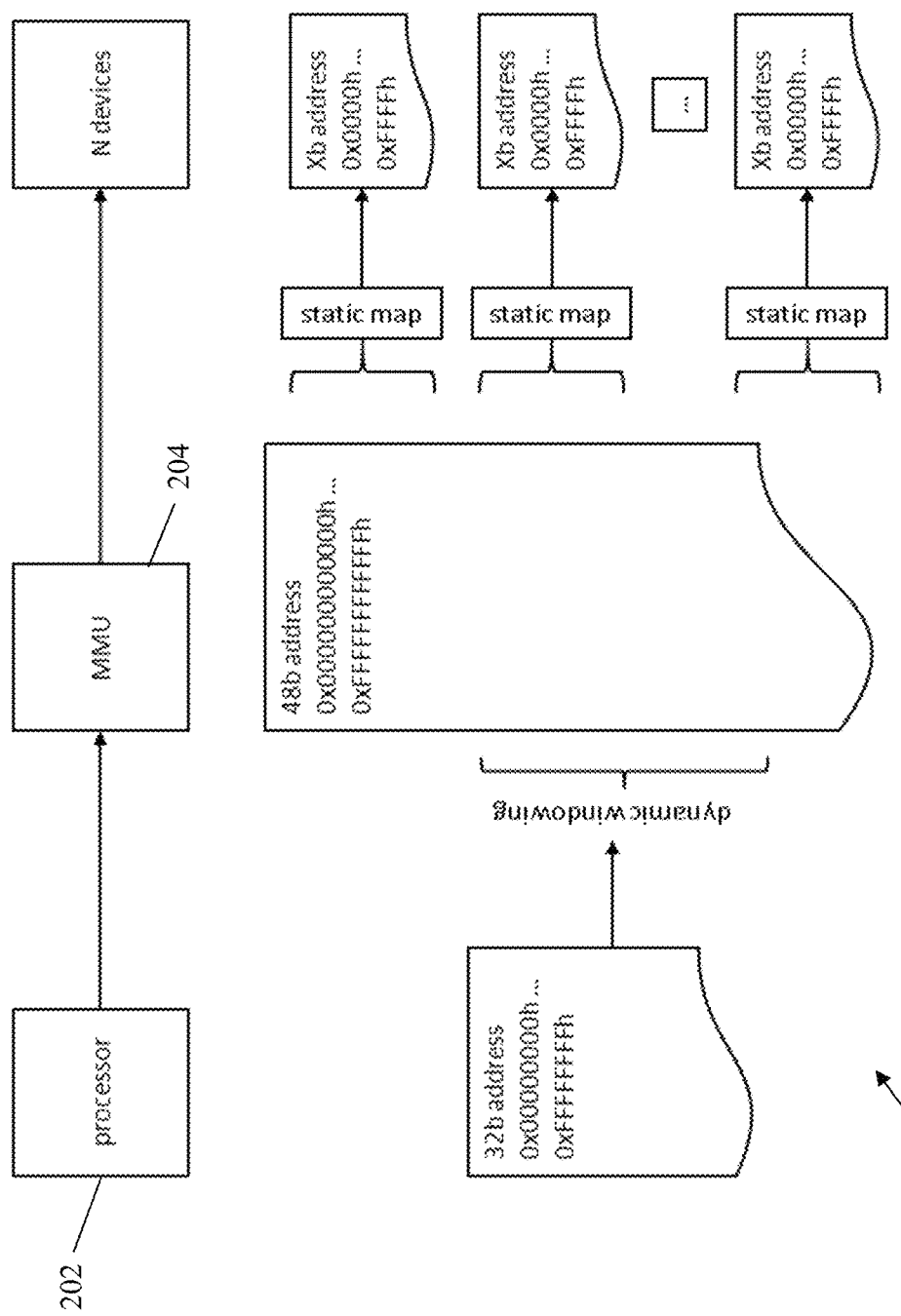
FIG. 2 is a graphical representation of a prior art address mapping architecture consistent with FIG. 1.
Figure 3:
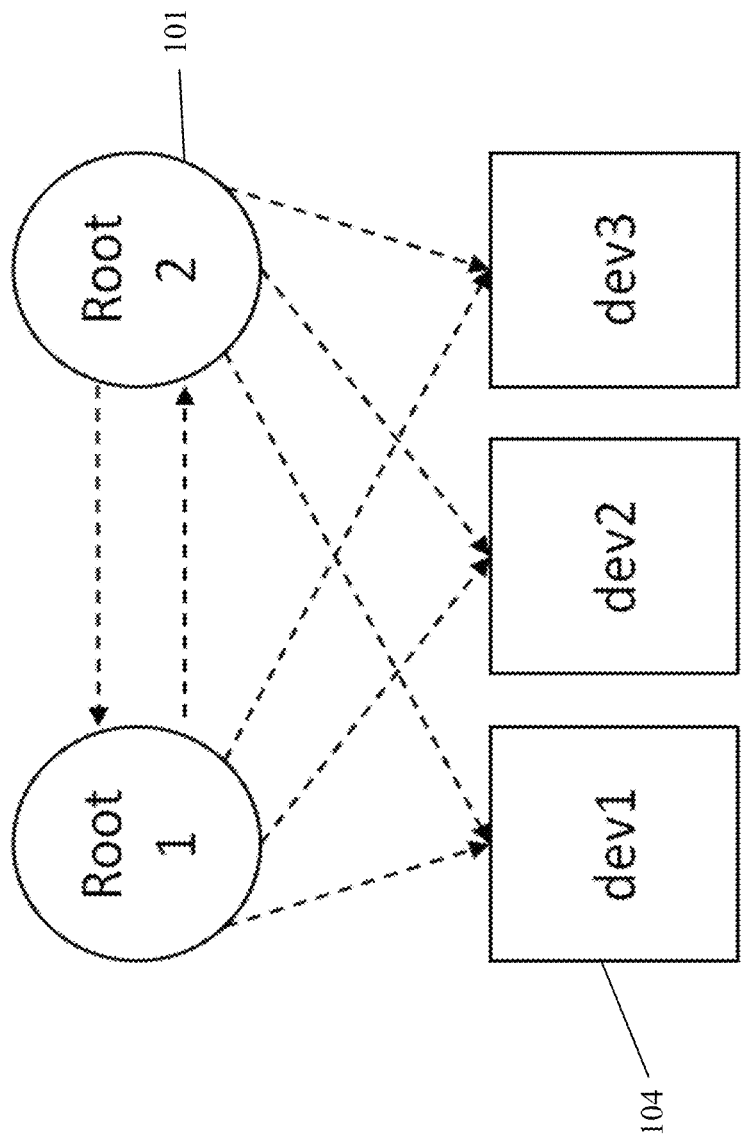
FIG. 3 is a block diagram of a prior art multi-root device topology.
Figure 4:
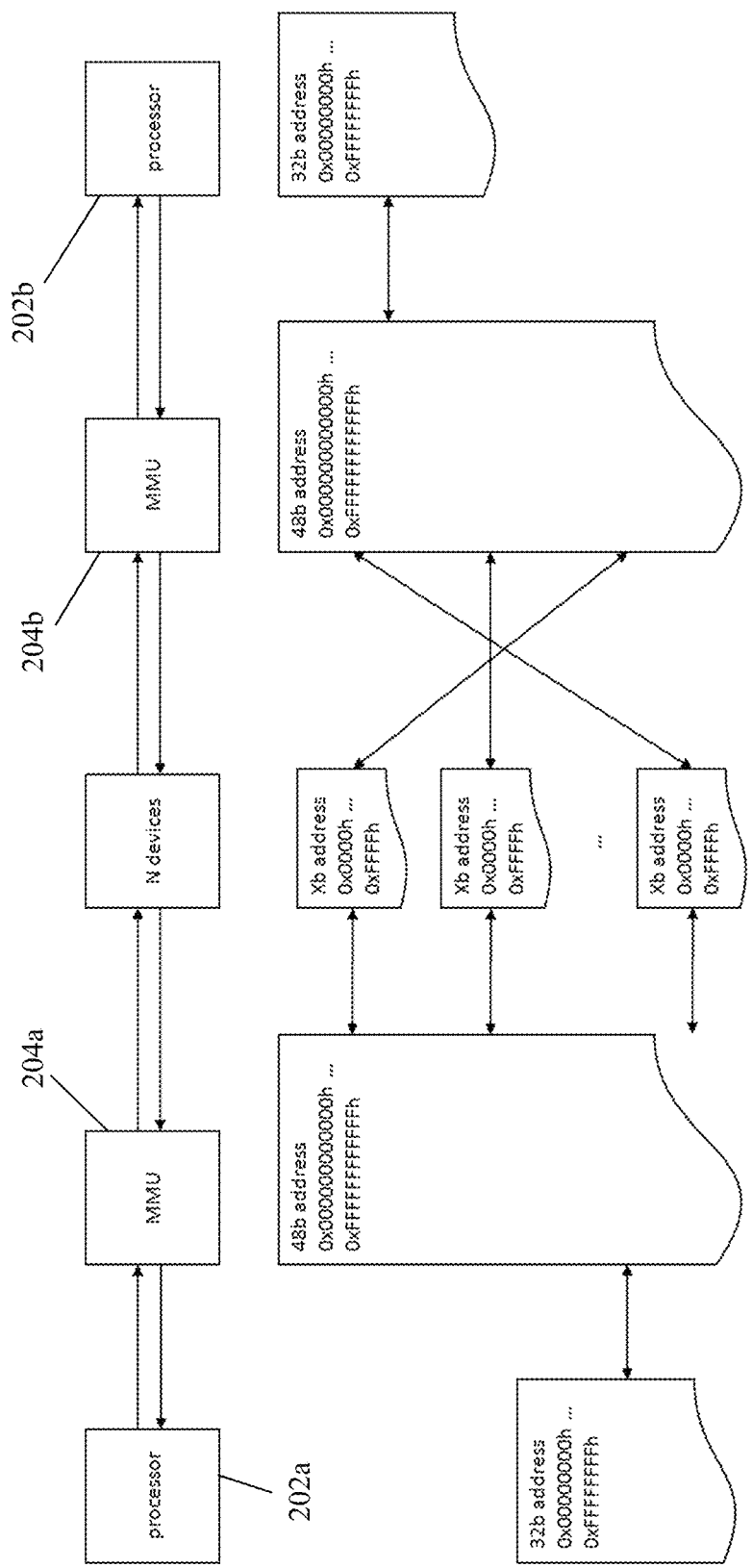
FIG. 4 is a graphical representation of a prior art address mapping architecture consistent with FIG. 3.
Figure 5:
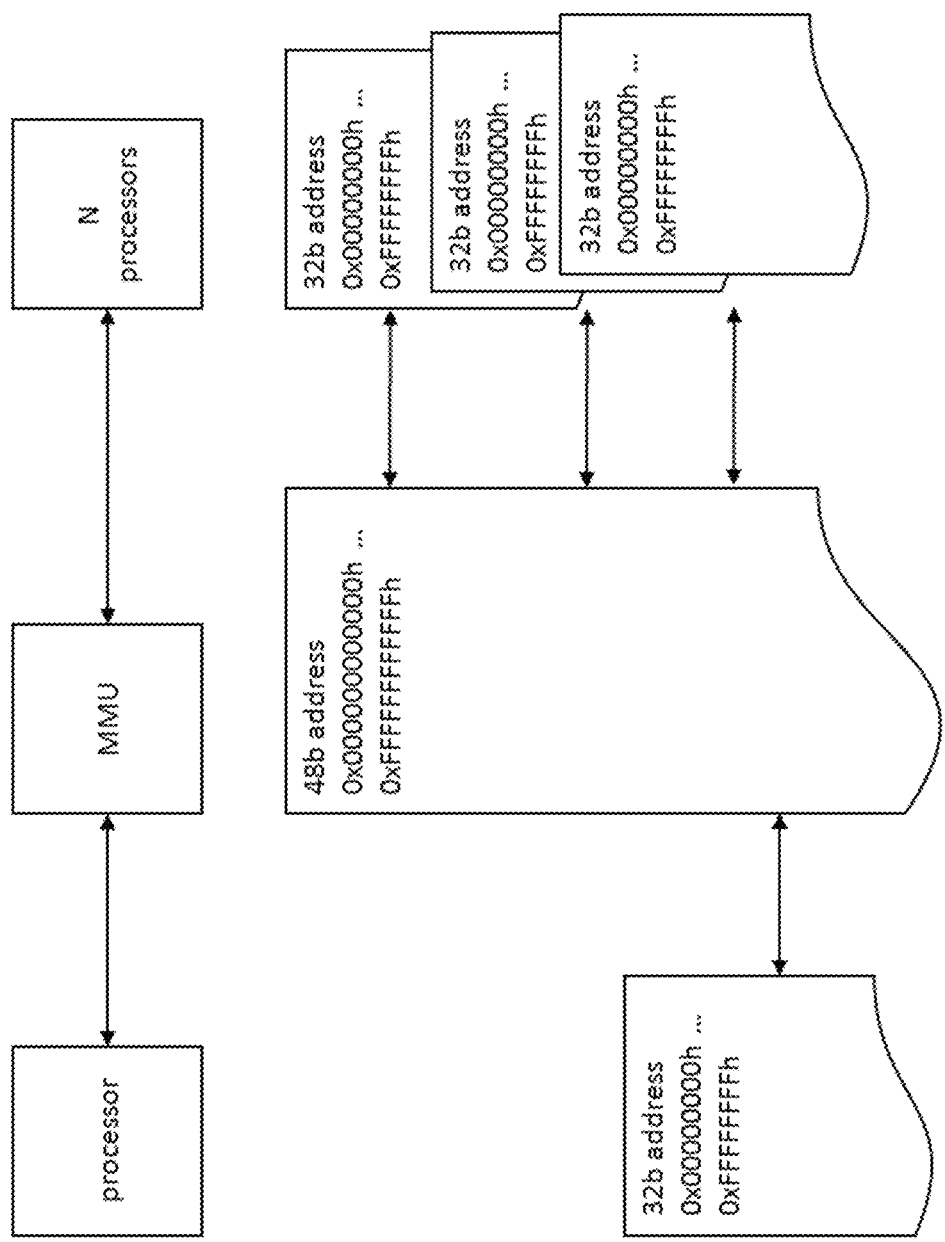
FIG. 5 is a graphical representation of another prior art address mapping architecture.
Figure 6:
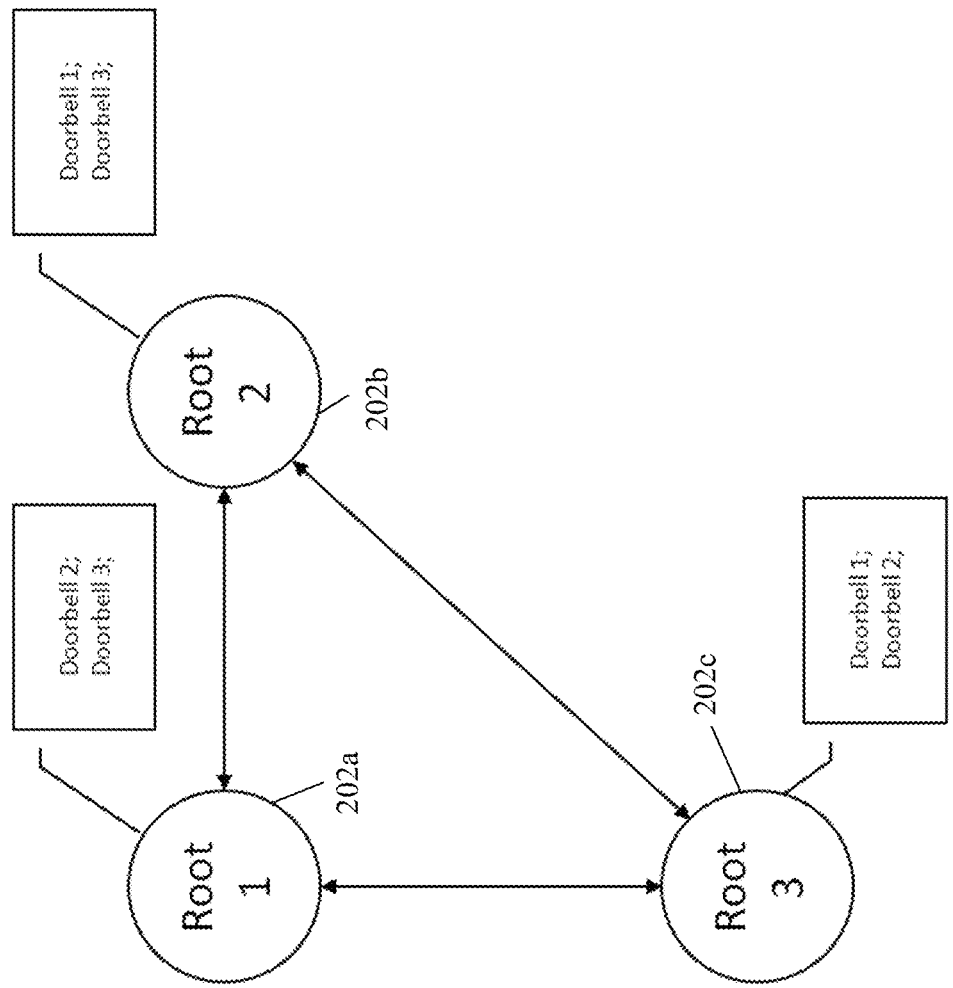
FIG. 6 is a graphical representation of a prior art doorbell architecture.

In the inventive architecture of the embodiment of FIGS. 7 and 8, rather than having each root 701 create a separate IO map as discussed supra (see FIGS. 1 and 2), the conceptual "fabric" 706 uses a known topology—e.g., N processors (e.g., 100, or 64 h)—to statically define a single common IO virtual address map. In the exemplary implementation, each processor (root) maintains the ability to define how the memory space is translated via its own IOMMU.

In concert, IOMMU operation is used to support local memory mapping in conjunction with the "fabric" level operations performed by the fabric manager (FM), described in greater detail subsequently herein. Memory protection is also still performed by each root's IOMMU 704 (i.e., read/write permissions).

Notably, under this architecture, each root 701 can be connected to any other single root 701*n* through the fabric 706 by directly translating one node's accesses to another node's map address (only an address prefix). The connection in the exemplary configuration effectively exposes a memory semantic acting as a proxy such that, inter alia, remote peers can access various memory locations via the exposed semantic or proxy. See FIG. 8. As such, under this model, only one connection is active at a time. Accordingly, each root can directly write into MSI space as if there was a direct 1:1 mapping, thereby supporting literally any degree of scaling of the fabric.

Common Message Signaled Interrupt (MSI) Space—

As previously discussed, existing interrupts on PCIe systems may include so-called "doorbells" for peripherals, and Message Signaled Interrupts (MSIs) may be used by a host. Under these existing interrupt schemes, when each host views other hosts as respective "devices," then each processor must provide doorbells for all other processors. Doorbells are internally translated into a single MSI at each root, and cannot be sufficiently scaled for larger applications or fabrics.

In a PCIe fabric, MSI interrupts are requested by a PCIe Endpoint (EP) and allocated and assigned by the system BIOS/OS. This process requires an EP to request a number of MSIs via its configuration space, and the BIOS/OS to assign PCIe addresses to correspond with the MSIs.

Accordingly, the present disclosure addresses these limitations of the prior art by defining virtual endpoints (VEPs), and using a virtual connection Message Signaled Interrupt (MSI) scheme. Conceptually, the NTB's used to implement this scheme provide transparent bridge (TB) functions, along with the functions and advantages discussed below. The VEPs are in effect exposed via the TBs.

In one embodiment, hosts interconnected via an NTB fabric advantageously are able to create "Proxy" MSI interrupts that can be dynamically requested and assigned between hosts. This enables, inter alia, host-to-host interrupts, including efficient scaling when large numbers of hosts are present on the fabric.

In the exemplary implementation, the foregoing mechanism does not require an EP to request MSIs (per the functionality defined in the extant PCIe specifications), and so the assignment, use, release, and the number of MSIs requested, are each under software control.

An entity that is assigned a given MSI by a remote host is referred to as a virtual PCIe endpoint (VEP). In an exemplary scenario, Host A on a fabric allocates a range of MSI's from its LAPIC, with each MSI corresponding to a particular PCIe address. Host A then assigns one or more of the allocated MSIs for use by a VEP by creating corresponding Proxy MSIs in the PCIe NTB fabric. The Proxy MSI consists of, in one variant, a PCIe address mapping from the VEP, thru an NTB translation, to the PCIe address corresponding to one of the allocated MSIs. The VEP utilizes the Proxy MSIs by generating a TLP "write" to the NTB translation.

Advantageously, under the foregoing approach, a transmitter of the MSI is not an enumerated device; rather, a Proxy MSI is allocated, and this Proxy MSI is not associated statically with an EP as with prior art PCIe approaches. Moreover, such transmitter of the Proxy MSI uses a conventional TLP write operation, which is translated to a real MSI to be received by another peer.

In the exemplary implementation, the relevant LAPIC (Local interrupt controller or APIC) associates a Proxy MSI with a device, but the Proxy MSIs are not put into the NT EP MSI table. Proxy MSIs transmitted from a VEP are passed through the NTB and arrive through the NT EP to the LAPIC.

In certain variants, individual Proxy MSIs can be masked and unmasked, such as via (i) hardware (where available), or (ii) via a software-based handler.

Moreover, groups of Proxy MSIs can be associated together to perform a single function for a VEP.

Furthermore, in the exemplary embodiment, no doorbells are required, and any number of roots can be supported (subject to connectivity being limited to only the connection that is then active).

In homogenous variants, each root 701*a-n* is of the same technology node (e.g., all x86 processors, all ARM cores, etc.), and thus the MSI space can be directly memory mapped without translation (for example, each of the x86 processors will interpret interrupts in an identical fashion).

In heterogeneous variants, each root 701*a-n* may be configured to pre-negotiate how interrupts are interpreted— e.g., x86 processors interpret interrupt 0x2Ah to be different than that for ARM processors. As such, in certain heterogeneous implementations, an intermediary translation layer/negotiation protocol is utilized for such functions. For example, a heterogeneous fabric that supports a mixed population of ARM and x86 processors may require that each processor expressly or implicitly identifies itself as either an ARM or an x86 (or otherwise compatible processing node). Thereafter, connections between ARM and x86 nodes memory map their corresponding interrupts to account for technology differences in MSI space based on a e.g., a generic ARM to x86 MSI space mapping. In other variants, connections between different processors may require an initial negotiation protocol prior to connectivity (e.g., where the processors determine their interrupt mapping.) In still other variants, since each processor node retains control of their own MMU for access control, the MMUs may only expose a subset of MSI space for other processor technologies.

In another such example, a heterogeneous fabric that supports a mixed population of processors may only allow direct MSI space connectivity between processors of like technology (e.g., ARM processors may only directly write into the MSI space of other ARM nodes). In some such variants, indirect connectivity between processors of different technology may still be allowed via traditional "doorbell" based connectivity. For practical considerations, doorbell based connectivity may be limited to a subset of the locations of the heterogeneous fabric.

In one operating scenario, a given bridge element initially might have an empty slot on its downstream side; a VEP is then "hot plugged" into the slot, and the OS (e.g., Linux) probes the VEP with configuration reads/writes and memory reads/writes. Results of these reads/writes are passed across the fabric to a real (i.e., non-virtual) device or EP within the architecture that responds. A hot unplug may also be used to disconnect the real EP from the VEP.

Figure 7A:
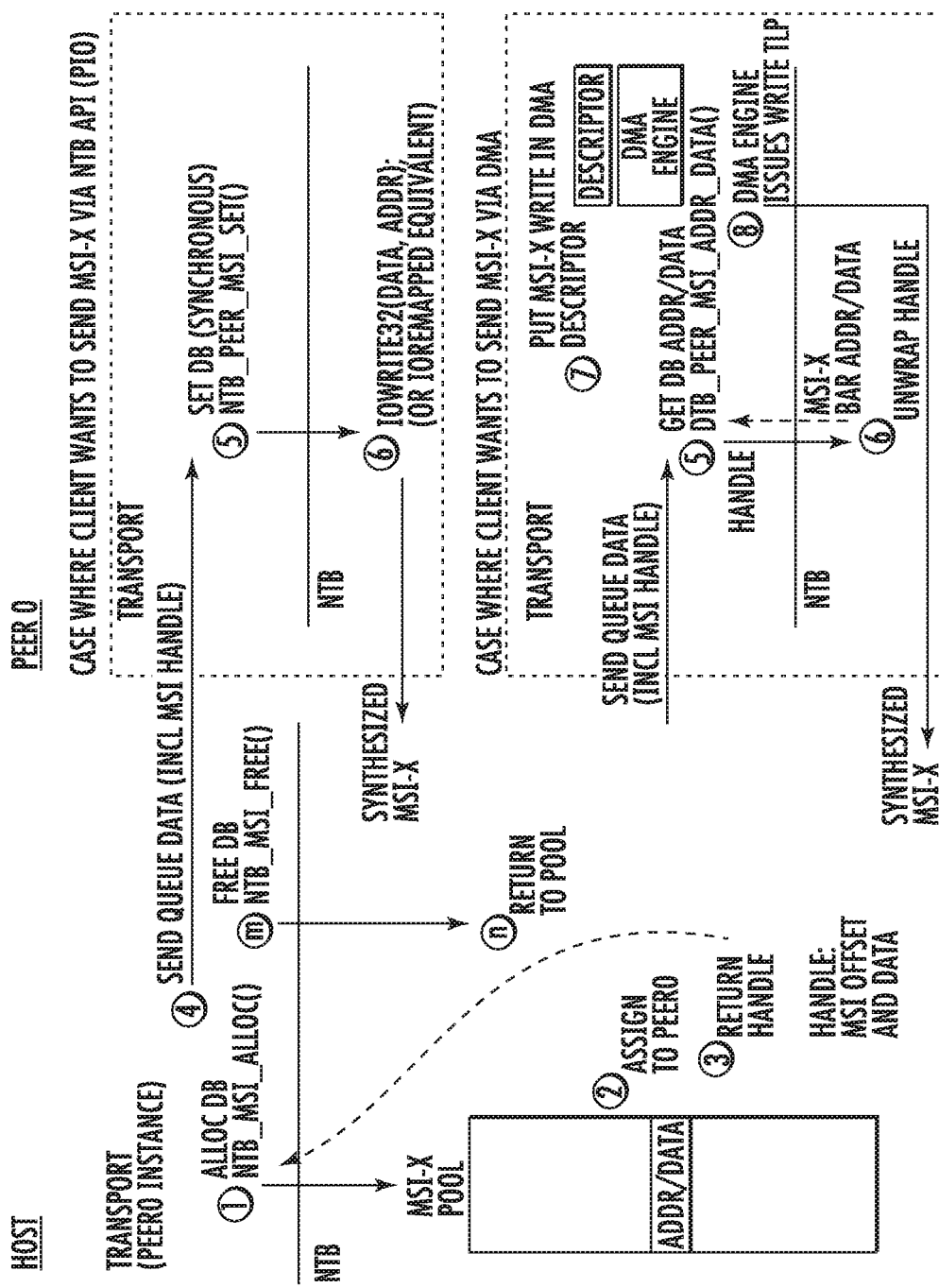
FIG. 7A is a graphical representation of one embodiment of a signal flow between host and peer entities according to the present disclosure.

FIG. 7*a* illustrates exemplary scenarios wherein a host utilizes NTBs as described above to transmit Proxy MSIs (e.g., MSI-X's) via (i) an NTB API (see Appendix III for exemplary API code and description), or (ii) a DMA engine.

It is further noted that the various aspects of the architecture of FIGS. 7-7*a* may be employed with respect so-called "hybrid" devices or entities (e.g., switches), and/or a combination of different types of devices/fabrics. In one exemplary embodiment, one or more hybrid switches composed of NT EPs (Non-transparent Bridge Endpoints) and one or more USPs/DSPs are used as architectural elements within or in conjunction with the fabric.

Fabric Manager (FM)—

As previously noted, prior art PCIe performs routing based on a memory map that is determined at bus enumeration.

In contrast, exemplary embodiments of the present disclosure utilize a Fabric Manager (FM) process or entity for, inter alia, intra-fabric routing. Specifically, the exemplary embodiment of the inventive fabric is instantiated with a known static topology as its foundation. The topology is selected by an administrator, and much about its static nature is known and stored in a data structure along with some dynamic data elements.

Although a source node may potentially have multiple paths to get to a destination port, the static topology defines the route that must be taken from a particular source to a particular destination. Routing is accomplished through Non-Transparent Bridge Endpoints (NT EPs). In one exemplary implementation, each NT EP contains its own BAR (base address register) space. Each BAR can be associated with either a Lookup Table (LUT), a Direct Window (DW), or both. These elements provide Address Translation for traffic to find its way from one PCIe domain to another through the fabric. Other approaches recognized by those of ordinary skill given the present disclosure may be used as well for this function.

Exemplary embodiments of the inventive Switch devices may assume one of three roles within a given topology: an IO Switch role, EDGE Switch role, or a HUB Switch role.

IO Switches provide direct connectivity for host nodes and PCIe target devices such as GPUs and storage.

EDGE Switches house the NT EPs that are located downstream from hosts via legacy PCIe connections.

Finally, the HUB Switch enables scaling by providing NT EPs used in Crosslinks.

Functionally, the Fabric Manager has to provide routing discovery (in the exemplary embodiment via a so-called "Topology Record" (TR)) when a new host is added. The TR contains information regarding the fabric topology (see FIGS. 9 and 10); e.g.:

E1 902 is connected to [E2 904, E3 906, I1 908, I2 910, I3 912]
E2 904 is connected to [E1 902, E4 920, I4 914, I5 916]
E3 906 is connected to [E1 902, E4 920, I6 918, I7 919]
E4 920 is connected to [E2 904, E3 906, I8 922, I9 924]
N1 930 is connected to [I1 908]
N9 932 is connected to [I9 924]

In the exemplary implementation, even though the TR can dynamically change (adding/removing nodes, etc.), the TR is the same for all nodes. As such, there is no requirement for any of the processors to be a topology master (host) when communicating with one another. More directly, unlike traditional PCIe which identified a root complex at bus enumeration to master a network of endpoints, the various embodiments described herein use a shared topology map for all processors such that no processor is a master to other processors.

In contrast to the prior art PCIe routing based on a memory map that is determined at bus enumeration, the inventive TR allows in one implementation for "route spelling" as described in greater detail below. Specifically, a route (e.g., the route between N1 930 and N9 932 in FIG. 10) can be allocated via either:

N1I1E1E2E4I9N9 (1002); or
N1I1E1E3E4I9N9 (1004).

Accordingly, a circuit switch route can be established with e.g., a PCIe Transaction Layer Packet using the aforementioned convention. Thereafter, memory accesses between the nodes N1 and N9 are circuit switched as previously described.

Figure 11:
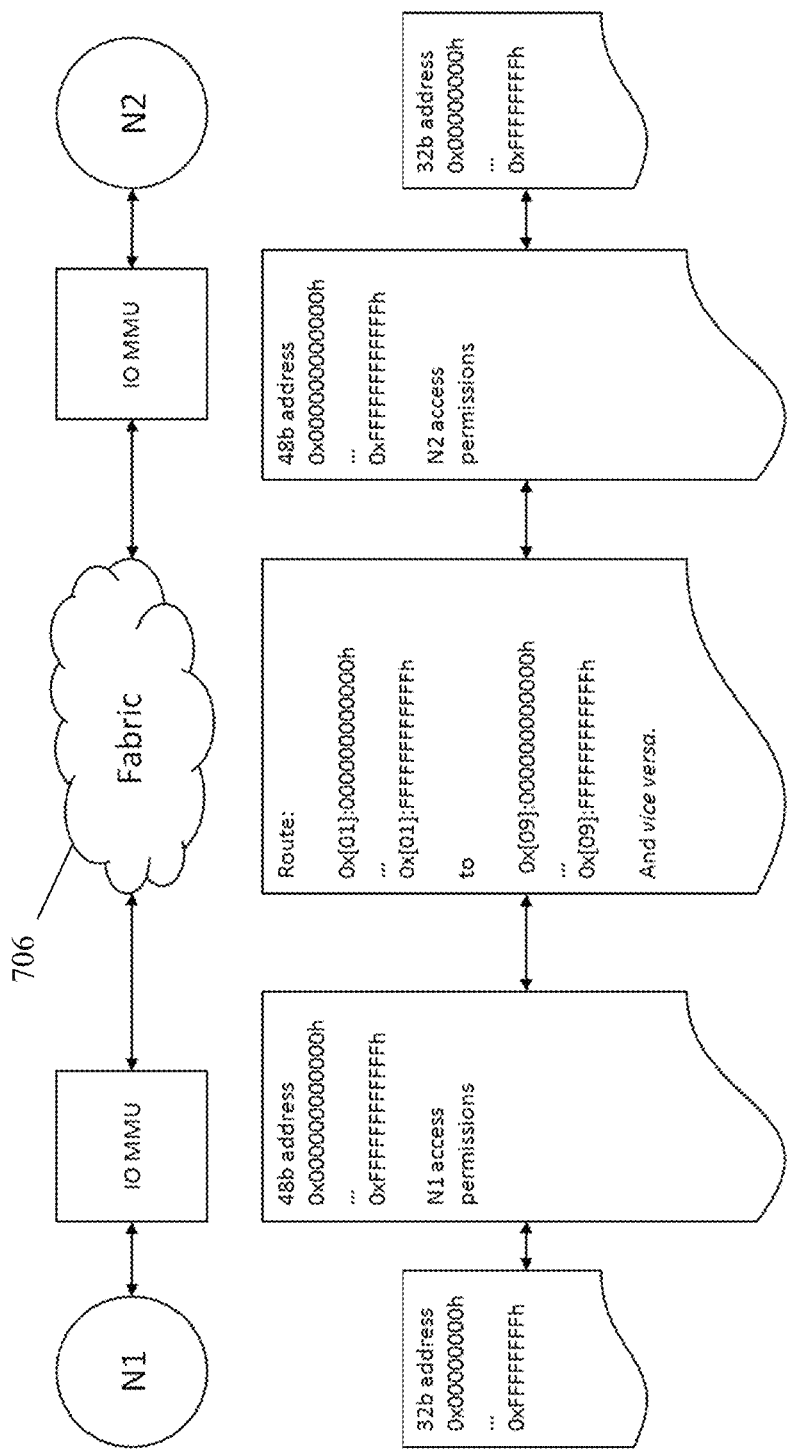
FIG. 11 illustrates one embodiment of a memory map demonstrating the functional split between the IO MMU and the fabric circuit switched memory mapping.

FIG. 11 illustrates one embodiment of a memory map demonstrating the functional split between the IO MMU and the fabric circuit switched memory mapping. As previously noted, traditional PCIe memory maps had two functions: (i) translation of virtual memory addresses to physical memory addresses (and vice versa), and (ii) access control over physical memory addresses (i.e., which addresses can been accessed.) In contrast, as shown in FIG. 11 these two functionalities are bifurcated into the Fabric Manager's memory map and the IO MMU for each of the processors.

Specifically, as shown in FIG. 11 a processor (0x01h) shares a memory space with another processor (0x09h) in the fabric manager. Functionally, the fabric manager mirrors the memory ranges at 0x01h and 0x09h to one another, thus writes from one processor are directly memory mapped to the other processor. More directly, any access from the 0x01 prefixed processor into the fabric's memory map is mirrored into the corresponding 0x09 prefixed processor memory map (and vice versa).

However, each processor maintains control of its own IO MMU. The IO MMU for each processor defines the extent of the memory map that is externally exposed to the fabric for direct memory-mapped access. In this manner, certain ranges may be read-write, read-only, write-only, neither read-write, etc. As a result, even though the both processors have memory mapped access to the entire other processor's memory range, each processor internally controls the extent to which access is permitted.

The exemplary Fabric Manager (FM) entity is in one embodiment a distributed application that inter alia, manages status, topology, and provides information to clients regarding how one node within the fabric can access another.

Figure 12:
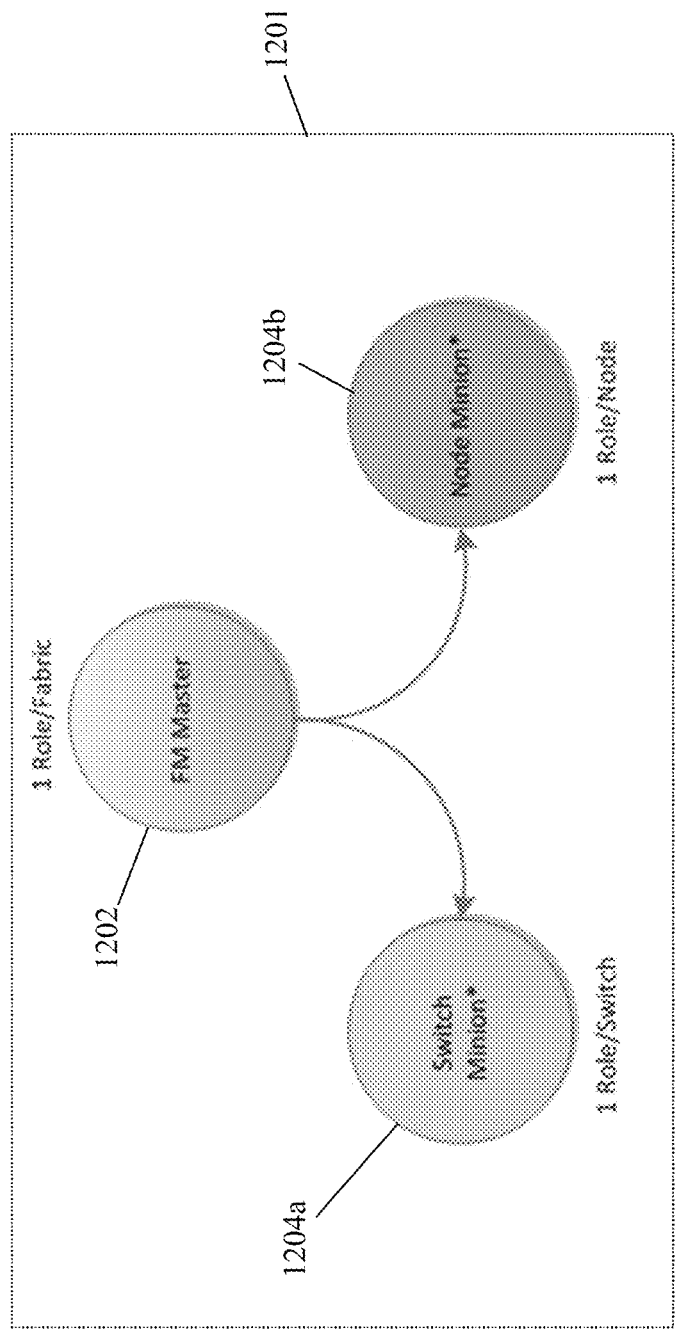
FIG. 12 illustrates an exemplary embodiment of an FM configured under a "Master and Minion" paradigm according to the present disclosure.
Figure 13:
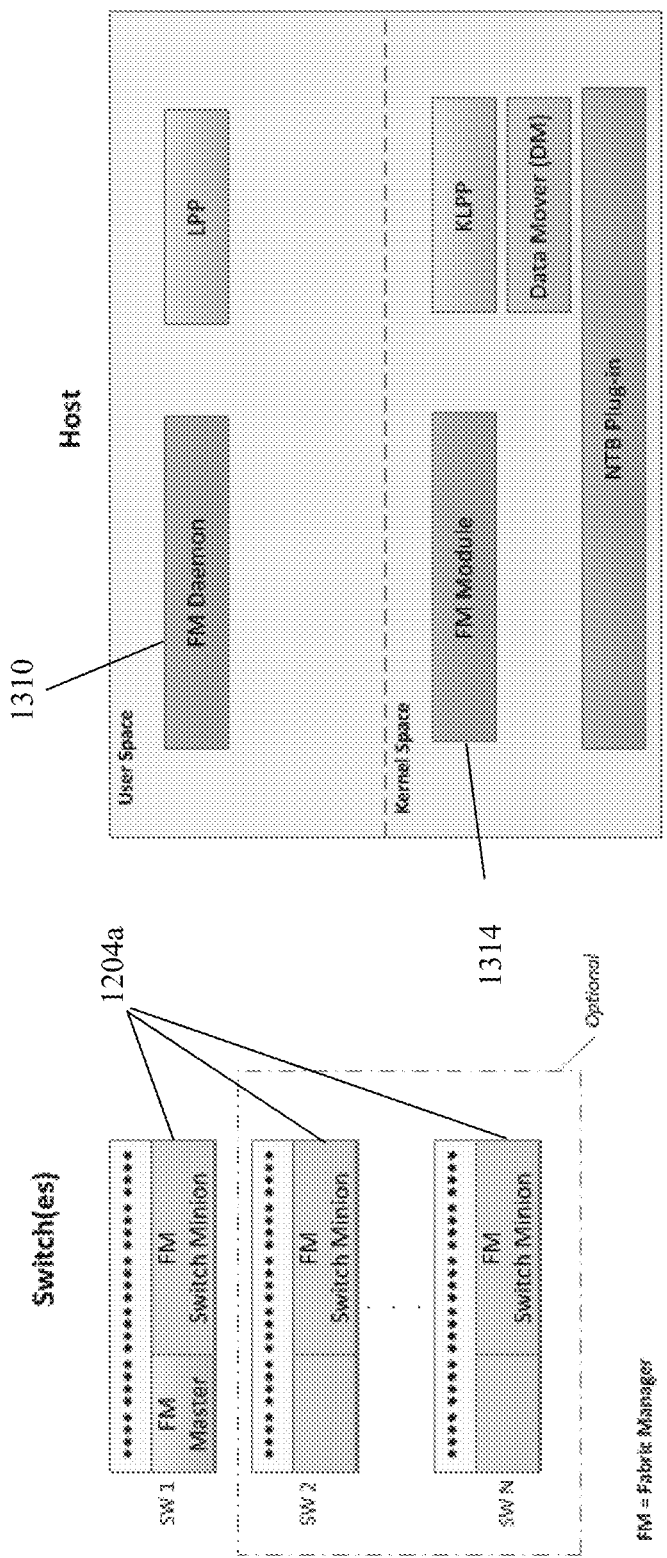
FIG. 13 illustrates an exemplary embodiment of a host software architecture and switch FM master/minion configuration according to the present disclosure.

As shown in FIG. 12, the exemplary embodiment of the FM 1201 works under a "Master and Minion" paradigm in which one program running on a switch assumes the role of the Master 1202, while the others (Minions 1204a, 1204b) carry out its instructions and report results.

In one implementation, one FM Master 1202 controls the entire fabric 706 with the help of its Minions 1204a, 1204b. Minions may reside on both switches 1204a and nodes 1204b (hosts), handling different responsibilities depending upon the role of the entity upon which they reside.

The FM Master 1202 communicates with external actors and with its Minions within the fabric. A Switch Minion 1204a, in general, handles direct interaction with the local switch hardware. A Node Minion 1204b, in general, handles host interaction with the fabric by registering and responding to events and commands issued by the master. The Node Minion in one implementation runs on a host as a daemon, and in this case is also known as the FM Daemon 1310.

A kernel module (the FM Module 1314) also resides on the node and acts as a conduit between kernel space and user space. It provides interfaces to the FM Daemon, the KLPP and NTB Plug-in modules. The FM module also owns and maintains the Address Resolution Table, which resides in kernel space. See FIG. 13.

Figure 14:
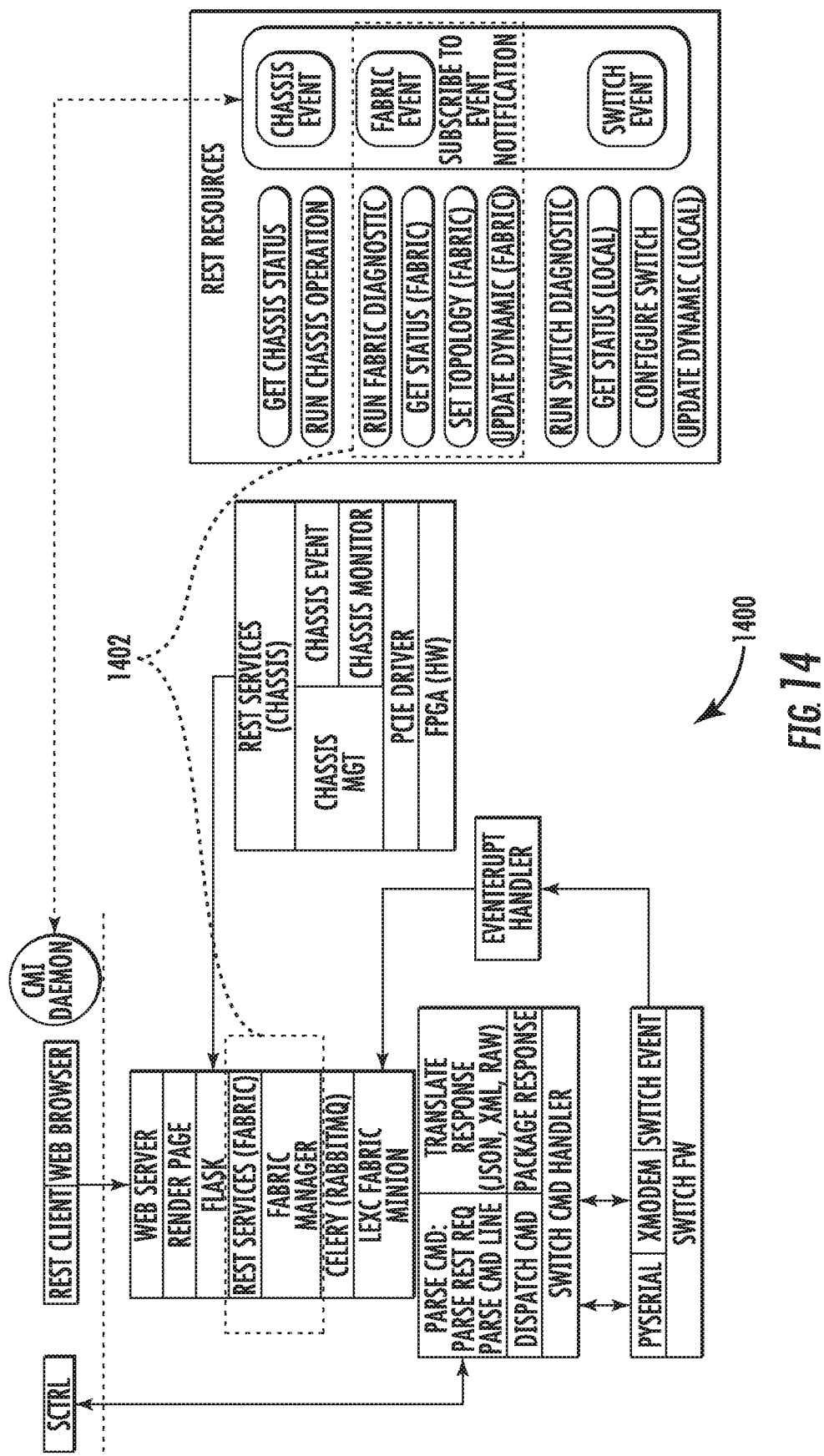
FIG. 14 illustrates an exemplary embodiment of a REST-based software stack architecture according to the present disclosure.

In the exemplary embodiment, the Fabric Manager switch programs 1402 sit as a central component of the architecture 1400 shown in FIG. 14. Action begins with: (i) a Command, (ii) a Fabric Event, or (iii) an incoming message from an FM Minion.

The Fabric Manager Master 1202 may reside on any inventive switch, although once a Master Role has been assigned, it persists until a new topology is instantiated and the current Master relinquishes its role (e.g., at the request of an authenticated administrator).

Figure 15:
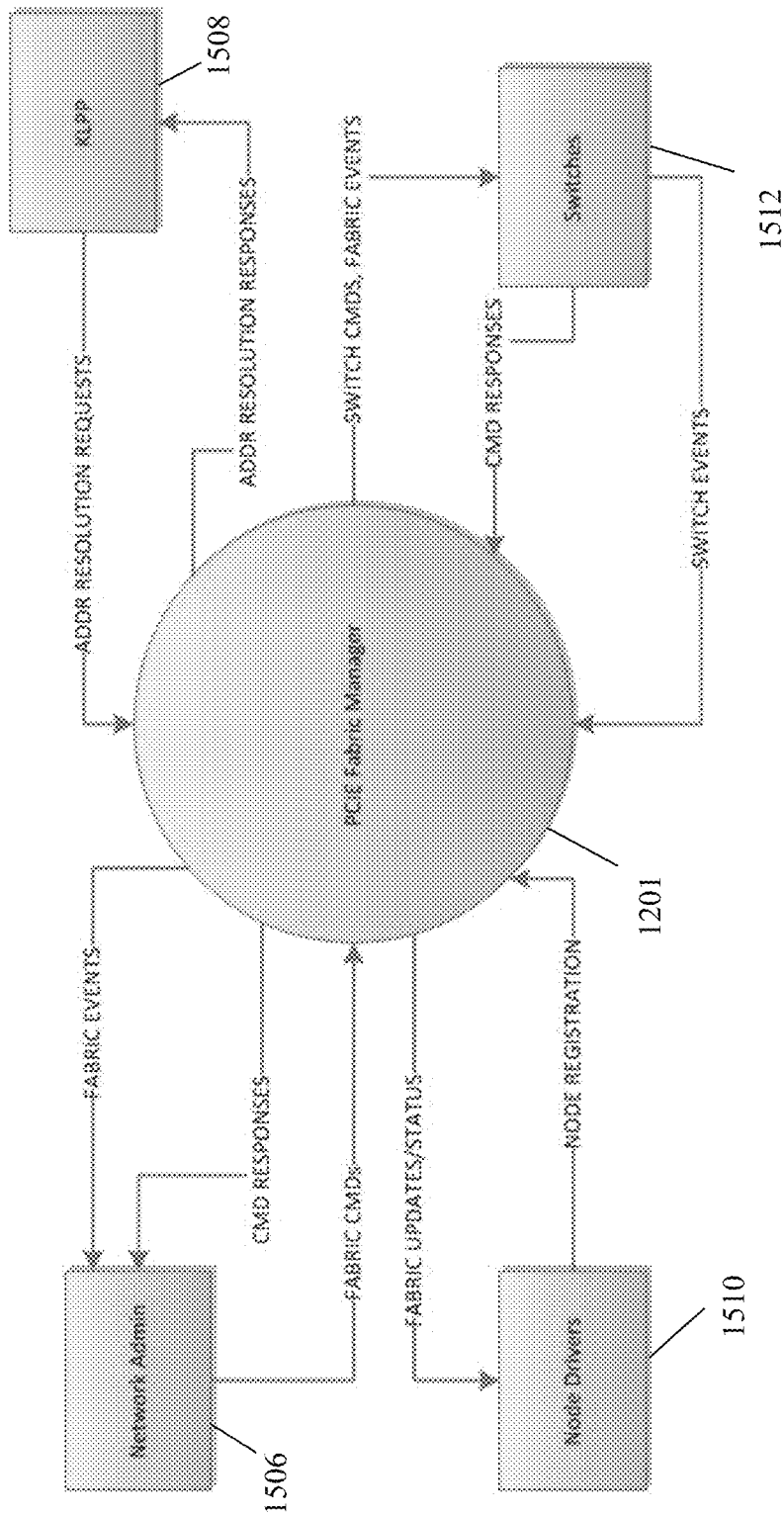
FIG. 15 illustrates an exemplary FM context according to the present disclosure.

The context in which the exemplary PCIe-based Fabric Manager entity 1201 operates is illustrated in FIG. 15.

1. The Fabric Manager (FM) entity 1201 acts as the administrative interface to the inventive fabric, receiving commands from an administrative operator 1506 and returning results. The FM 1201 also posts events for which the administrator 1506 has subscribed. These are used to keep the administrator apprised of the system's health or any changes that occur affecting the overall system.
2. The libfabrics KLPP Driver 1508 uses the Address Resolution Service provided by the FM 1201.
3. Node drivers 1510 register their nodes (see e.g., N1 and N9 in FIG. 9) with the FM 1201, and receive fabric updates and status packets that keep each node abreast of the health of the fabric and other nodes that are available for interaction.
4. The FM 1201 issues commands to switch hardware 1512 for configuration, diagnostic operations, status queries, and dynamic configuration. The FM also posts fabric events to Minions 1204a running on each switch 1512, and receives switch events reported by those Minions.

In general, messages move between the Master Fabric Manager (FMM) 1202 and its Minions, both Node Minions 1204b and Switch Minions 1204a. Messages are sent over an Ethernet Network using for instance established control protocol(s).

Fabric Manager Message Flow—

Figure 16:
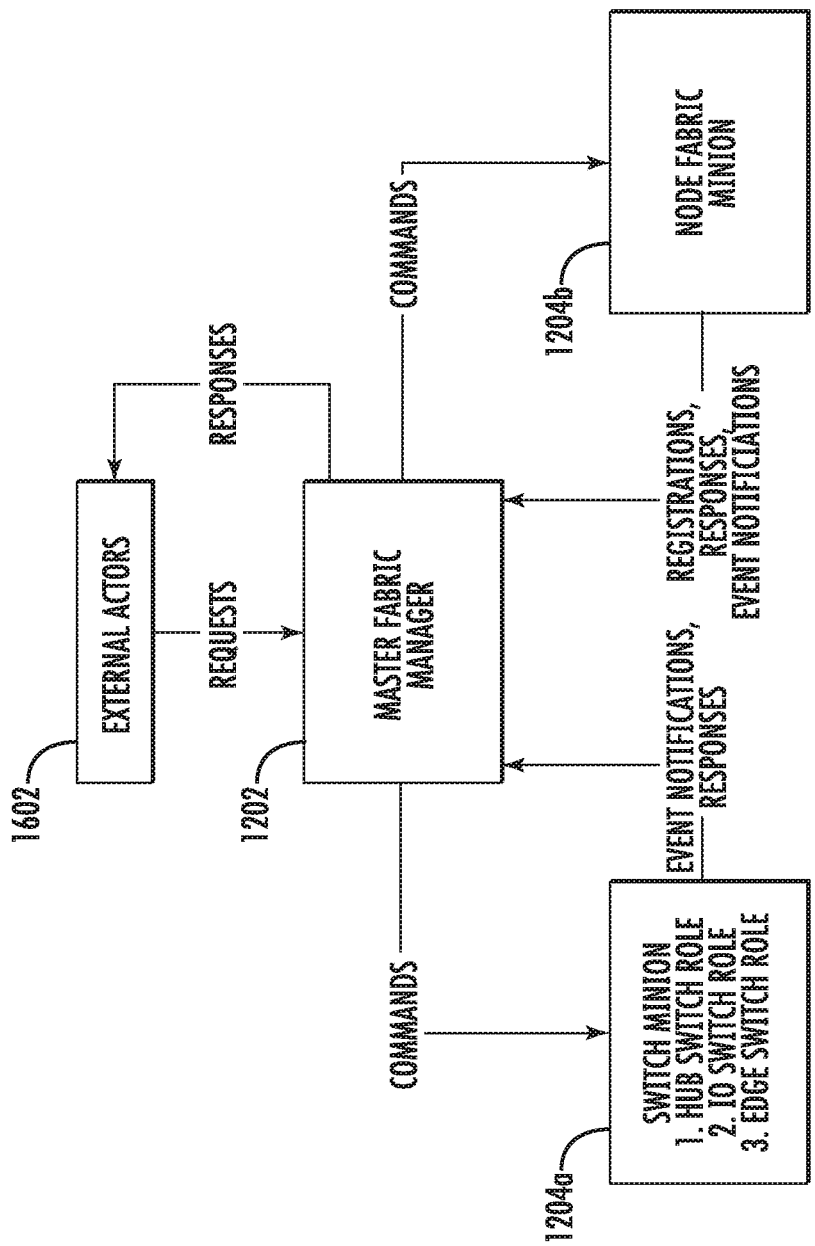
FIG. 16 illustrates an exemplary FM Master/Minion signaling logical flow according to the present disclosure.

As FIG. 16 illustrates, external requestors 1602 make requests of the FMM 1202 which responds in kind. The control protocol has timeout mechanisms built in, and if a request operation times out, the FMM responds with an error response. If another error is encountered during the processing of a request, the FMM indicates the nature of the error condition within its error response.

The FMM 1202 sends commands to its Minions 1204a, 1204b which each respond in kind with command completion packets. Each packet sent contains a version of the TR, which the FMM uses to update its master copy. Switch Minions send Event Notifications to the FMM whenever a switch event is detected. The FMM decides how to act upon such events. For instance, the event may need to be propagated to other entities within the fabric, or perhaps it requires a status update to the Master TR, or perhaps it simply needs to be reported.

Node Minions 1204b primarily register themselves with the FMM after initial boot when they join the fabric. They respond to commands and send command completions back to the FMM.

Address Resolution—

Figure 17:
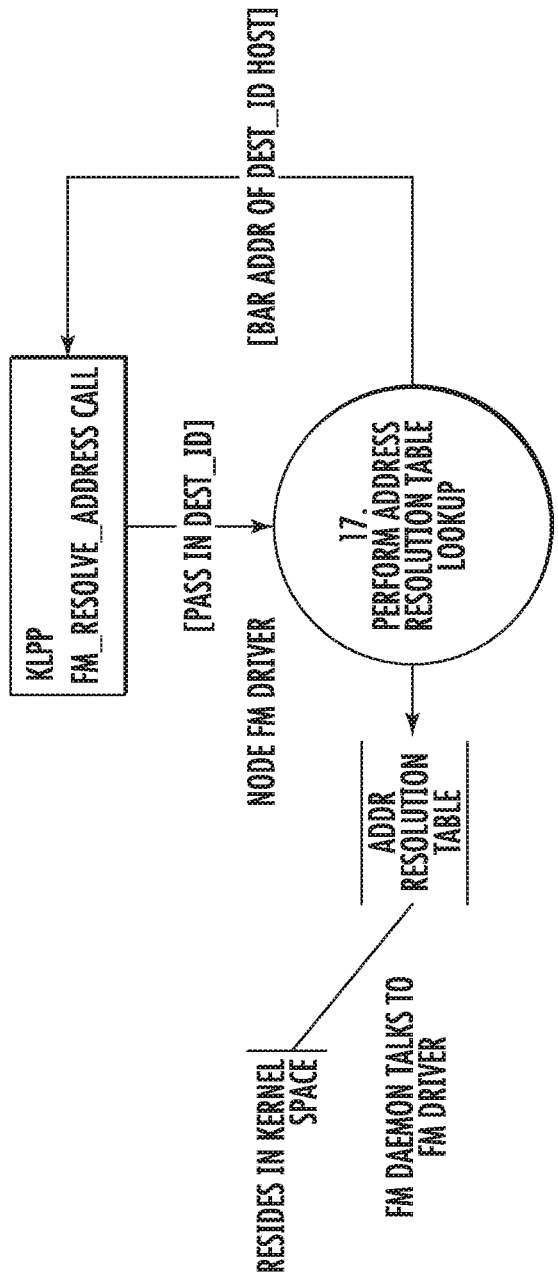
FIG. 17 illustrates an exemplary FM address resolution procedure according to the present disclosure.

A primary function that the overall Fabric Manager entity 1201 performs is Address Resolution, as shown in FIG. 17.

Address Resolution occurs via a single API call from the KLPP driver 1508 to the FM Driver. The FM driver uses the Address Resolution table, which resides in Kernel Space and is maintained in response to Node Discovery and Removal Events.

The return of the FM_RESOLVE_ADDRESS call is an integer (u64) value corresponding to the BAR address of the destination host. In the exemplary implementation, the IOVA Base Address of the local host will be returned when the localhost id is the target.

If the Address Resolution Table does not have an entry for the requested Destination_ID, the call returns an ERROR.

This mechanism prevents in-band communication to be established between a source and that supposedly non-existent destination.

Startup Walk-Through—

In the exemplary startup scenario, all switches are powered on. The individual switch controllers boot and load Minion and Master processes as applicable. Each switch may also include a means for individual configuration.

Figure 18:
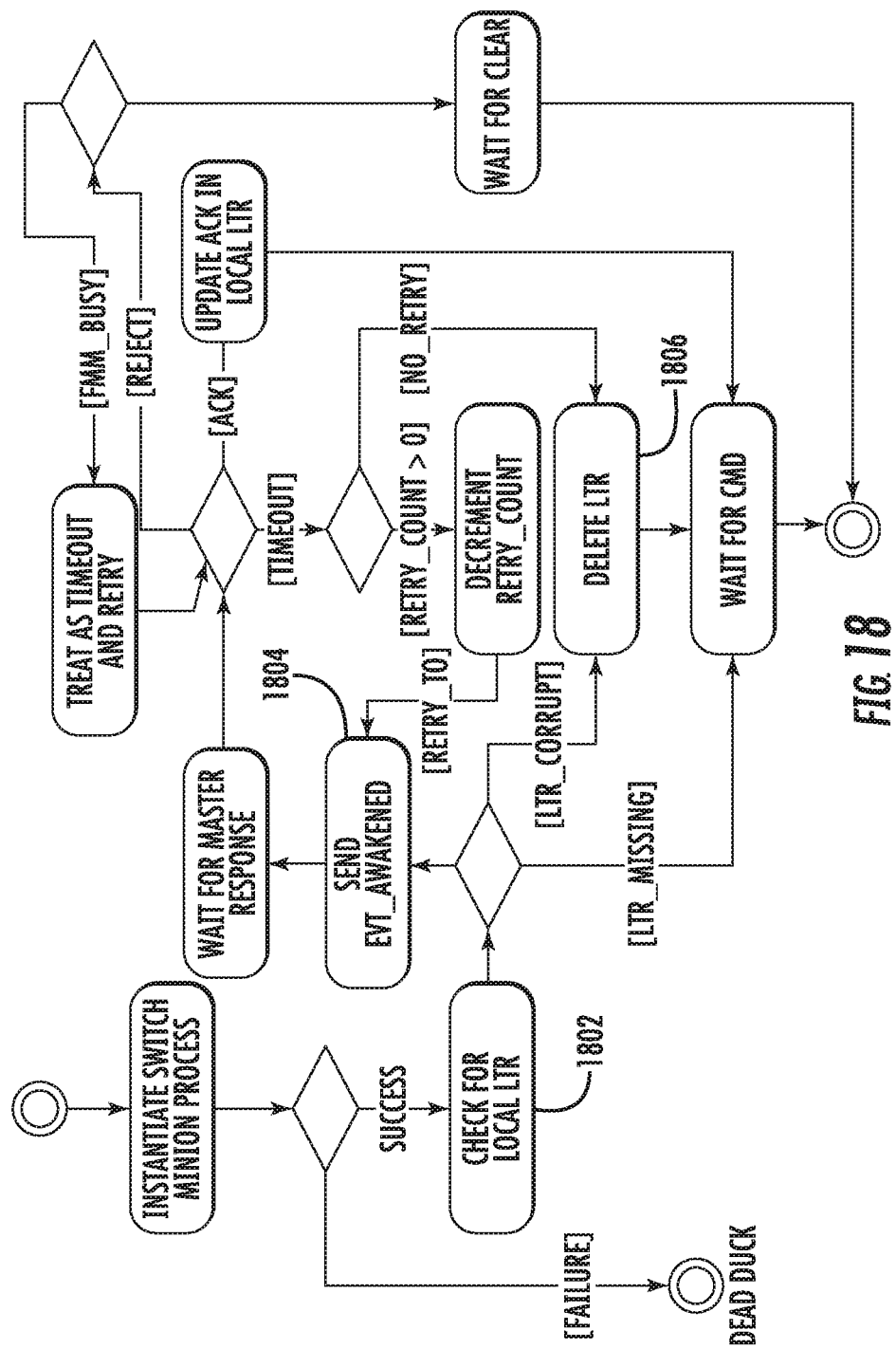
FIG. 18 is a state diagram illustrating one embodiment of a wake-up procedure for a Switch Minion according to the disclosure.

It is assumed that each Minion can locate the presumed Fabric Manager Master 1202, either through e.g., via DNS lookup or similar, or by a configuration file that specifies the IP address of the FM. It is assumed that part of the Minion instantiation process is to set up the message transport over the designated bearer (e.g., Ethernet) between Minion and Master. Node Minions 1204b follow a slightly different process since it is assumed that the topology is up and running before they check in. FIG. 18 illustrates one embodiment of a wake-up procedure for a Switch Minion 1204a according to the disclosure.

As shown in FIG. 18, if the Minion process fails to instantiate, an administrator logs onto the switch and resolves the problem, or calls support for assistance. Otherwise, the first sub-process is to check for the presence of a local TR (e.g., a local Lex TR or LTR) per step 1802.

If the TR is missing, the switch behaves as if it is uninitialized with respect to the topology, and waits for the Master 1202 to issue a command. If the TR is determined to be corrupt, it is deleted and the Minion again waits for the Master's command. Otherwise, the Minion sends an EVT_AWAKENED event to the Master (step 1804) and waits for the Master's response.

The Minion can/will retry sending the EVT_AWAKENED event (up to a fixed limit if needed). If that limit is reached, the Minion deletes its TR (step 1806) and waits for a command from the Master.

In the normal case, the Master will acknowledge (e.g., sends an ACK) the EVT_AWAKENED event. In response to the acknowledgement, the minion updates its letter and waits for additional commands. If the Master rejects the EVT_AWAKENED event, the error is reported, and the administrator must intervene to clear the problem. If the Master is BUSY, the Minion behaves as if a timeout occurred and attempts to retry.

Normal Fabric Manager Tasks begin after a topology has been instantiated. When powering up the system, the FM Master attempts to validate the current topology, which is described by the TR residing on the Master. If it fails, errors are logged and reported. An administrator is expected to CLEAR the topology to deal with most errors. In one implementation, this entails logging into the offending components and clearing the local TR, such as with a CLEAR command. When finished, the administrator issues a new SET_TOPOLOGY command and the FM Master starts the instantiation process from scratch.

Figure 19:
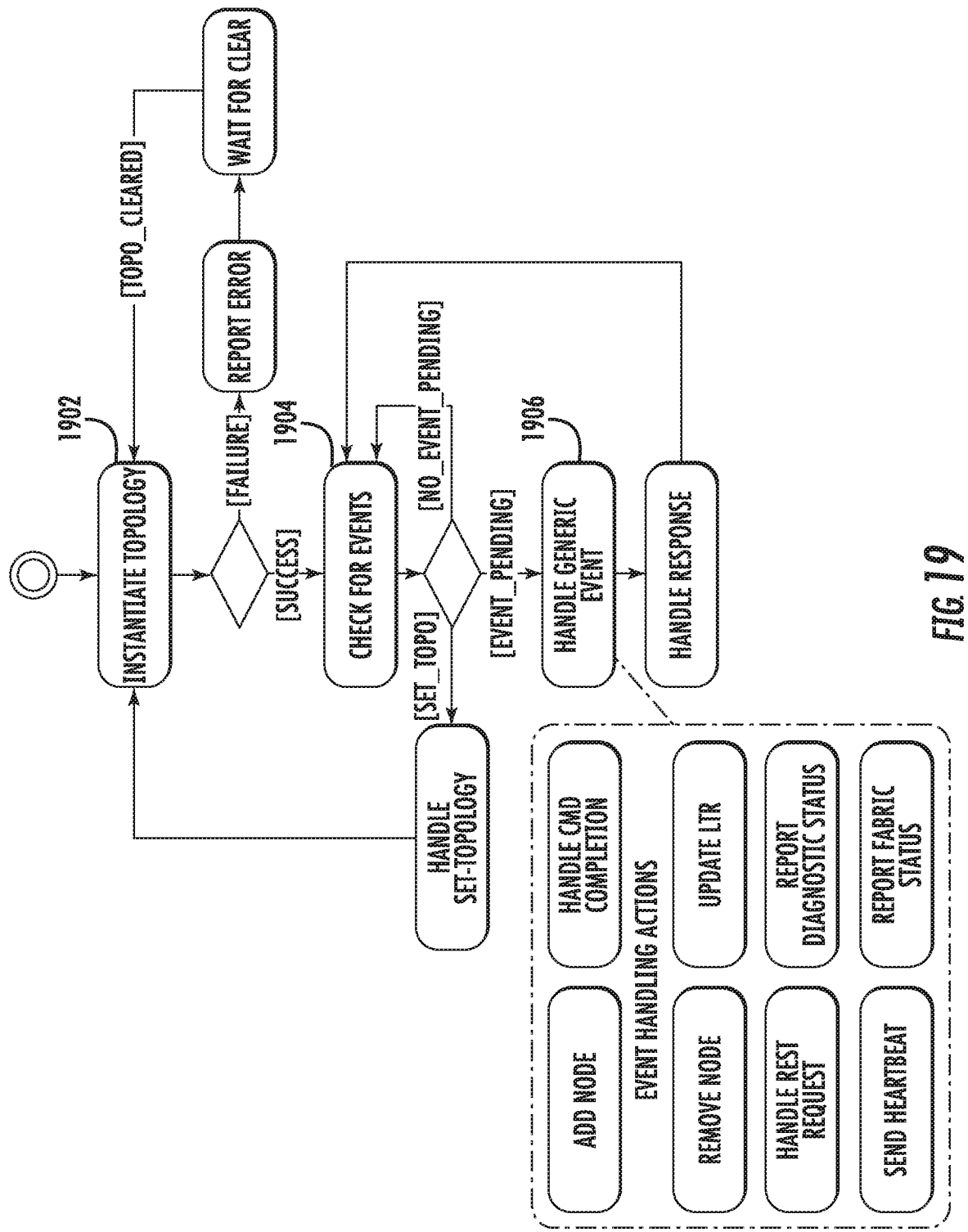
FIG. 19 is a state diagram illustrating one embodiment of a FM instantiation procedure according to the disclosure.

FIG. 19 shows one embodiment of the Fabric Manager Master 1202 instantiation activity. As shown, the Fabric Manager Master attempts to instantiate a topology (step 1902). This is the topology requested by a new SET_TOPOLOGY command, or the previous topology in the case of power-on reset. A failure might occur due to a corrupt or missing TR on any of the topology minions or Master. Alternatively, it might occur if a component is not assigned to the position in which it currently resides. Errors are reported, and the FM Master waits for the error condition to be corrected, and to be told to instantiate a topology again.

Once the topology has been successfully instantiated, the FM waits for events (step 1904). When it encounters an event, it handles it. If the event is a new SET_TOPOLOGY request, the FM begins the instantiation process all over again. Otherwise, it handles the event per step 1906.

A typical event after instantiation would be that of a NODE_REGISTRATION. In response, the FM adds the node and updates the fabric records while notifying entities of the change. Another event might be a Request, which the FM handles before sending a response to the client. A heartbeat interval might elapse causing the FM to increment the TR serial number and send out a FABRIC_UPDATE.

In sum, the exemplary FM is configured to handle a variety of different types of events and send responses to relevant entities or processes (e.g., subscribers and other stake-holders) as necessary.

Fabric Manager Topology Record (TR)—

At its core, the inventive Topology Record (TR) is a data structure that describes a fabric topology. Since configurations are, in the exemplary implementation, practically static, much is known about the topology in question. Some details, such as which hosts connect to particular ports, are variant, and the TR stores the current assignments for these variant entities.

One can analogize a letter (TR) as a collection of paragraphs, each of which describes some important aspect of the associated topology. In the exemplary implementation of the present disclosure, these "paragraphs" occur in one of six forms called descriptors. Each of these descriptors includes a type field that identifies the descriptor, as shown in Tables 1-5 below.

TABLE 1

TR Descriptors

| | |
|---|---|
| Fabric Properties Descriptors | Contains global information concerning current Fabric Topology. |
| Routing Descriptor | Contains information describing route spellings and status. |
| Switch Descriptors | Contain information pertaining to switch box configuration and the role a particular switch plays within the fabric. |
| Node Descriptors | Contain information pertaining to individual hosts and their connection to the fabric. |
| Dynamics Descriptor | Contains information concerning any dynamic modifications to the topology i.e. binding or bifurcation. |
| Zone Descriptors | Contains information describing zoned connectivity among nodes. |

TABLE 2

Fabric Properties Descriptors

| | |
|---|---|
| TR Version | The TR uses this field to track updates throughout the fabric. It is an integer (u32) serial number that is incremented each time an update is broadcast across the fabric. |
| Fabric Update Timestamp | This field contains a timestamp for the last Fabric Update |
| Fabric Manager Master | The hostname and switch-name of the current Fabric Manager Master is recorded here along with its IP address. |
| Current Task | This field describes the current task being serviced, or NONE if no task is pending. |

TABLE 2-continued

Fabric Properties Descriptors

| | |
|---|---|
| Last Task Result | This field contains the result of the last task serviced. |
| Topology | The name of the currently selected topology. |
| IOVA Size | This is the byte size of the IOVA range on all nodes. This constant endures for the life of a topology. |
| MSI-X Size | This is the byte size of the MSIX table that exists on all nodes. This constant endures for the life of a topology. |
| Fabric Knobs | This structure contains any other settings that need to persist for the management of the Fabric. Timer reset values are stored here, for example. As the FM gets more complex, Boolean values that control whether or not retries are allowed for certain operations, and whether dynamic configurations should persist, etc. may be used. |

TABLE 3

Routing Descriptor

| | |
|---|---|
| Routing Table | List of Routes statically assigned. |
| Route Status Table | True or False indication of a validated connection between connection points. |
| Connection Point Cross-reference | In this document, a cable is indicated in route spellings as 'S<n>' where <n> is the numerical designation for that cable connection. A cabled connection is really a pairing of switch ports. If S1 is connected between Port 16 on switch I1 and Port 23 on switch E2, the cable S1 is shown in the route-spelling. This structure provides a quick lookup for connection points, relating one physical port to the other. |
| Connection Valid | TRUE if a connection point is active with LINK_UP and has been validated, FALSE otherwise. |
| IOVA Translation Window Table | This information is furnished to the NTB-Plugin. In one embodiment, an algorithm extracts this information from data already stored within the TR. BAR Number, BAR Segment Size, BAR Segment Index for each Peer from each Source's perspective. |
| MSI-X Table Info | Same as above, but for MSI-X |
| NTB Control Plane Information TABLE | For Each Peer:<br>1. Shared Memory Window Offset (Dynamic): The offset within the peer's translation window where the NTB control plane structure resides.<br>2. NTB Control Plane MSI-X 64-bit address offset and data (Dynamic): This is the MSI-X data that is needed by each peer to be able to send a control plane interrupt to this host. |
| Transport Memory Window Count | Number of available memory windows. |
| Transport Memory Window MAX Size | MAXIMUM memory window size. The local host can dma_alloc_coherent and publish a window smaller than this number. |

TABLE 4

Switch Descriptors

| | |
|---|---|
| Switch GUID | ID string for the switch. May contain other switch info stored in the vendor record within the switch. Unique across the fabric. |
| Fabric Role | The role this switch is assigned within the Fabric.<br>I<n>: IO Switch<br>E<n>: Edge Switch<br>H<n>: Hub Switch |
| Hostname | The Hostname of the switch controller on the switch. |
| IP Address | The Switch IP Address of the switch controller on the switch. |
| Master | TRUE if this switch in the Master, FALSE otherwise. |
| Routes | List of Fabric Routing Table entries in which this switch participates. |
| Terminal NT List | A list of Terminal NT Ports the switch owns. Each entry contains: Egress Physical Port Number, Destination Hostname, and Destination Partition. |
| Host List | NONE if no host is directly connected to the switch, otherwise, each entry in the list contains: Hostname, Assigned Port Number, Link Status. |
| Configuration Name | The .pmc Config filename of the configuration programmed in this switch. |
| Configuration CRC | The crc for the configuration .pmc file. |
| Minion Acknowledged | TREE when minion has been acknowledged by and is in communication with the master. FALSE otherwise. |

In the exemplary embodiment, there is one descriptor for each node in the topology. For Hub switches, LUT entries and Crosslink Direct Windows are statically programmed and as such are part of the exemplary switch configuration.

TABLE 5

Node Descriptors

| | |
|---|---|
| Node Registered | Yes/No state of a node's registration status for the fabric. |
| Node GUID | A unique fabric endpoint designator to describe a node and its position within the fabric. This identifier is a string which is globally unique. The identifier used here and the identifier that is used by the LPP must be identical. The reason for this is that LPP informs |

TABLE 5-continued

Node Descriptors

| | |
|---|---|
| | KLPP of present machines. KLPP merely pass this ID on to the FM when asking for address resolution. |
| Node Name | Hostname for the node being described. |
| IP Address | The IP Address for the node being described. |
| Node Status | A set of flags denoting fabric status properties of the node. |
| Switch Name | The name of the switch to which the node connects directly. |
| Switch Port | The physical port number to which the switch connects directly. |
| Panel Port | The front panel port number translation of the Switch Port. |
| NTB-NIC GUID | Identifies the NT-EP through which this node is reached. This is a fabric globally unique identifier that is constructed with the GUID of the switch hosting the NT-EP, the NT-EP physical port number, and its NIC index. |
| Switch Info | The identifying switch GUID read from the local switch used to validate this host's assigned connection. |
| IOVA Base Address | The Base Address of this node's IOVA space |
| Shared Memory Window Offset | This node's NTB control plane shared memory window within the IOVA space. |

In the exemplary embodiment, there is one descriptor for each node in the fabric.

TABLE 6

Dynamics Descriptors

| | |
|---|---|
| Bifurcation List | List of Dynamic Bifurcation Instructions |
| Binding List | List of Dynamic Port Binding/Unbinding Instructions |

TABLE 7

Zone Descriptors

| | |
|---|---|
| Zone Name | Name of this zone definition. |
| Node List | List of Node IDs of Nodes belonging to this Zone. |

In the exemplary implementation, the Default Zone is an all-access zone, meaning each node can access every other node in the fabric. If zone descriptors are present, however, they replace the Default Zone, and explicitly describe which entities can access other entities of the fabric. In one implementation, there is one zone descriptor for each defined zone, and the descriptors are contained in a Zone Descriptor List.

Topology Components—

In the exemplary PCIe-based embodiments of the disclosure, a topology can be thought of as the part of the PCIe tree that includes switching hardware. A Link Card furnishes a connection between a Host and the (inventive) switch. Multiple switches can be placed in the topology to scale up service; e.g., for more than 24×4 ports.

Figure 20:
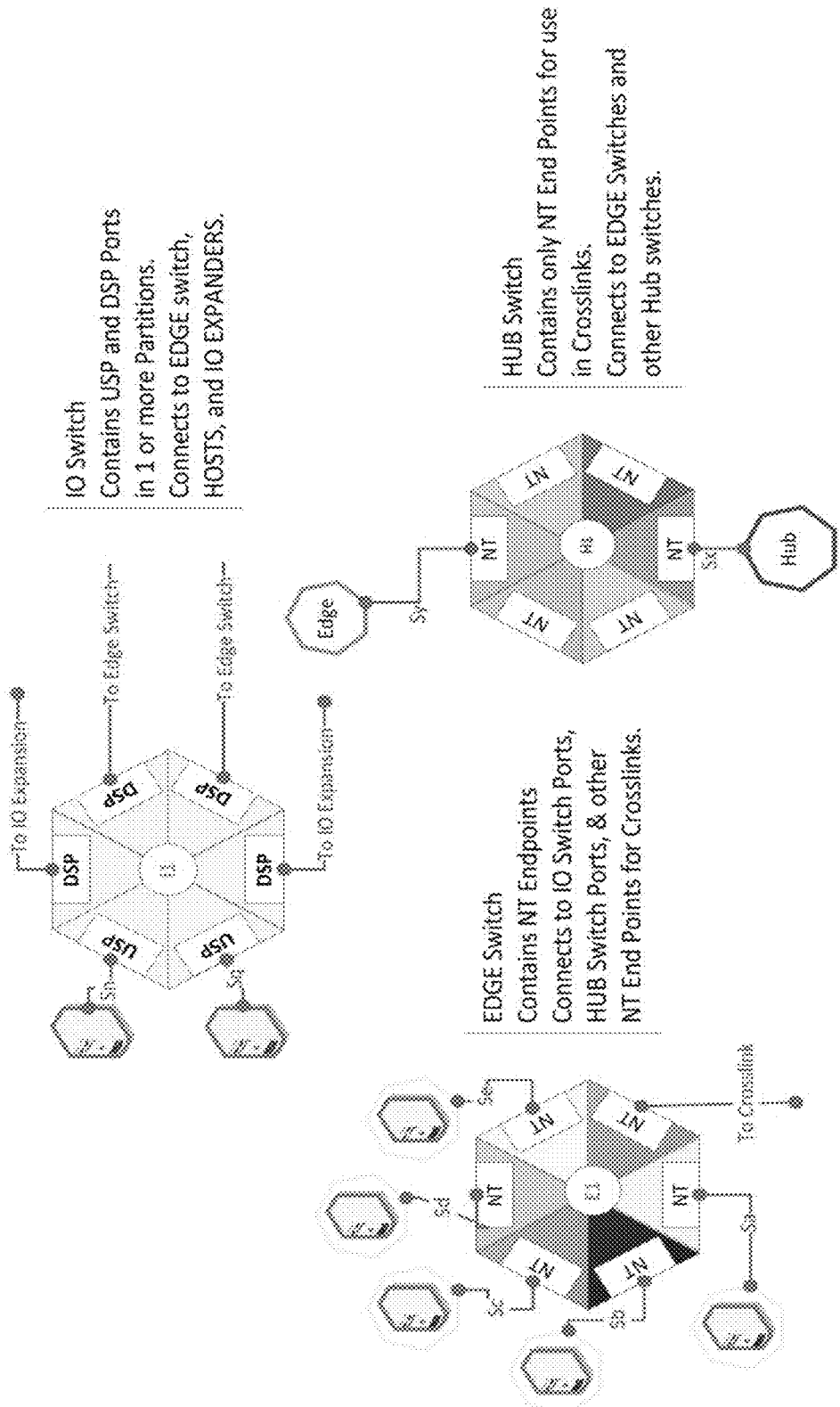
FIG. 20 is a logical block diagram illustrating one embodiment of a multi-switch topology according to the present disclosure.

In this disclosure, multi-switch topologies are discussed for which switches are used to function in one of three general roles: (i) IO Switch, (ii) Edge Switch, and (iii) Hub Switch. These roles are the topology building blocks used to create complicated fabrics. The TR stores information about individual switches and the roles they play, which is furnished by an administrator. See FIG. 20. Note that meanings for the acronyms used in FIG. 20 are contained in Appendix I hereto.

The IO Switch Role (i) allows Hosts and IO Expansion devices or even stand-alone endpoints a direct connection. In one implementation, each Partition contains one downstream port (DSP) that is used to connect to an Edge Switch.

The Edge Switch Role (ii) contains only NT (non-transparent) Endpoints, which facilitate communication among hosts whose IO switches are connected to the same Edge Switch or can be accessed over a Crosslink. The Edge Switch operates by analogy somewhat like a railway roundhouse; in much the same way, the ingress NT (non-transparent) Endpoint takes an incoming signal and turns it to the appropriate egress port.

The Hub Switch Role (iii) provides further connectivity and scaling when more than 4 edge switches are required. The Hub manages only Crosslinks, which are connections between externally connected NT Endpoints.

Routing Concepts—

In the exemplary embodiment of the architecture, the Fabric Manager (FM) must manage topology configuration, and supervise the proper construction of routes. A route's spelling can be used as a high level record of implied responsibilities for each switch. It is illustrative to examine what a route is, and how it applies to a particular topology.

Figure 21:
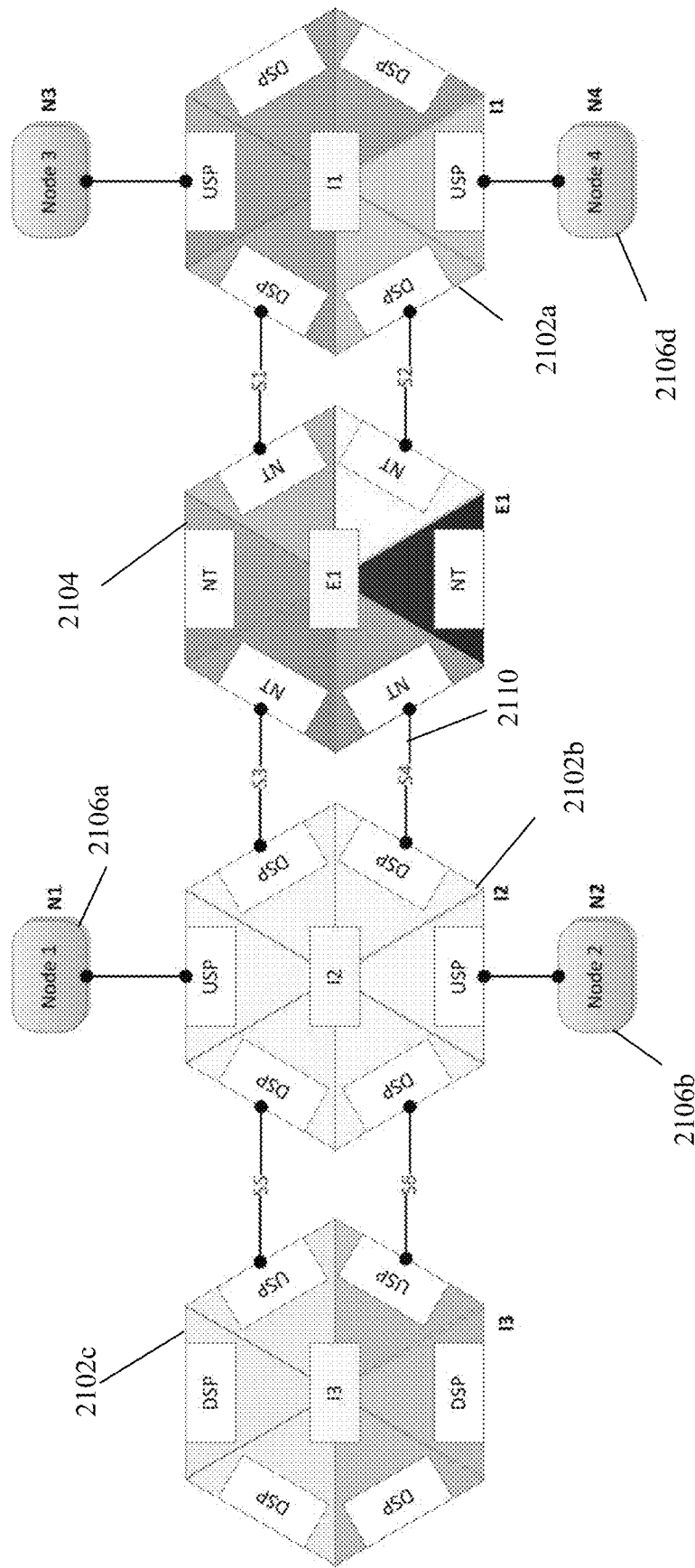
FIG. 21 is a logical block diagram illustrating one implementation of a multi-node, multi-switch topology according to the present disclosure.

The topology shown in FIG. 21 consists of 3 IO Switches 2102, 1 Edge Switch 2104, and end points or hosts 2106 connected to them. Triangular portions in FIG. 21 indicate ports, while colors indicate partitions in which ports reside.

Individual routes are described in terms of ingress and egress points. Each of these is named and labeled as shown in FIG. 21.

In one embodiment, the route from Node 1 (N1) 2106a to Node 2 (N2) 2016b is spelled by simply listing the ingress and egress points in order.

N1 2106a connects to IO Switch 2 (I2) 2102b through a USP ingress port, and connects to Edge Switch 1 (E1) 2104 through the adjacent DSP egress port via socket (cable) S3. The same socket conveys the ingress input to an NT end point on switch E1. The route to this NT EP can be described like this: N1→I2→S3→E1—meaning, N1 ingresses into switch I2, which egresses out through S3, which in turn is the ingress input to E1.

The NT EP accessed through S3 contains the Terminal LUT for host N2, since it is the nearest ingress NT EP along the route to the destination port—N2. The NT EP references the Terminal LUT to perform Address Translation while routing TLP packets from a source host to the destination.

Continuing with the route spelling, consider an exemplary egress from E1 through S4 2110. S4 is an ingress flow to I2 leading up to the USP port that egresses I2 and finds N2. The complete route spelling from N1 to N2 is "N1I2S3E1S4I2N2" read from left to right. Since IO Switch I3 is not involved in the direct route between N1 and N2, it is not part of the route even though some of its ports are downstream of N1 and N2. The Host Routing Table shown below (Table 8) contains routes representing full connectivity for the example Four-Host Cluster Topology shown in FIG. 21.

TABLE 8

Host Routing Table

| Source | Destination | Route Spelling |
|---|---|---|
| N1 | N2 | N1I2S3E1S4I2N2 |
| N1 | N3 | N1I2S3E1S1I1N3 |
| N1 | N4 | N1I2S3E1S2I1N4 |
| N2 | N1 | N2I2S4E1S3I2N1 |
| N2 | N3 | N2I2S4E1S1I1N3 |
| N2 | N4 | N2I2S4E1S2I1N4 |

TABLE 8-continued

Host Routing Table

| Source | Destination | Route Spelling |
|---|---|---|
| N3 | N1 | N3I1S1E1S3I2N1 |
| N3 | N2 | N3I1S1E1S4I2N2 |
| N3 | N4 | N3I1S1E1S2I1N4 |
| N4 | N1 | N4I1S2E1S3I2N1 |
| N4 | N2 | N4I1S2E1S4I2N2 |
| N4 | N3 | N4I1S2E1S1I1N3 |

For full connectivity, the minimum number of routes equals the permutations of the number of nodes taken two at a time. If we consider a particular route to be bi-directional, however, (i.e. N1->N2==N2->N1 reversed), we only need to consider the combinations. Therefore, Table 8 above can be reduced by half, as shown in Table 9.

TABLE 9

Reduced Host-Routing Table

| Source | Destination | Route Spelling | Destination | Source |
|---|---|---|---|---|
| N1 | N2 | N1I2S3E1S4I2N2 | N1 | N2 |
| N1 | N3 | N1I2S3E1S1I1N3 | N1 | N3 |
| N1 | N4 | N1I2S3E1S2I1N4 | N1 | N4 |
| N2 | N3 | N2I2S4E1S1I1N3 | N2 | N3 |
| N2 | N4 | N2I2S4E1S2I1N4 | N2 | N4 |
| N3 | N4 | N3I1S1E1S2I1N4 | N3 | N4 |
| Read Left To Right | | | Read Right To Left | |

A route spelling tells the Fabric Manager (FM) which entities participate within a given route. The FM can use the route spelling as a list of workers it must notify to perform operations involving set-up or tear-down of the route. Route spellings are in one implementation stored in the TR.

It will be appreciated that the term "spelling" as used herein is not intended to connote any requirement or limitation on the format of route descriptive information; such description information can be e.g., numeric, alpha-numeric, symbolic, binary/hexadecimal, or otherwise, consistent with the present disclosure.

Address Translation—

Figure 22:
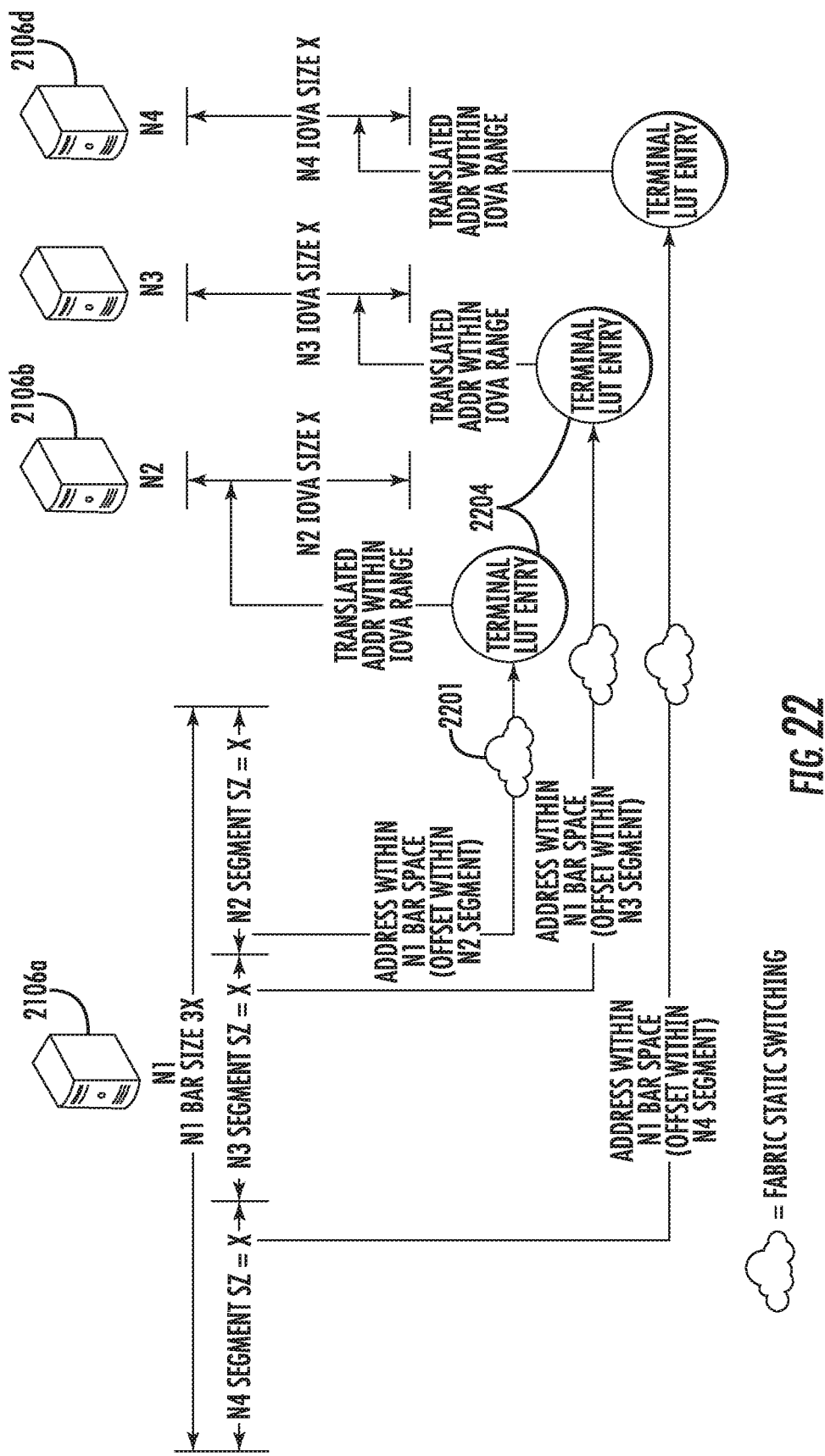
FIG. 22 is a logical block diagram illustrating one implementation of a host BAR (base address register) space segmented into sections that correspond to a remote host's shared memory (IOVA space) according to the disclosure.

In the illustrated embodiment, the inventive Switch Hardware performs address translation along a route to ensure that a PCIe Transaction Layer Packet (TLP) originating from a particular source gets to the intended target. This is facilitated by Lookup Table Entry (LUT) or Direct Window. FIG. 22 shows how a host's BAR (base address register) space is segmented into sections that correspond to a remote host's shared memory (IOVA space). All exemplary topologies ensure that IOVA ranges are uniform in size for all hosts. Therefore, the BAR size for each host is the same as well, as given by Eqn. (1):

$$BAR\_SIZE\_LOCALHOST = IOVA\_SIZE * NUMBER\_REMOTE\_HOSTS \qquad \text{Eqn. (1)}$$

When an access falls within N1's BAR, it makes its way through the fabric topology and is potentially subjected to several intermediary address translations. Eventually, the TLP finds its way to the last ingress NT EP in the route. This is referred to as the "Terminal LUT" because the NT EP uses a Lookup Table Entry (LUT) to locate the proper egress point through which it sends the TLP to continue upstream to the destination host.

In FIG. 22, each cloud icon 2201 represents the fabric prior to reaching the Terminal LUT. Through the cloud, the TLP is potentially subjected to static intermediary address translations. For any given route, a packet will travel through known Crosslinks where they exist, and this routing information can be statically programmed when the topology is instantiated. Exemplary embodiments described herein use Direct Window translations to route traffic through Crosslinks, while LUTs are used at the terminal ingress points to route traffic to the destination memory. The Terminal LUT 2204 provides the translation to address the IOVA range on the destination host. Since the size of the IOVA range matches the size of the source host's BAR section, the offsets within those memory spaces correspond as well in such implementations.

Figure 23:
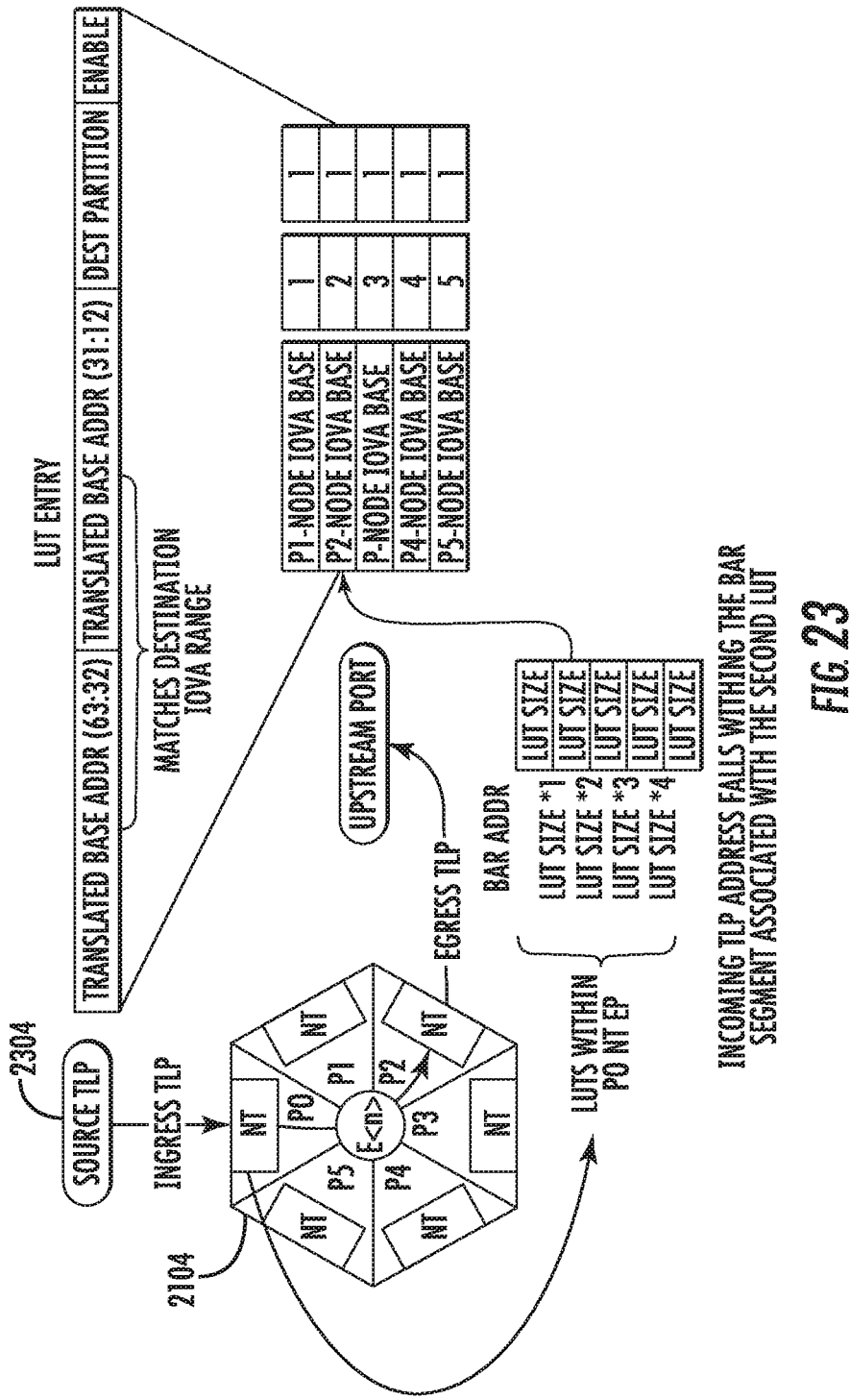
FIG. 23 is a logical diagram showing additional detail regarding an exemplary implementation of NT EP routing of an ingress packet to the appropriate destination by using a LUT according to the disclosure.

FIG. 23 shows additional detail regarding an exemplary implementation of NT EP routing of an ingress packet to the appropriate destination by using a LUT. The Figure illustrates an Edge Switch 2104, which is a fabric switch component containing only NT Endpoints. An exemplary Lookup Table (LUT) entry format contains a 64 bit BASE Address to the destination memory, a destination partition ID, and an enable bit. The address is used to translate the incoming TLP address reference to the actual destination memory address.

As a source TLP (packet) 2304 enters the ingress port, shown above as the NT EP within partition 0 (P0), its destination address falls within a segment of the NT EP's BAR space. Again, since LUTs are uniformly sized, the position within which the TLP destination address falls allows determination of the index used to extract the appropriate entry from the LUT. The example shows an address that falls within the second segment, which corresponds to the second (highlighted) element in the table.

Since the entry is enabled, the address translation base address is used to modify the TLP 2304, and that modified TLP is directed to the target node through the NT EP in partition 2. In effect, the ingress base address is stripped, leaving only an offset, and the egress base address (the IOVA base) is applied. This produces the address within the IOVA block that will be accessed.

Navigating Crosslinks—

Figure 24:
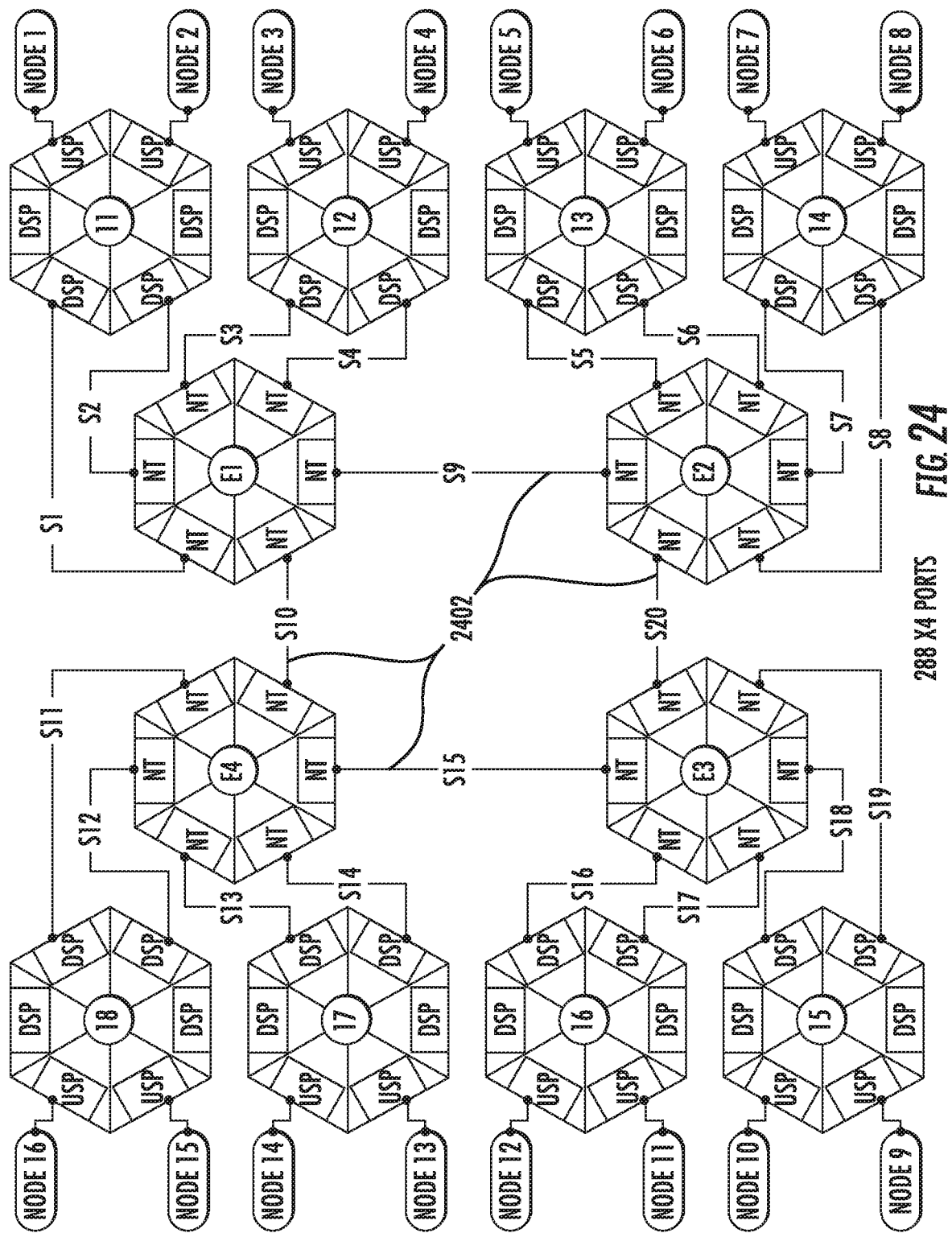
FIG. 24 is a logical diagram showing shows an example topology that uses four crosslinks between two systems.

As mentioned above, a Direct Windows (DWs) are used in one embodiment to navigate Crosslinks, while LUTs are used to fan-out to the actual destination memory space. A DW is like a single, large, LUT Entry. FIG. 24 shows an example topology that uses four Crosslinks 2402. As has been explained, for Node 1 (N1) to access N2, N3, or N4, the S1-NT port uses LUTs to steer traffic toward the appropriate destination NT port. If N1 wants to access any of the other nodes, packets must be routed over one or more Crosslinks.

LUT entries act as individual routing mechanisms in that they target one and only one destination partition. This allows an address match to be routed to the proper destination. However, LUT entries are a limited/finite resource, and a Direct Window is used instead to conserve them. Notice that via the S10 Crosslink of FIG. 24, N16, N15, N14, and N13 can be targeted by e.g., Node 1.

The most direct route (spelling) from N1 to N14 is N1I1S1E1S10E4S13N14. Since S10 is between (and adjacent to) E1 and E4, it is a Crosslink. N1 uses the S1-NT to communicate with the fabric. The S1-NT is set up to use LUTs on BAR-2 to target local NTs that are connected to other IO Switches (S2, S3, and S4); note that using BAR-2 & BAR-3 in this manner assumes 32 bit addressing—when using 64 bit addressing, the LUT and DW can be combined into BAR-2.

The S1-NT is also set up to use a DW on BAR-3 to target the S9-NT, and it uses another DW on BAR-4 to target the S10 Crosslink. In one embodiment, this BAR setup information is stored in the individual switch configuration, which emphasizes the importance of a particular switch knowing its role and position within the fabric.

N1 targets N14 by writing into the appropriate segment within BAR-4. According to the route spelling above, N14 is accessed over the S10 Crosslink that BAR-4 targets. The S1-NT discovers that a BAR-4 access has a DW translation and immediately steers the traffic toward the S10 NT.

In a sense, a DW is a packed Lookup Table. BAR-4 is virtually segmented in the same way as BAR-2, which deals with LUT entries, is segmented. Each segment corresponds to a remote host's IOVA space. The DW acts like a packed LUT, which finally gets unpacked at the terminal ingress NT Endpoint. The result is that the DW allows one element to take the place of many. Without the DW, an individual LUT entry would be required for each remote node the source could target across the Crosslink, and hence the DW greatly enhances the architecture in terms of, inter alia, ability to scale.

Figure 25:
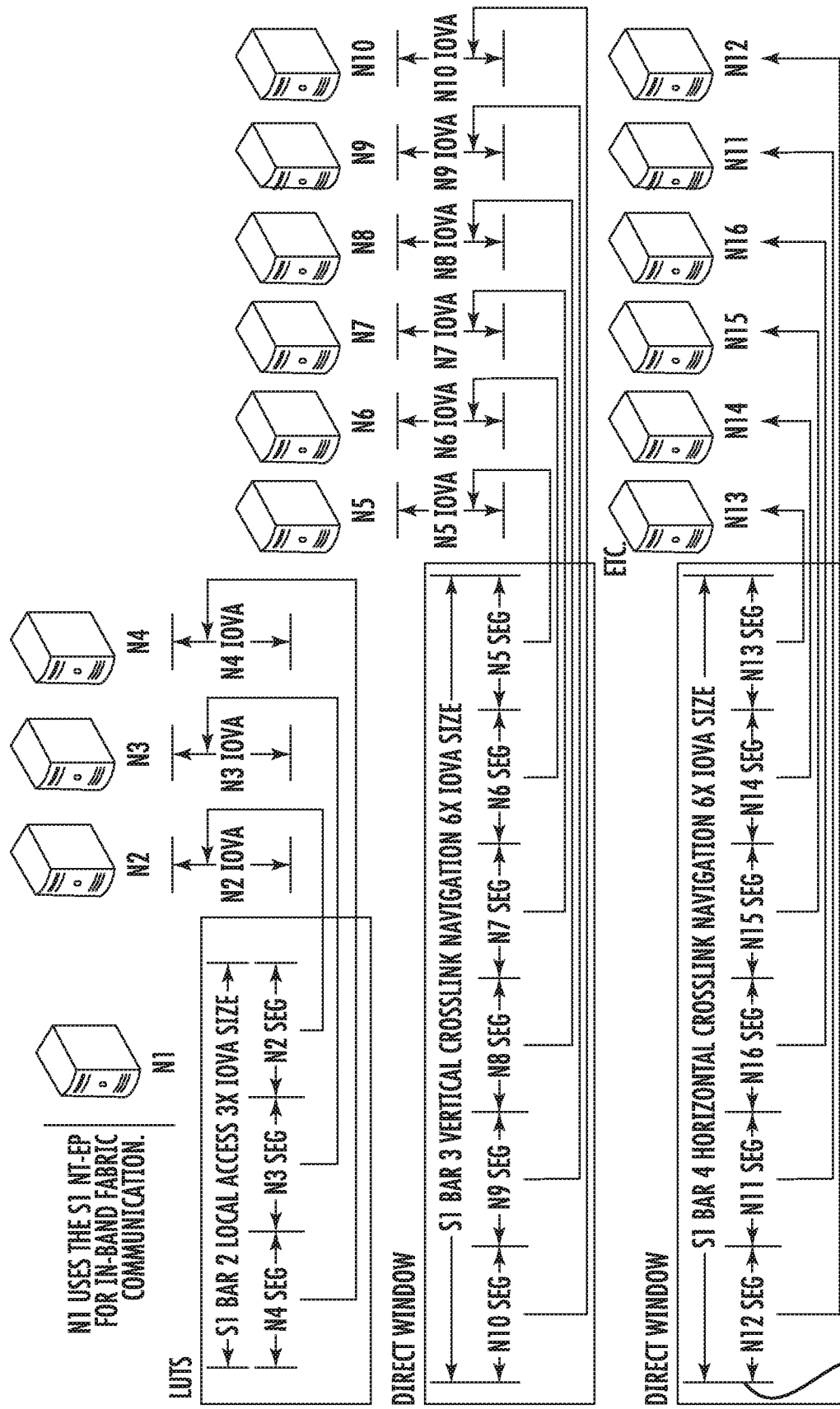
FIG. 25 is a logical block diagram illustrating an example of how a first host can target each remote host through S1-NT BARs, according to the disclosure.

FIG. 25 shows an example of how Host A can target each remote host N2-N16 through the S1-NT BARs. Note that in one implementation, the remote hosts that are 2 hops away from N1 have routes that are split between BARs—two take the high route, and two take the low route. This is an arbitrary decision to balance the BAR size. In fact, all 4 of the 2-hop hosts could have been assigned to the same BAR. Whatever the case, these assignments are a static element of any given topology.

Note also that segments in BAR-4 2504 of FIG. 25 are not in node numerical order. The association between segment and destination node is also arbitrary, and statically assigned. In other words, these characteristics are preconfigured, and the route information is stored in the TR.

Figure 26:
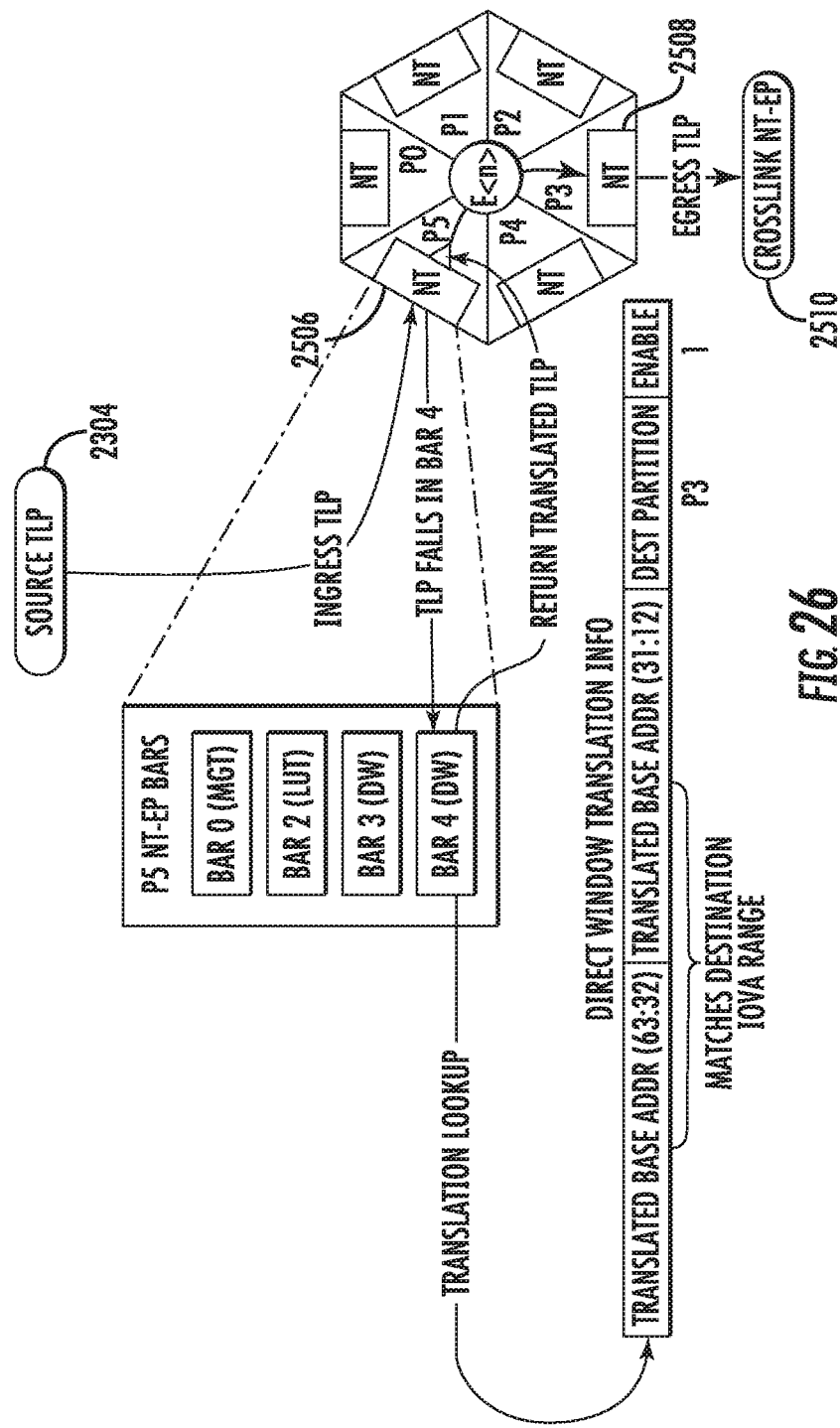
FIG. 26 is a logical diagram illustrating details for an exemplary implementation of the DW Translation according to the disclosure.

FIG. 26 illustrates additional detail for an exemplary implementation of the DW Translation. The process begins when a sourced ingress TLP 2304 enters the NT EP of the Edge Switch 2104. In this case, the ingress NT EP 2506 is on Partition 5 of the Edge Switch. The BARs reside within this NT EP, and the TLP address is compared to the NT BARs. Since the incoming TLP falls within BAR-4, the associated Direct Window is used for address translation.

Translation Lookup begins, and the enable bit is the first thing checked. If the enable bit=0, the TLP is discarded. Since it=1 in the illustrated example, the translation Base Address is extracted and applied to the TLP (after its own Base Address is stripped to isolate the offset). The destination partition is extracted as well, and noted to be (in this case) partition 3 (P3).

Now, the NT sends the TLP through to partition 3 and its egress NT EP 2508. The TLP emerges and finds its way to the Crosslink NT-EP 2510, which goes through much the same process. If the NT EP on the destination-side of the Crosslink is the Terminal NT endpoint, the TLP address should fall within a BAR that is backed by a LUT. The LUT entry would then be extracted to route the TLP to the proper destination node.

Navigating Crosslinks with Hubs—

Figure 27:
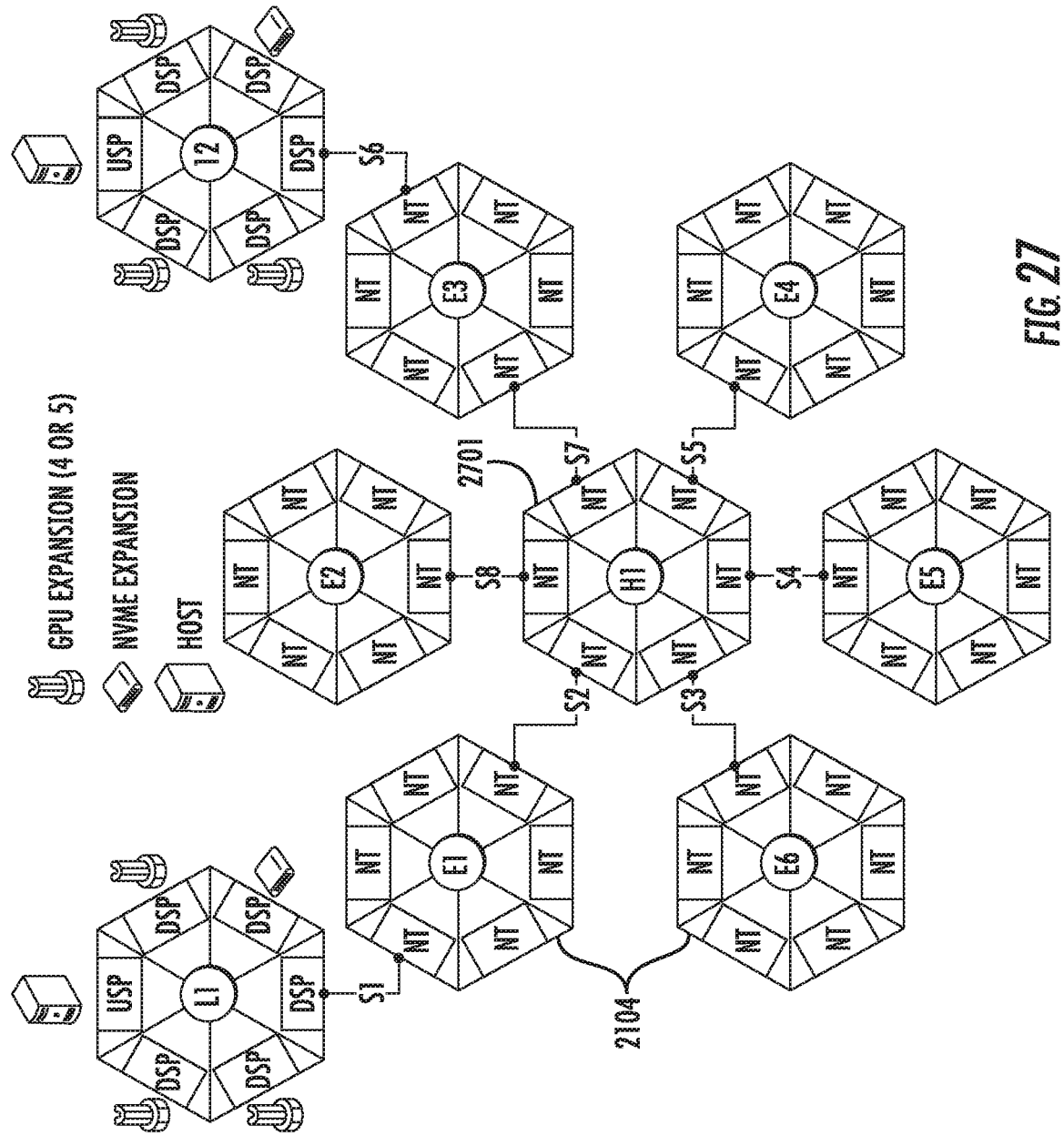
FIG. 27 is a logical block diagram illustrating a topology scaled beyond four Edge Switches (6) using one or more HUB switches.

Keeping the previous discussion in mind, architecture scaling requirements may mandate the use of HUB Switches. As shown in FIG. 27, scaling beyond four Edge Switches (here 6) requires the use of one or more HUB switches 2701. Assume in FIG. 27 that every available NT on the Edge Switches 2104 is attached to another IO switch in the same configuration as those shown. In one implementation, each IO switch provides one host with up to 15 GPUs and up to 5 T bytes of storage assuming IO expansion boxes currently in use.

In this example topology, any host that is not local to a targeted Edge Switch is 2 hops away from the initial ingress NT port. The route from Node 1 to Node 2 is: N1I1S1E1S2D1S7E3S6I2N2. For this case, the S1-NT needs only one BAR for local LUT routing, and one BAR for the S2-Crosslink. However, since Node 1 needs to address all other nodes in the Fabric, the BAR size for the S2 Crosslink routing must be 25×IOVA_SIZE. Another alternative is to use 5 BARs, each with 5 segments, all targeting the same egress NT Port. One way may make more logical sense than another depending on the application.

NT Endpoints on the HUB switch are statically programmed according to the needs of the topology. The HUB 2701 is not enumerated by any host. Host enumeration stops at the NT EP on its own side of a Crosslink. The HUB merely needs a translation entity (either DW or LUT) to route incoming traffic to each of its 5 egress NT Ports.

Combining LUTs and Direct Windows—

In the discussion thus far, individual BARs have contained either a Lookup Table (LUT) or a Direct Window (DW). If 64 bit addressing is used, two BARs must be combined into one.

If BAR-0 uses 64 bit addressing, BAR-1 must also be used in support of BAR-0. BAR-1 is not available as a stand-alone BAR. BAR-2 and BAR-3 also combine to become one 64 bit BAR; BAR-4 and BAR-5 combine as well. Therefore, only three BARs are available if 64 bit addressing is used in every case: BAR-0, BAR-2, and BAR-4. In order to provide sufficient routing for more complex topologies, Lookup Tables share a BAR with a Direct Window.

Figure 28:
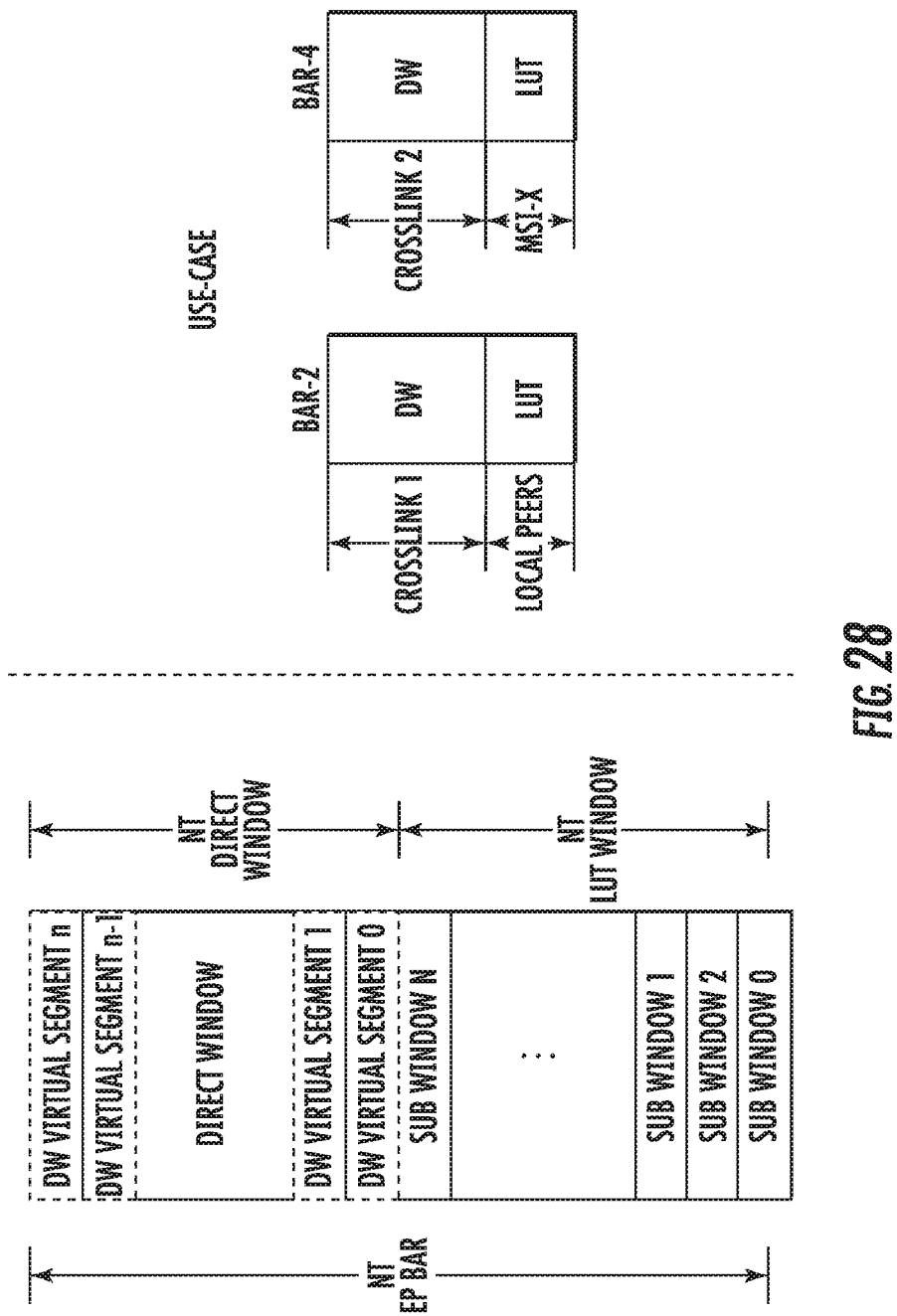
FIG. 28 is a graphical illustration of an NT EP BAR configured to house both a Direct Window and a Lookup Table (LUT) according to the disclosure.

As shown in FIG. 28, an NT EP BAR can house both a Direct Window and a Lookup Table (LUT). The LUT entries are shown in the figure as "sub windows." The DW Virtual sections shown in the Direct Window are the same size as the sub windows. An arrangement like this allows addresses targeted within the DW to be routed to a single partition, while an address targeted within the LUT allows routing to the destination partition associated with the targeted LUT Entry.

The fabric allows a source host to interrupt a remote host with MSI-X. As shown above, a LUT may be used for this purpose. MSI-X mandates the use of 64 bit addressing, which necessitates combining two BARs. The fabric might also need to access a Crosslink via DW. In this case, combining a DW and LUT within a BAR makes reasonable sense.

Note that if the MSI-X is part of the IOVA space, a separate LUT is not needed. However, if the MSI-X vector is not part of the IOVA space, the separate LUT table is a requirement.

Fabric Manager Tasks and Communications—

As noted previously, the exemplary embodiment of the Fabric Manager has three primary tasks.

The first thing the FM usually performs is instantiation of a given topology upon administrative command.

Secondly, the FM monitors the status of the fabric and provides stake-holders with status updates. This includes the discovery and addition/removal of nodes.

Lastly, the FM responds and reports upon events and responds to requests for status information or dynamic configuration changes (including dynamic configuration fo hosts).

The following sections explain in detail how the exemplary FM interacts with its Node and Switch Minions to manage the fabric.

1) FM: Instantiating a New Topology

Before there is a topology to monitor and operate upon, a topology must be instantiated. In a typical startup scenario, the administrator (which may be a software process, human, or combinations thereof) powers on switches, establishes communication with an FM Master, and requests a TR form for a desired topology. After supplying the required data for the fields within the TR, the administrator submits the TR along with a SET_TOPOLOGY request per step 2902. See FIG. 29.

The SET_TOPOLOGY operation begins with a request fielded by the designated (e.g., LEXC) webserver. The command is passed to the FM Master (FMM) 1201 where process No. 1 (Authenticate Request) takes over.

As part of the Authenticate Request, the FM handling the initial request ensures that it is operating as the master 1202 (see FIG. 12). If so, the FMM authenticates the requestor's user credentials and transitions to TR_FORM_SUBMISSION if all is validated. Otherwise, processing continues along the error path. If the handling agent is not the master, it may send a referral within the error response (see Process No. 8 below).

Per process No. 2 (Validate TR), the FMM 1202 validates the TR—ensuring that all required fields are present and complete, and that the TR submitted matches the requirements for the given topology. If validated successfully, processing continues to IO_SWITCH_VALIDATION. If found to be invalid, processing continues along the error path.

Per process No. 3 (Validate Switching), the FMM ensures that all fabric traffic is quiesced. It then sends requests to switch minions to validate their position and role within the fabric. Minions configure their local switch hardware and furnish additional TR detail in a response packet to the master. The FMM waits for all Minions to respond and transitions to IO_PATH_VALIDATION once all Minions have successfully responded.

In the case of a timeout or other error, the FMM steers processing along the error path. (See Process No. 8 and discussion of Switch Validation infra for more detail).

Per process No. 4 (Validate IO Paths), the FMM 1202 initiates IO Path Validation by sending requests to switch minions. In response the switch minions perform any dynamic configuration that needs to be done. They check the results of the dynamic configuration operations (if any), DSP assignments and current link states. They update their local TR copy and send back a response to the Master. The Master checks off each switch minion that responds and transitions to TOPO_STATIC_RDY if all is in order. On error or timeout, the FMM steers processing to the error path. (See discussion IO Path Validation infra for more detail).

Per process No. 5 (Signal TOPO_STATIC_RDY), the FMM alerts all fabric Minions that the topology has been configured and is ready to receive new nodes. At the point, the SET_TOPOLOGY command has been completed except for the REST response.

Per process No. 6 (Prepare REST Response), the FMM packages information to be returned in a REST response. This involves JSON or XML encoding and lets the requestor know the current state of the fabric.

Per process No. 7 (Send REST Response), the packaged response is sent to the REST client through e.g., the LEXC web server.

Per process 8 (Prepare Error Response), the FMM packages a response packet to be sent to the REST client detailing the error condition and the current state of the fabric. The command can be reissued once the administrator has dealt with the problem. This may require physical cabling adjustment or some other action.

Figure 29:
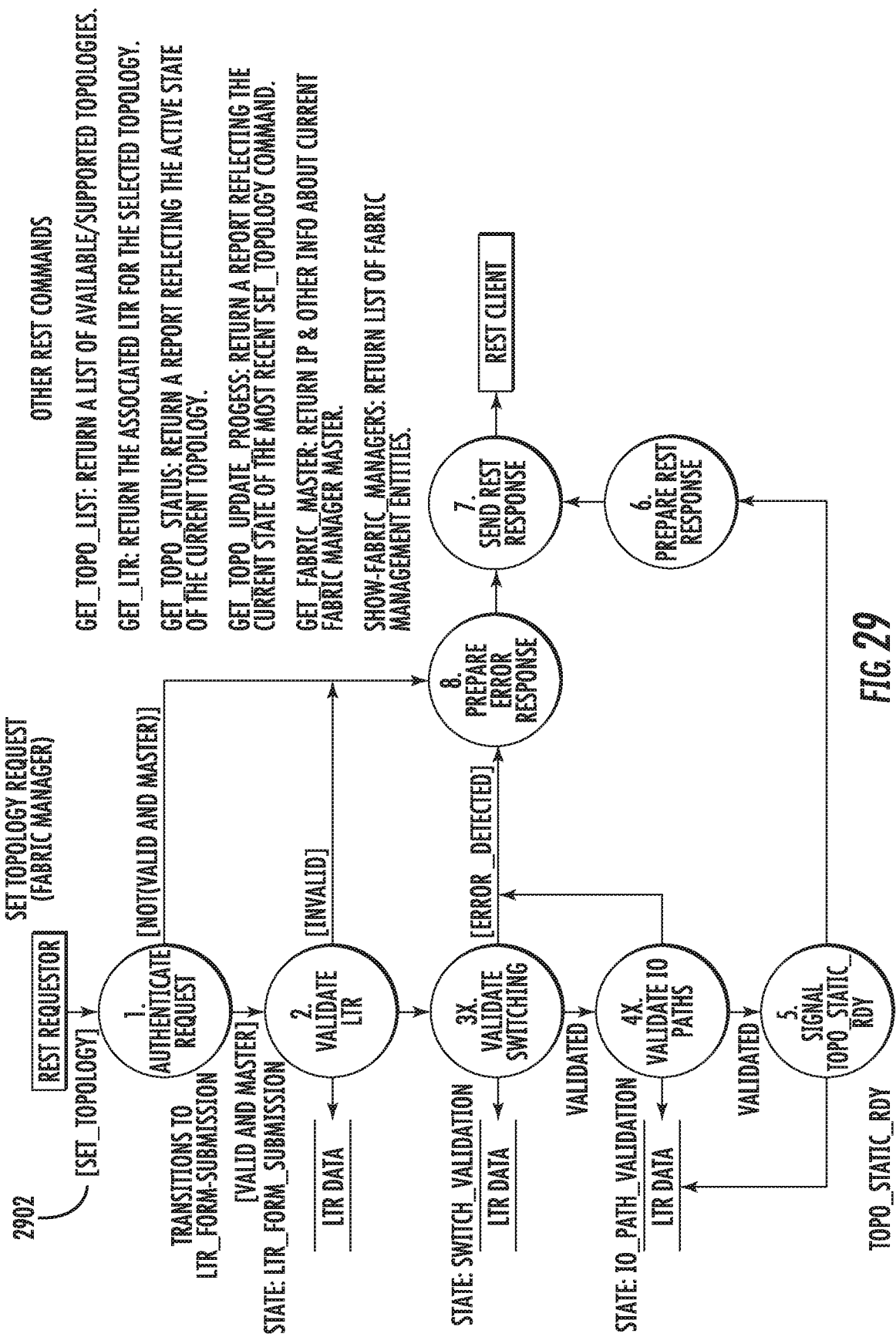
FIG. 29 is a logical flow diagram illustrating one embodiment of a topology instantiation procedure according to the disclosure.

One goal of the process of FIG. 29 discussed above is to establish the requested topology. The following assumptions are made in this example implementation:

1. While the topology is being initialized and configured, all node traffic on the fabric is quiesced.
2. Nodes (hosts) do not participate in topology initialization; they join a new topology after instantiation.
3. The topology is successfully instantiated only after all components are initialized. However, the administrator may disable components via the TR submitted in the request.

Switch Validation—

Figure 30:
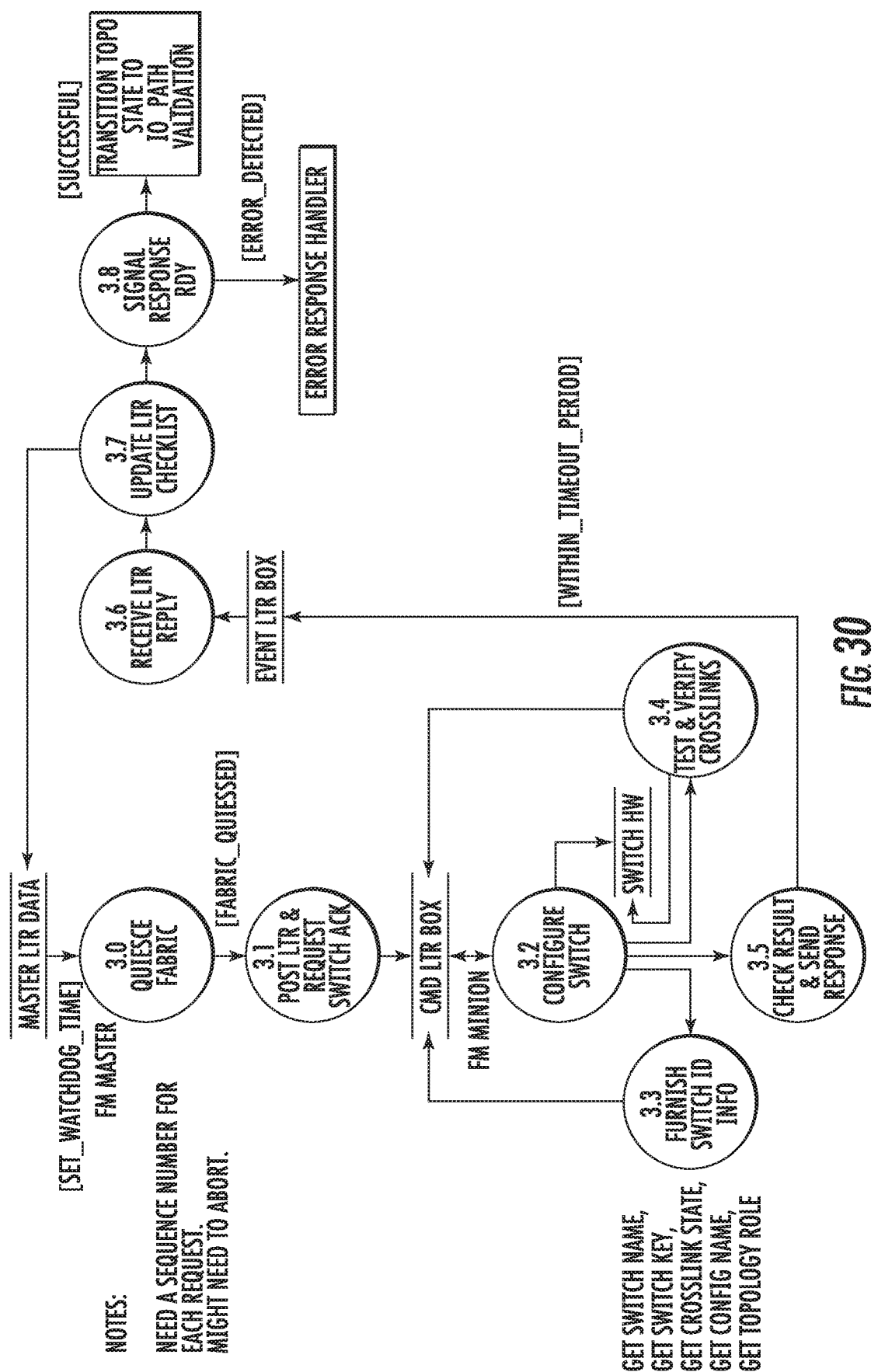
FIG. 30 is a logical flow diagram illustrating one embodiment of a switch validation procedure according to the disclosure.

Switch validation is a part of the SET_TOPOLOGY command processing in which switches are configured and Crosslink connections are tested. As shown in FIG. 30, the process begins with the FMM halting traffic on the current fabric (via Process 3.0).

Specifically, per process 3.0 (Quiesce Fabric), the FMM supervises bringing fabric traffic to an idle state. To accomplish this, the FMM sends requests to active Node Minions. Node Minions respond when the host upon which they reside has no further pending work.

The TR submitted by the administrator may provide a timeout, after which the FMM signals Switch Minions to bring down links. If unsuccessful during a watchdog timeout period, the FMM proceeds to error handling. Otherwise, the fabric is assumed to be quiesced.

Per process 3.1 (Post TR & Request Switch ACK), the FMM sends an updated copy of the TR along with a VALIDATE_TOPO command to each Switch Minion. The FMM then waits for a response to the command, and checks off each Minion that responds. In this way, the FMM can determine which components are active and playing proper roles.

Per process 3.2 (Configure Switch), the Switch Minion (SM) 1202 downloads the appropriate configuration files according to instructions contained in the TR. It updates its local copy of the TR to reflect the current state.

Per process 3.3 (Furnish Switch ID Info), the SM 1202 downloads switch information into a Vendor Partition of the local switch. This information is used to establish the switch's ID and role within the Fabric. It can be read by locally attached nodes through the switch's GAS.

Per process 3.4 (Test & Verify Crosslinks), if the SM has Crosslinks to manage, it checks for a LINK_UP condition on each one. For each Crosslink it has to manage, the SM sends a FW generated TLP through the Egress port. Meanwhile, it monitors incoming bandwidth for the same ports expecting that the switch on the other side of the Crosslink will be sending TLPs as well. If the bandwidth increases on the ingress ports, the SM marks them as "verified."

This is an efficient way to determine whether traffic can be sent across a link. The SM records the results of these "tests" in the local TR.

Per process 3.5 (Check Results & Send Response), the SM retrieves results of its validation efforts from the local TR and packages a response. It sends the response via RabbitMQ task in one implementation to the FMM 1202.

In process 3.6 (Receive TR Reply), the FMM fields each response from switch minions, retrieving the inbound reply message, which contains the minion's updated local TR copy.

In process 3.7 (Update TR Checklist), the FMM marks off each pending task and updates its master TR copy.

In process 3.8 (Signal Response RDY), after all pending Minion tasks have completed, the FMM signals the transition to IO_PATH_VALIDATION. This may simply mean that Minions get and updated copy of the master TR. In the case of any timeout or error detected during the overall validation processing, the FMM steers continued processing to the error handling path.

Quiesce Fabric Command—

In order to quiesce the fabric, the FMM 1202 in one embodiment sends a command to each active node requesting that the node bring all traffic to a graceful halt. The FMM can be notified of SUCCESS, FAILURE, or the request may timeout. See FIG. 31.

Figure 31:
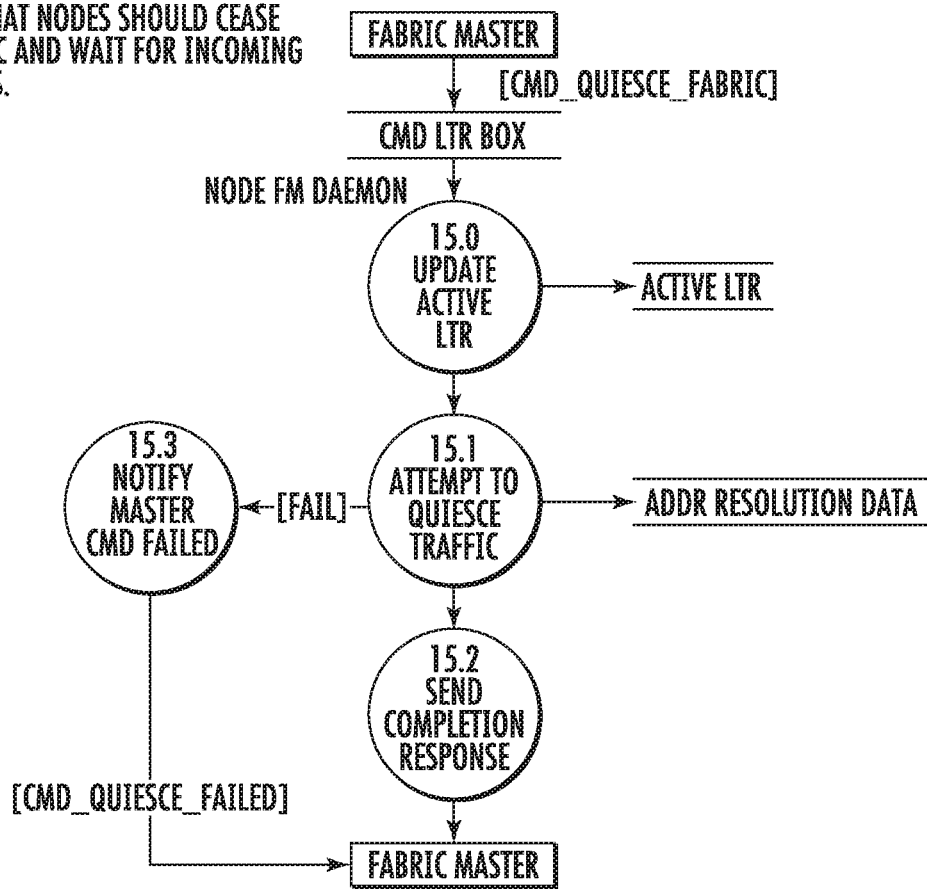
FIG. 31 is a logical flow diagram illustrating one embodiment of a fabric quiescence procedure according to the disclosure.

Per process 15.0 (Quiesce Fabric) of FIG. 31, the Node Minion (NM) 1204*b* receives a CMD_QUIESCE_FABRIC from the FMM 1202 and updates its Active TR copy.

Per process 15.1 (Attempt to Quiesce Traffic), the NM 1204*b* takes necessary steps to quell all active traffic, which may simply mean to prevent future traffic from occurring and be notified when current activity has been halted. This likely requires communication with the Data Mover (DM). The NM updates the Address Resolution Table. It does this through IOCTL calls to the Fabric Manager Driver.

Per process 15.2 (Send Completion Response), upon successfully quelling traffic and bringing the node to idle, the NM 1204*b* sends a completion response to the FMM 1202.

Per process 15.3 (Notify FMM of CMD Failure), upon failure to successfully quiesce traffic, the NM sends an error completion response to the FMM.

IO Path Validation—

Figure 32:
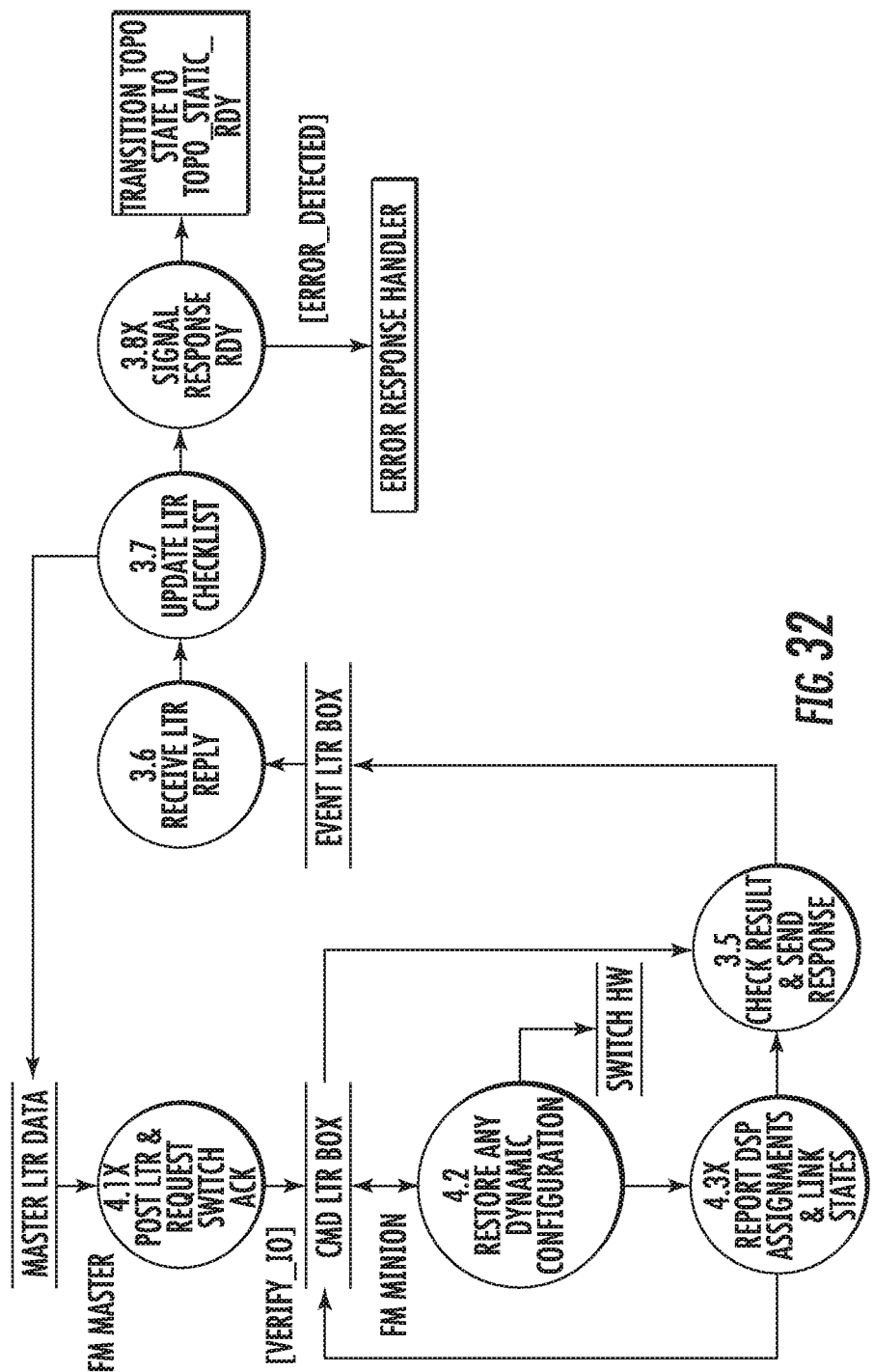
FIG. 32 illustrates one exemplary embodiment of an IO path validation methodology of the disclosure.

FIG. 32 illustrates one exemplary embodiment of an IO path validation methodology of the disclosure.

Per process 4.1 (Post TR & Request Ack for VERIFY_IO command), the FMM 1202 sends an updated copy of the TR along with a VERIFY_IO command to each Switch Minion 1204*a*. The FMM then waits for a response to the command, and checks off each Minion that responds.

Per process 4.2 (Restore any Dynamic Configuration), the SM 1204*a* fields the reception of the VERIFY_IO command, which contains an updated copy of the master TR. The SM determines through the Dynamic Descriptors whether any dynamic programming applies to its local switch. If so, the SM handles the pending UNBIND/BIND and BIFURCATION commands. Note, this task may apply only to IO Switch roles in certain cases.

Per process 4.3 (Report DSP Assignments & Link States), the SM completes a first pass status report and writes an Initial Status Descriptor into the TR. This data can be packaged and sent back to the SET_TOPOLOGY REST requestor.

Per process 3.5× (Check Result & Send Response), the SM 1204*a* notes anything worthwhile concerning the IO operations it has just performed and anything concerning the status that needs to be detailed. It updates its local TR as needed and sends a response back to the FMM 1202.

Per process 3.6 (Receive TR Reply), the FMM fields each response from Switch Minions 1204*a*, retrieving the inbound reply message, which contains the minion's updated local TR copy.

Per process 3.7 (Update TR Checklist), the FMM marks off each pending task and updates its master TR copy.

Per process 3.8 (Signal Response RDY), after all pending minion tasks have completed, the FMM 1202 signals the transition to TOPO_STATIC_RDY. This may simply mean that Minions get and updated copy of the master TR. In the case of any timeout or error detected during the overall validation processing, the FMM 1202 steers continued processing to the error handling path.

The FMM 1202 transitions the fabric pseudo-state to STATIC_TOPO_RDY after it has supervised the completion of all initialization tasks. The FMM alerts all active Minions and the requestor that the fabric is now initialized and ready for further use. At this point, no nodes are actively participating in the fabric. In one operational model, nodes asynchronously join the fabric, and update their own records when other nodes appear.

Node Discovery—

Figure 33:
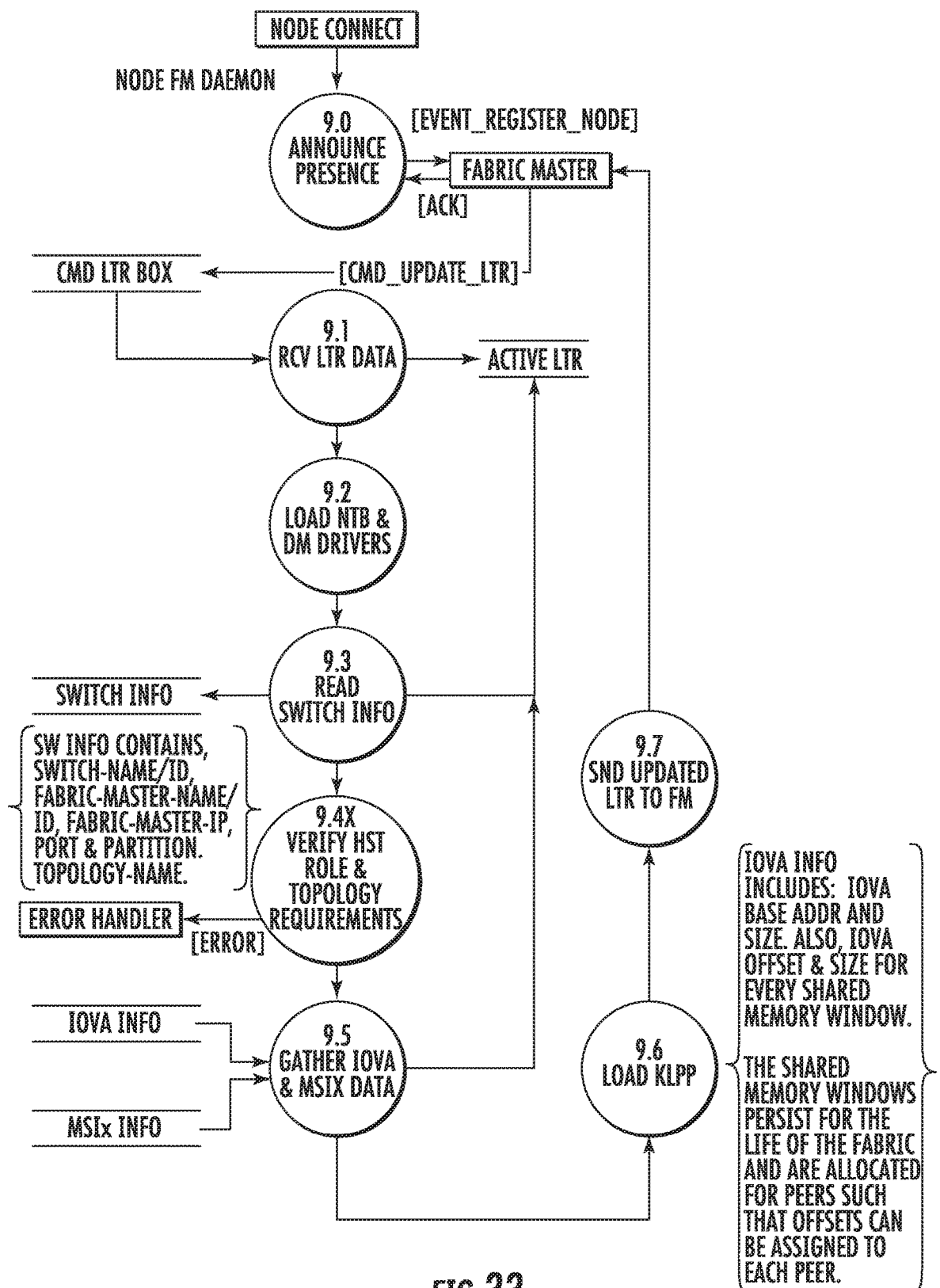
FIG. 33 is a logical flow diagram illustrating one exemplary embodiment of a node discovery and fabric connection methodology of the disclosure.

In the exemplary embodiment, nodes are asynchronously added to an existing, initialized, fabric as described above. FIG. 33 details an exemplary embodiment of the Node Discovery process used subsequent to fabric initialization.

A host that has completed booting sufficiently (e.g., so that its local Fabric Manager Daemon is running) makes a "connection" to the existing fabric—assuming it is in PHY communication to an appropriate Upstream Port (USP). As the host boots, a LINK is established between a switch and the connecting port—e.g., an invention-enabled card. That LINK_UP and enumeration that follows informs the host that it has a connection to a switch, and the FM Daemon can proceed with the first process (9.0) of FIG. 33. In the context of the Fabric Manager, the FM Daemon running on the host is the FM Node Minion 1204*b*.

As shown in FIG. 33, the Node Minion registration process begins with process 9.0 (Announce Presence). Here, the Node Minion (NM) 1204*b* sends an REGISTER_NODE event to the Fabric Manager Master (FMM) 1202, and after receives an ACK response from the Master. Sometime later, when the FM Master is ready for the node to join the Fabric, the Master sends an UPDATE_TR command.

Per process 9.1 (RCV TR Data), the NM receives the CMD_UPDATE_TR response from the FMM, which contains an updated copy of the master TR. This TR reflects the state of the fabric at FMM sending time. The update is processed and stored as the node's active TR.

Per process 9.2 (Load NTB & DM Drivers), the NM loads the NTB and Data Mover (DM) drivers on the host. Note that these drivers may instead be loaded via another means; e.g., at boot time—this need not be an FMM task.

Per process 9.3 (Read Switch Info), the NM reads the Vendor Partition from the switch and extracts the detail from it. It updates the TR to reflect the newly read data. This is a primary way that a host can determine if it is in the proper place within the topology, although other approaches may be used.

It is assumed that the administrator assigns positions for every host during TR submission. Using the Switch ID information (Vendor Partition) each host can verify whether it is in the proper "advertised" position.

An alternative method is to simply allow each host to read the Switch Info and report its position rather than validate it. With this method, the administrator would be able to query a list of hosts and their positions within the fabric once they have been discovered.

Returning to FIG. 33, per process 9.4 (Verify Role & Topology Requirements), the NM 1204*b* checks to see that its host is indeed in the assigned position within the topology. Based upon the Switch Info read and relevant fields within the TR, the NM ensures that all topology "requirements" have been met. The NM reports to an error handler if it fails to verify the requirements.

Per process 9.5 (Gather IOVA & MSIX Data), the NM collects the IOVA and MSI (e.g., MSI-X) information and writes it into the TR response. This is used by other entities in the fabric to provide access to the local node or to program routes.

IOVA information includes for example both the IOVA Base and size along with the offset and size of the scratchpad control memory.

Per process 9.6 (Load KLPP), the NM loads the KLPP driver on the local host.

Per process 9.7 (Send Updated TR to FMM), the NM 1204b packages its active TR within a command response and sends it to the FMM 1202.

Figure 34:
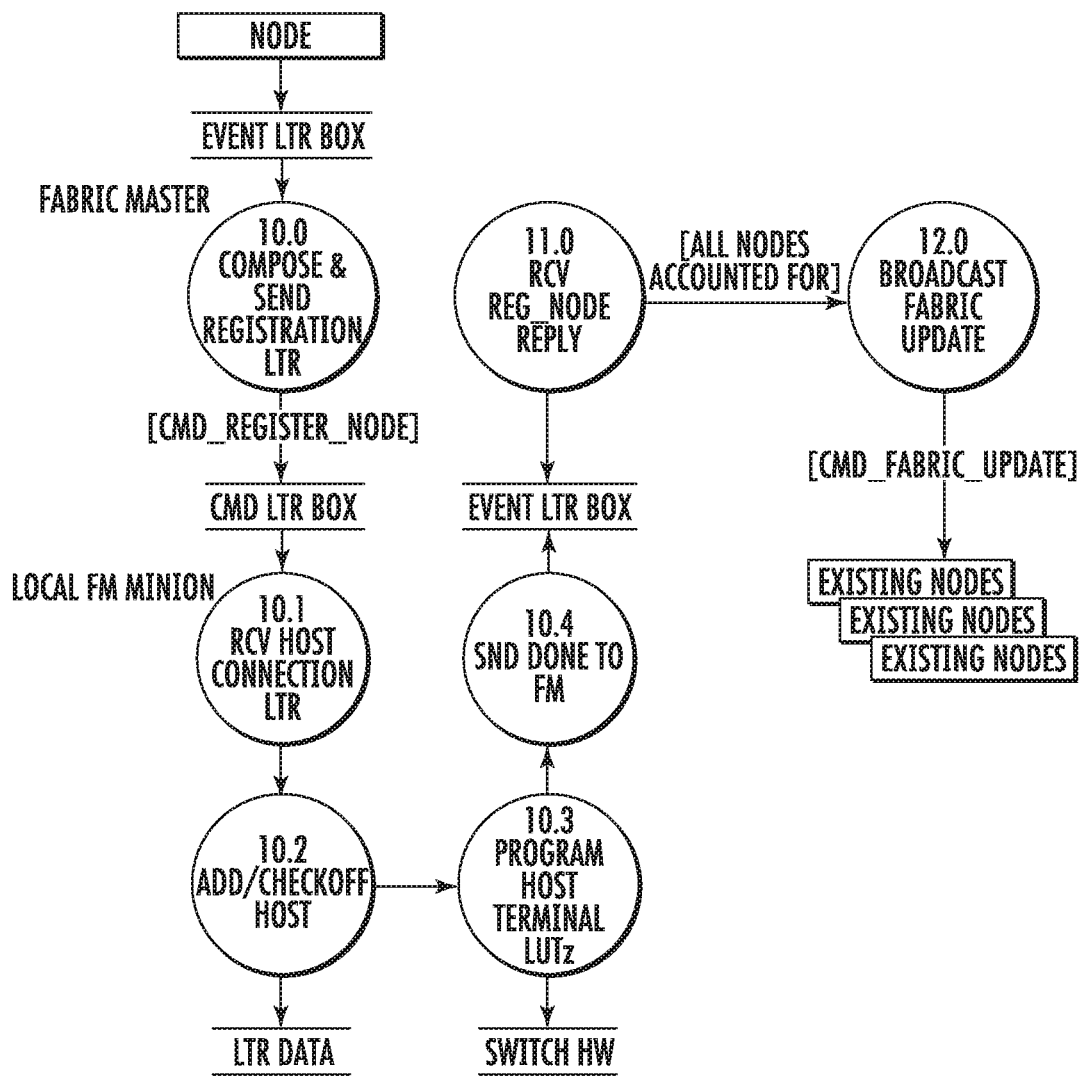
FIG. 34 is a logical flow diagram illustrating the interaction between the FMM and the individual SMs that begins after the FMM receives an UPDATE_TR completion from a registering node according to one embodiment of the disclosure.
Figure 35:
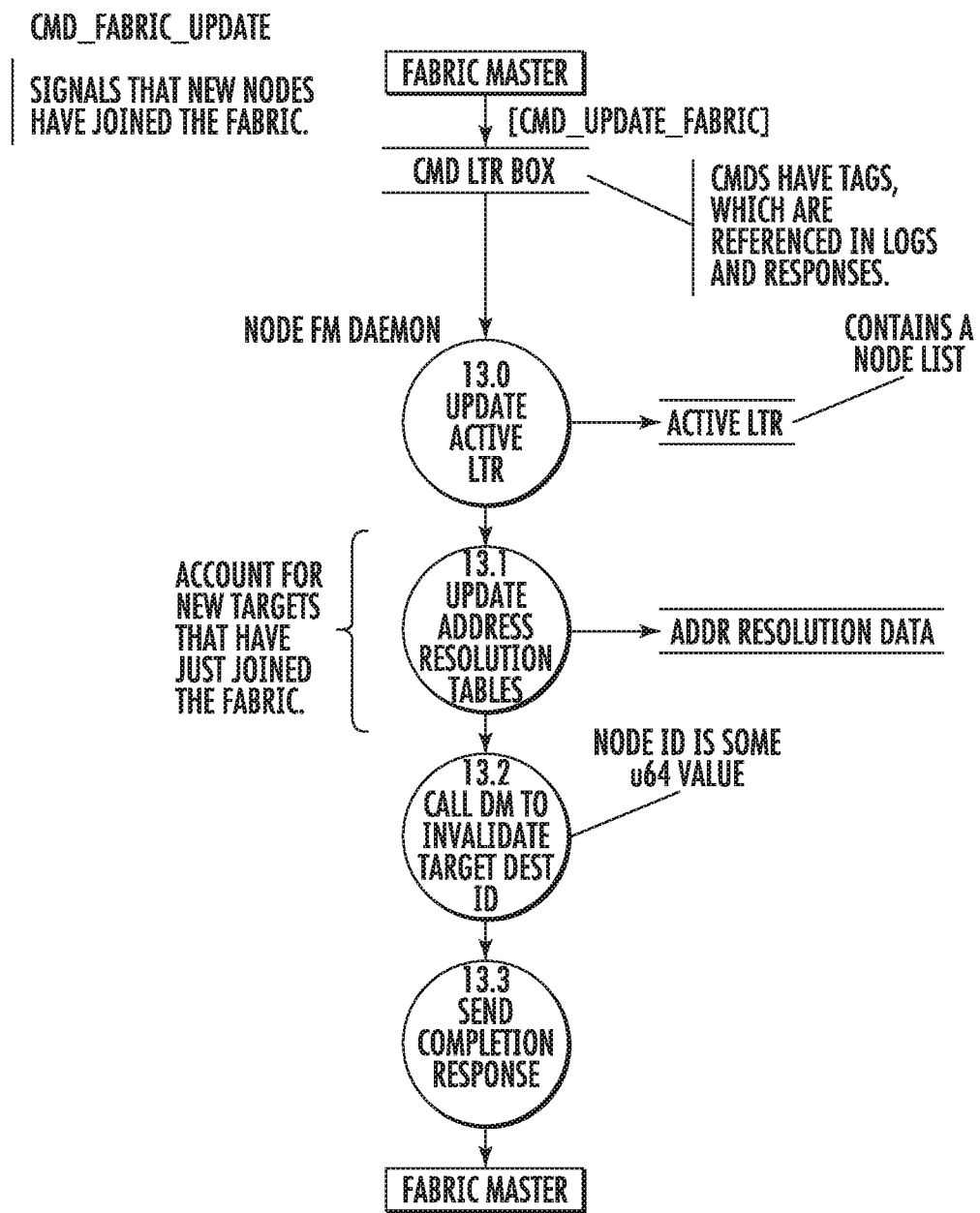
FIG. 35 is a logical flow diagram illustrating a fabric command update according to one embodiment of the disclosure.

FIG. 34 details the interaction between the FMM and the individual SMs 1204a that begins after the FMM receives an UPDATE_TR completion from a registering node.

Specifically, per process 10.0 (Compose & Send Registration TR), the FMM sends a REGISTER_NODE command to each Switch Minion 1204a, and the FMM marks the command as pending for each issued.

Per process 11.0 (Receive Register Node Reply), the FMM receives a completion for a pending REGISTER_NODE command. The FMM checks off the pending command. Once responses for all pending commands have been received, the FMM continues processing. In case of a timeout, the FMM continues with error handling (not shown).

Per process 12.0 (Broadcast Fabric Update), the FMM sends a FABRIC_UPDATE command to each node in existence at the time the new node registered. The command allows existing nodes to add the new node to their active nodes table.

Per process 10.1 (RCV Host Connection TR), the SM 1204a receives the REGISTER_NODE command, which contains the updated TR detailing the new host-connection.

Per process 10.2 (DD/Checkoff Host), the SM adds the new host to its active node list and updates its local copy of the TR—the Active TR.

Per process 10.3 (Program Host Terminal LUTz), if a terminal LUT needs to be programmed locally to provide access to the new host, the SM completes that programming. It may be that the SM acting has nothing more to do for the new host being added—depending on the role the current SM 1204a has within the fabric.

Per process 10.4 (Send Done to FMM), the SM 1204a sends a completion response to the FMM 1202 for the pending REGISTER_NODE command.

The FMM finishes the node registration process by sending an FABRIC_UPDATE command to existing nodes. The nodes respond by updating their local address resolution tables and their Active TRs based on the FABRIC_UPDATE Command.

Per process 13.0 (Update Active TR), the Node Minion (NM) 1204b receives the FABRIC_UPDATE command and updates its Active TR in response. The Active TR contains the most current Node List.

Per process 13.1 (Update Address Resolution Tables), the NM accounts for new targets that have just joined the fabric by updating the Address Resolution Table (ART).

Per process 13.2 (Call DM to Invalidate Target Destination ID), tf the update results in a node removal, the NM 1204b notifies the DM that the removed node's ID should be invalidated.

Per process 13.3 (Send Completion Response), the NM prepares the response packet and sends it to the FMM 1202.
Node Removal—

Nodes can also leave a fabric asynchronously as well. When this occurs, it is detected by a local switch, or perhaps explicitly indicated by an administrative command. This initial action of bringing the link state for a particular node to LINK_DOWN is represented in the diagram below as the Node Disconnection Agent. Activity begins in the leftmost portion shown in FIG. 36.

Figure 36:
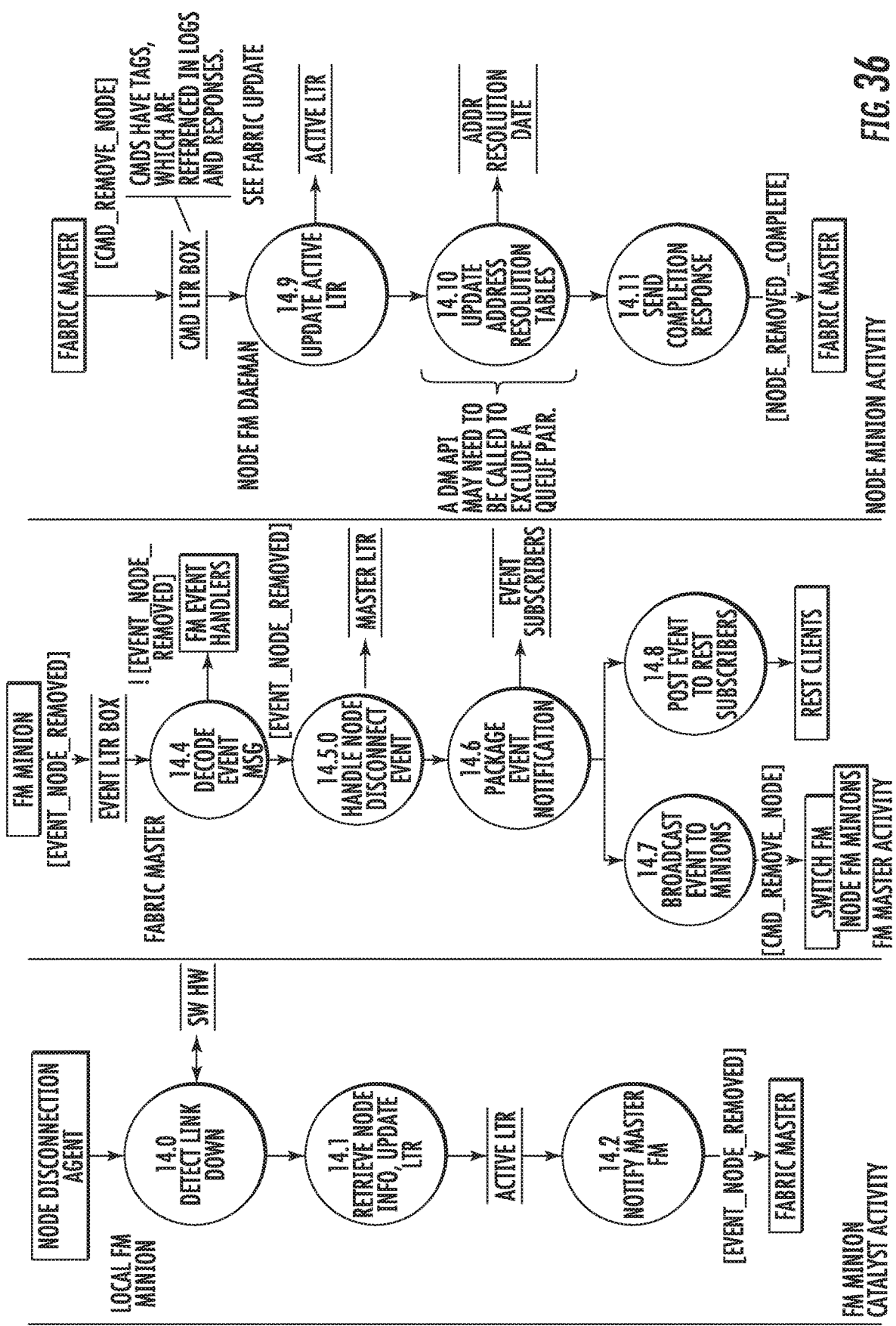
FIG. 36 is a logical flow diagram illustrating a node disconnection/removal procedure according to one embodiment of the disclosure.

Per process 14.0 (Detect Link Down) of FIG. 36, the SM 1204a monitors the link state for each of its ports on its local switch. At some point, this process notices that the node port (USP) is in a LINK_DOWN state. Some small time is allowed for the port to recover. If it fails to do so, LINK_DOWN has been detected.

Per process 14.1 (Retrieve Node Info & Update TR), the SM updates its Active TR and retrieves specific information about the disappearing node. This is placed in a conspicuous area of the EVENT_NODE_REMOVED message that will be sent to the FMM 1202.

Per process 14.2 (Notify Master FM), the SM sends the EVENT_NODE_REMOVED message to the Fabric Manager Master 1202.

Activity now resumes with the center portion of FIG. 36, continuing from process 14.2, which is shown as an SM external actor toward the Fabric Manager Master. Specifically, per process 14.4 (Decode Event Message), the FMM receives the "Node Removed" event and steers it for proper processing. If the event is not a node removal event, processing is steered toward the appropriate event handler.

Per process 14.5 (Handle Node Disconnect Event), the FMM first updates the Master TR to remove the node from the most recent node list. It handles any other fields associated with the removed node, and marks routes affected as pending invalid.

Per process 14.6 (Package Event Notification), the FMM packages a Node Removal event for propagation to a list of event subscribers.

Per process 14.7 (Broadcast Event to Minions), the FMM notifies remaining Minions (both switch and node) of the node removal event by sending a REMOVE_NODE command.

Per process 14.8 (Post Event to REST Subscribers), the FMM 1202 sends REST event notifications to clients that have subscribed to event notification.

Activity continues with the rightmost portion of FIG. 36 in which the FMM starts with process 14.7 (sending a CMD_REMOVE_NODE to a Node Minion). It is noted in passing that Command messages each have tags that can be referenced in logs and responses as discussed in greater detail infra.

Per process 14.9 (Update Active TR) of FIG. 36, the NM 1204b receives the REMOVE_NODE command and updates its Active TR to reflect the announced node removal.

Per process 14.10 (Update Address Resolution Table), the NM updates the Address Resolution Table, which ensures that subsequent requests for address resolution to the now removed target will fail. A Data Mover API (DM) command may need to be called to instruct the DM to exclude the affected queue pair.

Per process 14.11 (Send Completion Response), the NM sends a completion response to the FMM 1202 for the REMOVE_NODE command.

Figure 37:
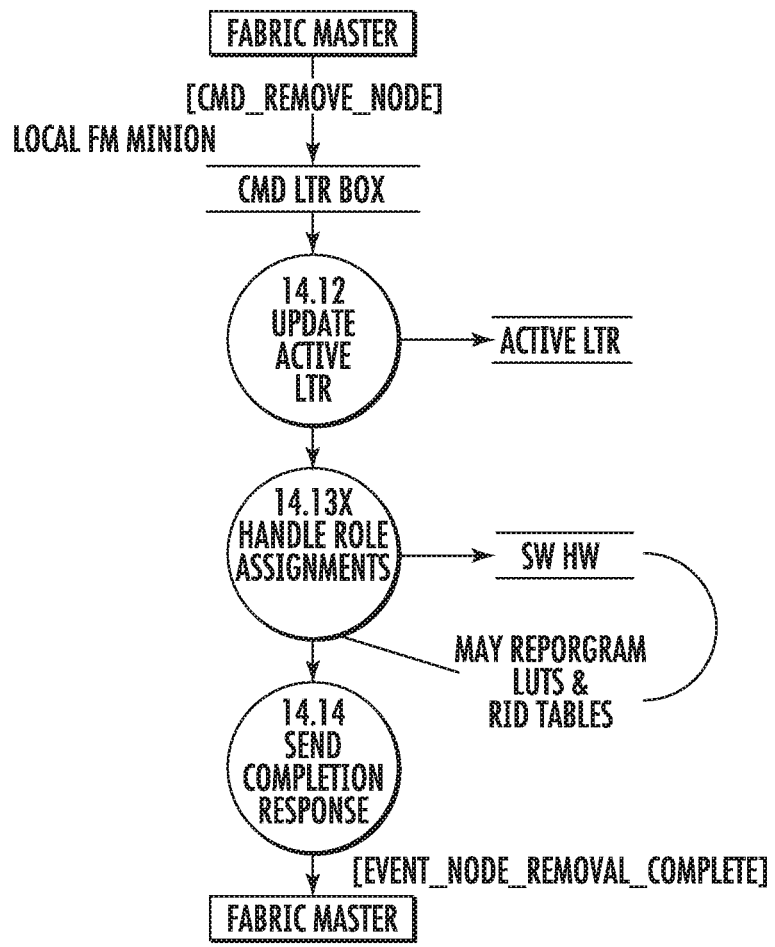
FIG. 37 is a logical flow diagram illustrating one implementation of switch minion behavior during node removal according to the disclosure.

In terms of Switch Minion activity during removal, per process 14.12 (Update Active TR) of FIG. 37, the SM 1204a receives the REMOVE_NODE command and updates its Active TR to reflect the announced node removal.

Figure 38:
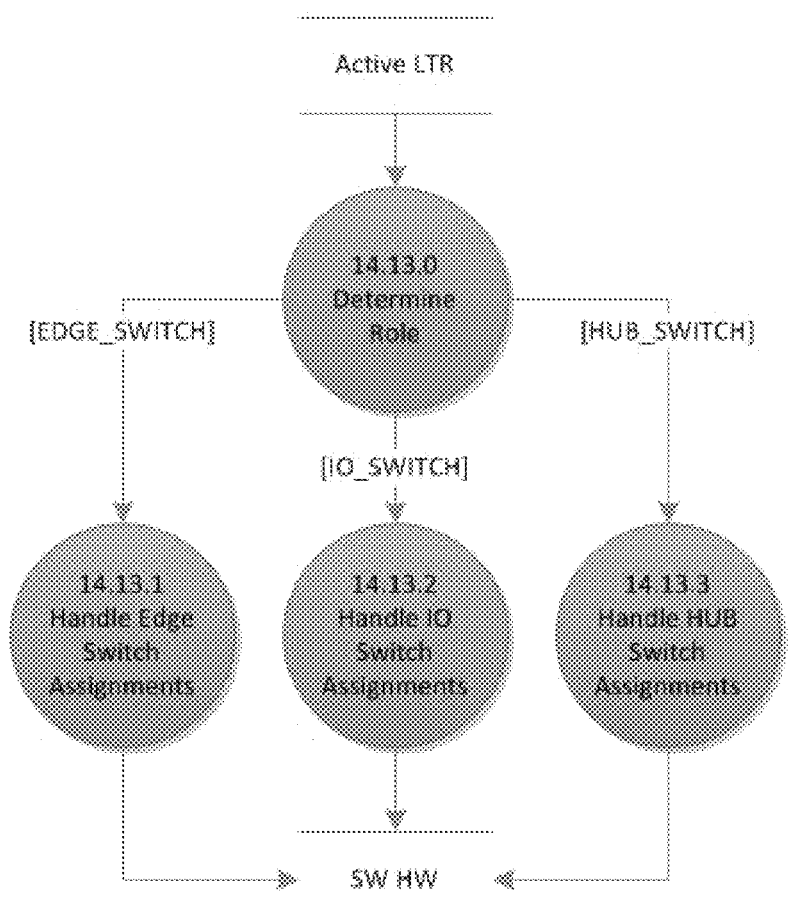
FIG. 38 is a logical flow diagram illustrating one implementation of a handle role assignments function according to the disclosure.

Per process 14.13x (Handle Role Assignments), the SM handles its responsibilities for the local switch operating in a given role. The sub-process is shown in FIG. 38. In general, if there is anything to do for the local role, the SM supervises the programming of the Switch hardware. An Edge Switch may have to reprogram Terminal LUTs, others may simply have to update local records.

Per process 14.14 (Send Completion Response) of FIG. 37, the SM crates and sends a completion response to the FMM.

Per process 14.13.0 (Determine Role), the SM consults the TR to determine its role within the fabric, then proceeds to the appropriate assignment handling routine.

Per process 14.31.1 (Handle Edge Switch Assignments), as an Edge Switch role device, the SM 1204a may have Terminal LUTs to reprogram, or it may only need to update its local records.

Per process 14.13.2 (Handle IO Switch Assignments), as an IO Switch role device, the SM 1204a likely has nothing to do other than update local records.

Per process 14.13.3 (Handle Hub Switch Assignments), as a HUB switch role device, the SM may have a Crosslink to adjust, which might mean reprogramming a LUT. However, updating local records is likely the only thing it needs to be concerned about, since Crosslinks can be statically assigned and the presence or absence of a node does not affect them.

Figure 39:
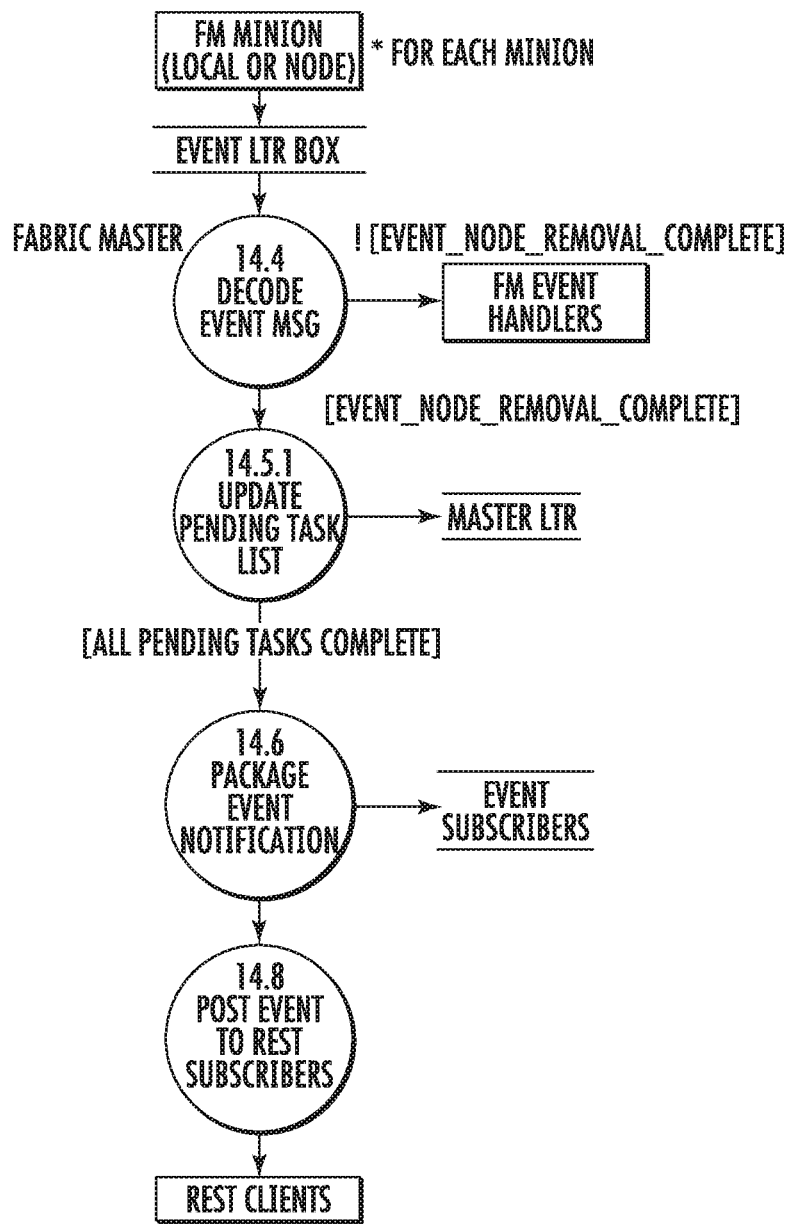
FIG. 39 is a logical flow diagram illustrating one embodiment of a Fabric Manager Master completion update and notification process and event.

The last activity, shown in FIG. 39, takes place on the Fabric Manager Master 1202. As the FMM receives completions from each of the pending tasks issued to its minions, the FMM generally updates its Master TR and notifies event subscribers of the event.

Specifically, per process 14.4 (Decode Event Message), the FMM receives the Node Removed event and steers it for proper processing. If the event is not a node removal event, processing is steered toward the appropriate event handler.

Per process 14.5.1 (Update Pending Task List), the FMM updates the Master TR to account for all pending tasks that have completed.

Per process 14.6 (Package Event Notification), after all pending tasks have been accounted for, the FMM packages an event response. It logs this event and checks its list of event subscribers.

Per process 14.8 (Post Event to REST Subscribers), the FMM sends the event to REST Client Event Subscribers.

Hiding Feature—

In some scenarios, limitations are imposed on address space (e.g., associated with registers) within PCI and other contexts. For instance, PCI BARs associated with PCI devices must be assigned "local" PCI bus address space by system software referred to as BIOS. In the present discussion of the exemplary PCI-based use case, these PCI devices are referred to as "local" to a system. The address space assigned to a local PCI device BAR is globally visible to all PCI devices in a system. The typical usage of this assigned address space allows for the local host processor or other local PCI devices to access functionality within other local PCI devices, for example a program executing on the host processor checking interrupt status bits of the device, or modifying onboard memory of the device. It is also possible for a DMA engine within one local PCI device to read or write the local address space assigned to a PCI device BAR.

Many BIOS implementations are not able to assign address space when a device's BAR requires a large amount of address space to be assigned to it. Typical problems include without limitation: (i) BIOS hangs and crashes on boot; (ii) boot failures with requests for users to modify BIOS settings or remove the offending device; and (iii) failure to assign the address space requested.

In some exemplary embodiments of the FM described herein, "large" PCI BARs are utilized (i.e., many terabytes in size) for the sole purpose of address translation from the local PCI bus address space to a FM-managed, or "private" PCI bus address space, in order to effect data transfer between two or more systems. Specifically, in one variant, a PCI device is configured to hide one or more of its BARs from the cognizant BIOS, and the requested address space is instead allocated from a "private" PCI address space. In one implementation, this private address space is managed solely by the FM.

As will be appreciated by those of ordinary skill given this disclosure, on most modern PCI devices, data movement to/from a PCI device is handled by DMA engine within the device. Taking advantage of this fact, in combination with a hidden or obscured BAR utilizing "private" PCI bus addressing, the DMA engine is on one implementation programmed with (i) one local PCI address and length assigned by the BIOS, and (ii) one private address. The DMA engine is configured to treat "private" addresses differently than "local" addresses to affect the data movement between hosts.

Figure 40:
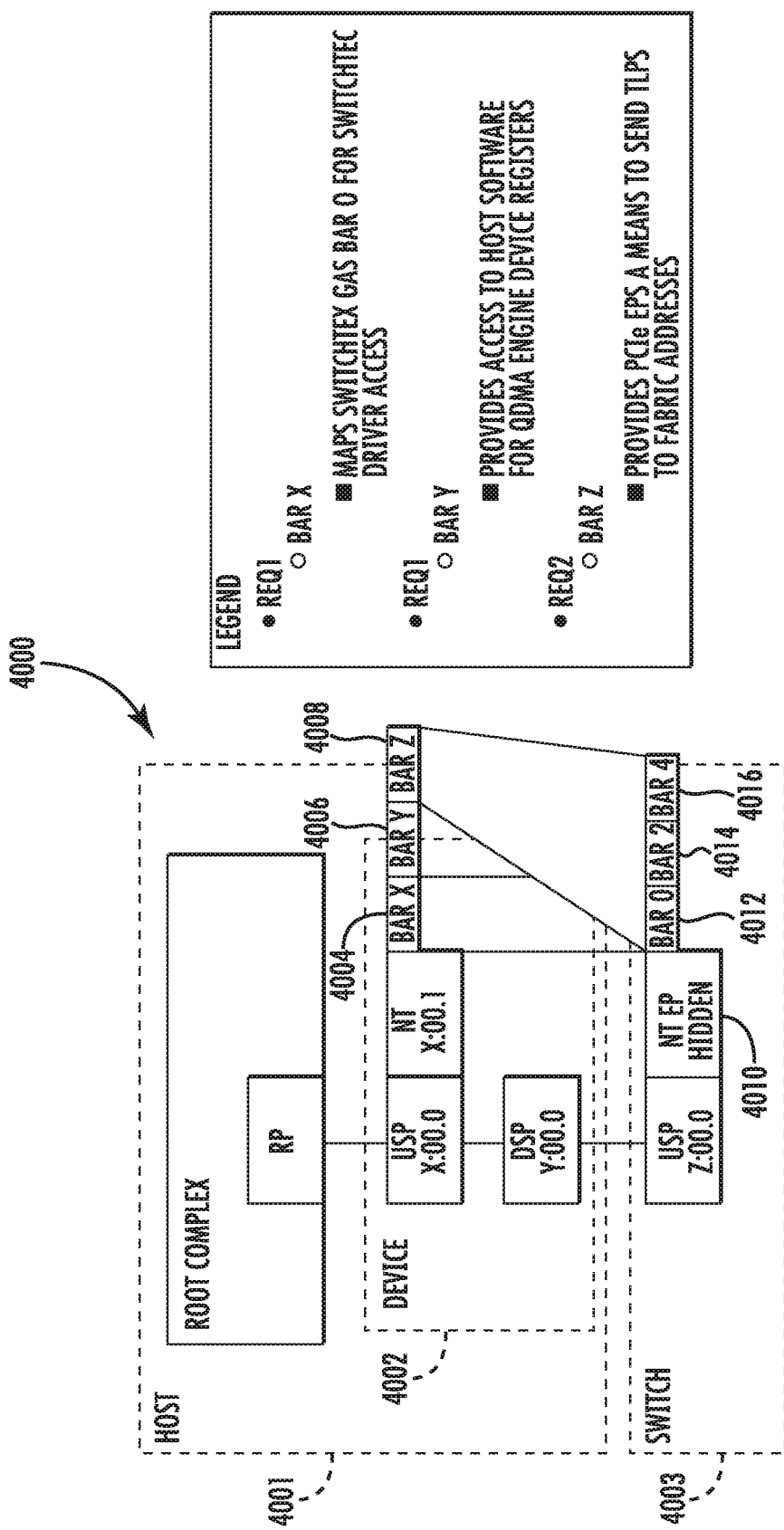
FIG. 40 is a graphical representation of an exemplary configuration of a PCI bus topology and address space assignment according to one embodiment of the present disclosure.
Figure 41:
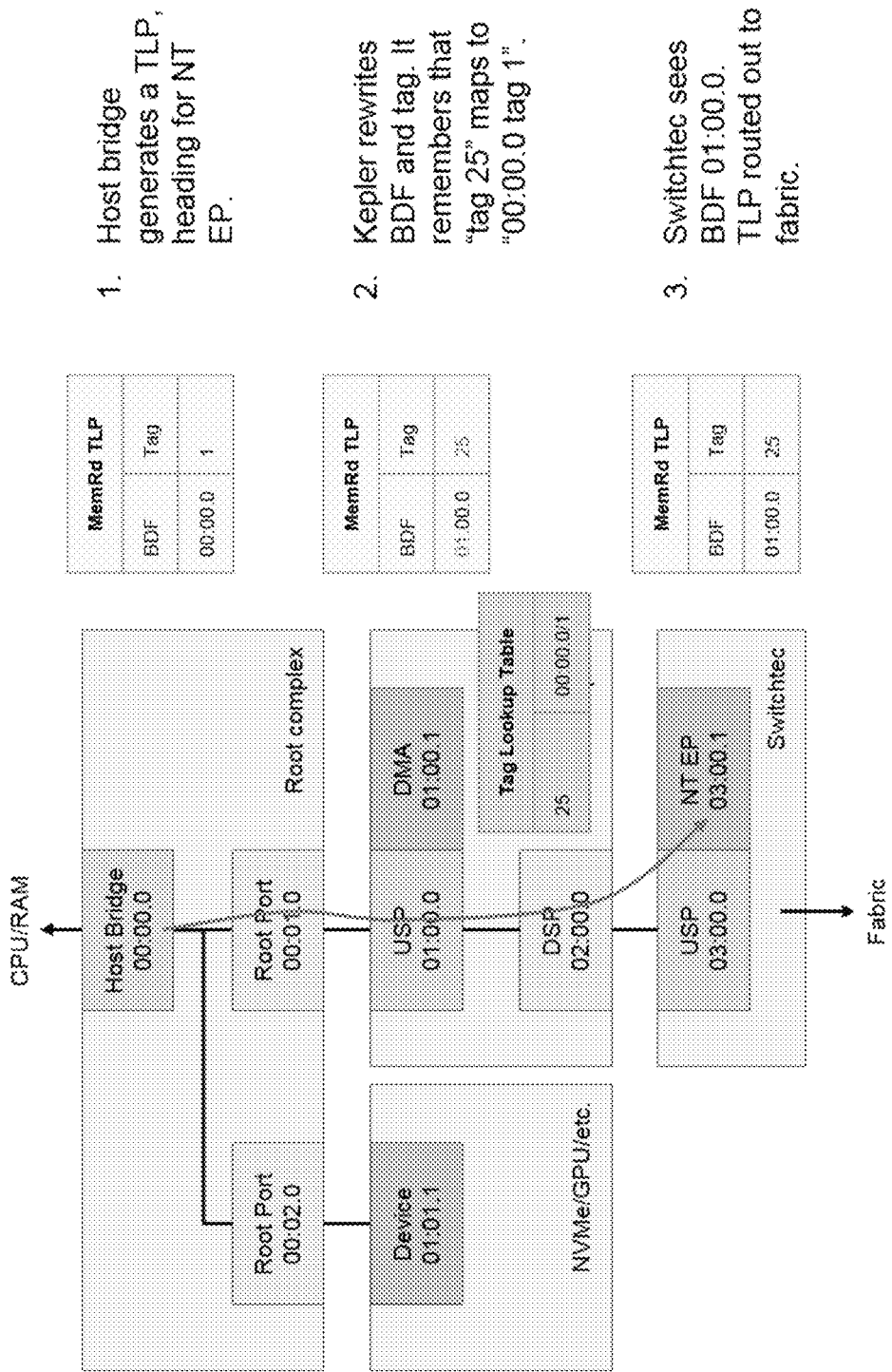
FIG. 41 is a graphical representation of an exemplary Switchtec-based memory read request operation within a PCIe-based system.

Referring now to FIG. 40, a local PCI bus topology 4000 is shown with various PCI devices having assigned PCI bus/device/function numbers and local PCI bus addresses. In FIG. 40, the exemplary device 4002 (such as e.g., a Kepler PCIe card manufactured by the Assignee hereof) associated with a host 4001, BARs X 4004, Y 4006 and Z 4008 are all seen by the BIOS and thus are assigned local PCI bus address. This makes them accessible to all local PCI devices in the topology 4000. Various requirements of the implementation of FIG. 40 include:

1. REQ1—This requirement provides a direct mapping between local PCI address space and the private PCI address space. In FIG. 40, this is BAR X 4004 of device 4002 mapping directly, 1 to 1, to BAR 0 of the NT EP 4010 of the e.g., switch device 4003 coupled to the host 4001 (e.g., via cable).

2. REQ2—This requirement provides control of the device 4002 DMA engines described below. As such, it effectively allows access to the entire private PCI address space via a much smaller local PCI address space. In FIG. 40, BAR Y 4006 provides access to all of BARs 0 4012, 2 4014 and 4 4016 private address ranges.

3. REQ3—This requirement provides access to a subset of the private PCI address space assigned to BARs 0, 2 and 4 via a mapping function controlled by page tables in BAR Z 4008. This enables PCI "peer to peer" data movement as described below.

DMA Data Movement to/from Private Address Space—

Referring to FIG. 40, a local device 4002 (e.g., the Kepler device) hides the NT EP PCI device BARs 0 4012, 2 4014 and 4 4016 below it from the BIOS. These BARs are assigned private PCI bus addresses by the FM and are visible to the device 4002 DMA engines. In addition, the DMA engines can read and write local PCI bus addresses assigned by the BIOS. Thus, the device DMA engines can perform reads from, or writes to, local PCI address space while writing to or reading from private PCI address space.

Local PCI Device Data Movement to/from Private Address Space—

In the discussion above, only the DMA engine of the local device 4002 has visibility or accessibility to all of the hidden BARs (and thus all of the private PCI address space). It is beneficial for any local PCI device to access the private PCI address space as well. To provide this functionality, one exemplary embodiment of the topology described herein utilizes a subset of the private PCI address space, which is made accessible via a mapping function contained within BAR Z 4008 of the device 4002. BAR Z 4008 is in some implementations a much smaller size that the total private PCI address space, but it is programmable via e.g., page tables. Thus, it can be modified to map any of the private space, but no more than the specified size of BAR Z 4008 at a given point in time (which may or may not be static).

If the local PCI device is a local CPU, the data movement is typically referred to as a programmed IO (PIO). If the local PCI device is not the local CPU, the data movement is typically referred to as a PCI peer-to-peer transaction.

Data movements targeting the private address space can map to remote system memory; MSI interrupt mechanisms; or PCI device BAR addresses.

Remote Device Lending—

Currently, most PCI devices are controlled and utilized exclusively by a local system. In order for a remote system to utilize a PCI device contained within another system, the PCI device must be "moved" from the local system into the (utilizing) remote system. This can be effected by either (i) physically moving the PCI device from the local to the remote system, or (ii) by modifying the PCI fabric to which the local and remote systems are connected. The latter case (ii) is commonly referred to as "disaggregation and composition" of systems and devices. In these cases, both the local and remote systems must be shut down, the PCI device must be "moved" (physically or logically) and the two systems must be rebooted.

Advantageously, according to the exemplary embodiments herein, a local system can access all BARs of a remote PCI device via either DMA engines, peer-to-peer transaction, or programmed IO. As such, this mechanism allows for a remote device to be controlled by a local system. In this way, a remote device can be "lent" to a local system for use. Moreover, a remote device can become dynamically accessible to a local system without the need to shut down or reboot either the local or remote systems.

Requester ID Mapping Conservation—

In the exemplary context of PCI, for a PCI bus, all PCI devices are assigned a unique bus/device/function (BDF). The BDF is commonly referred to as a requester ID (RID). As described for PCI addresses above, there is a concept of a local RID and a private RID. When utilizing non-transparent bridging between PCI domains, a mapping must occur between the RID space of a local PCI bus and that of a remote PCI bus; i.e., to create a local RID to "private" RID mapping. This RID mapping takes up resources within a PCI fabric implemented with non-transparent bridging. Additionally, these mappings are additive: as the fabric grows in size and consequently in terms of RIDs, the RID mapping tables maintained by switches increases. This growth in RID mapping table size limits the overall size of a practical deployment of PCI non-transparent bridging.

Hence, in one embodiment of the present disclosure, a subset of local RIDs are multiplexed to a single private RID upon ingress into the private PCI domain. This requires in one implementation utilization of "multiplexing" bits within a given PCI TLP. This can be accomplished in one exemplary configuration by redefining the meaning of the 8 bit PCI TLP "read tag" field to include (i) a "RID mux" portion and (ii) a read tag portion. For example, the upper three (3) bits can be defined as the RID mux portion, and the lower five (5) bits could be interpreted as the PCI TLP read tag portion.

In PCI, the TLP read tag field is treated as an opaque field by everyone but the originating PCI device. Thus, if the origination PCI device were to implement this multiplexing, it could effectively utilize one private RID to transfer 8 ($2^3$) local RIDs. The multiplexing and de-multiplexing would be performed by the originating PCI device. In the example of FIG. 40 this would be the device 4002.

In the exemplary context of FIG. 40, for RID reduction, an internal BDF is replaced with a substitute (e.g., Acc Card) BDF, and the read tag is replaced and used as a lookup in a table on the device (e.g., Acc Card) to map back to the original BDF and Tag).

Figure 42:
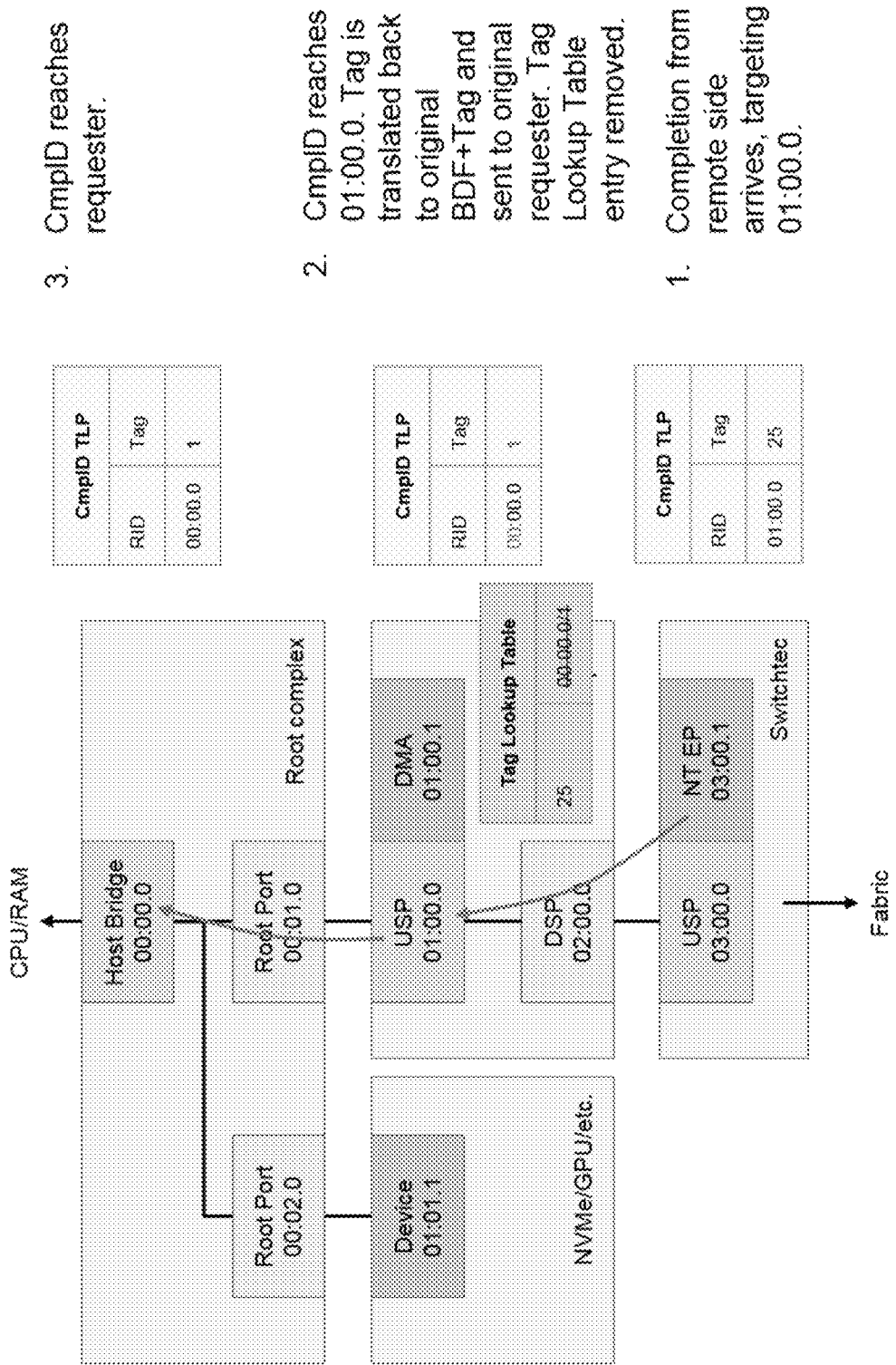
FIG. 42 is a graphical representation of an exemplary read request response operation in the context of FIG. 41.

Alternatively, a TLP prefix is used. In one exemplary implementation (based on a Microsemi Switchtec architecture; see FIGS. 41-42), "phantom functions" are not supported, and hence all devices would share 256 read tags. Notably, Switchtec creates new (B)DFs in any far side partition; these BDFs are aliases to the true destination BDF.

User Message Context (UMC) Implemented as Dynamic Queue Pairs—

When implementing an all-to-all communication mechanism over a load/store semantic fabric such as that of the exemplary PCI express embodiments, the proliferation of queue pair structures may become impractical.

As a brief aside, a UMC (user message context) consists in one context of an array of DQPs (dynamic queue pairs) and SRQs (static receive queues). A DQP supplies user space-accessible TX and RX queues. The TX side of a DQP is wired to the RX side of another DQP on a remote node, and likewise in the other direction. Since the both TX and RX are mapped into the user space process, no transition to the kernel is needed to read or write a DQP.

An SRQ (static receive queue) supplies a user space-accessible RX queue, but not a TX queue. The TX side is provided by the shared per-node KMC (kernel message context). As the name suggests, the user must transition to the kernel to make use of the KMC. SRQs are statically mapped to the KMC from each node in the fabric (and likewise, the KMC is statically mapped to an SRQ in each UMC in the fabric). That is, the KMC can transmit a message to every UMC in the fabric.

Figure 43:
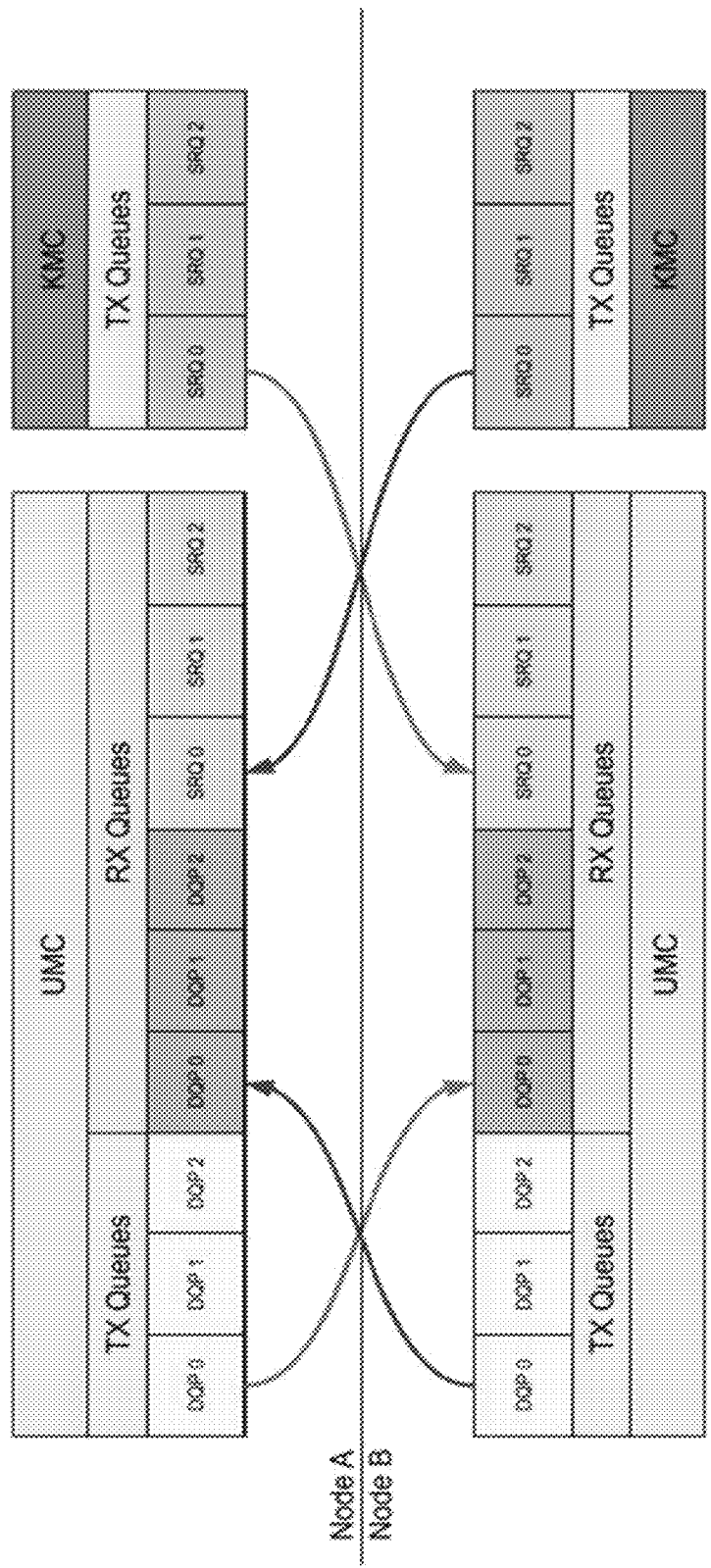
FIG. 43 is a graphical representation of an exemplary simplified UMC (user message context) and KMC (kernel message context) on two different nodes (A and B), with possible connectivity shown between exemplary queues.

FIG. 43 shows a simplified UMC and KMC on two different nodes, with possible connectivity shown between queues. Since DQPs are both read and written from user space, they typically provide the best performance. However, creating and connecting enough DQPs such that all endpoints can communicate would be impractical. Initially, bindings from UMCs to endpoints are one-to-one. Therefore, DQPs connecting all endpoints requires $n^2$ DQPs (where n is the number of endpoints, often equal to the number of logical cores per node times total node count). This would consume a large amount of memory and would require the receiver to scan a large number of queues, many of which would not be used (or would be used rarely).

Based on the foregoing, one exemplary embodiment of the present disclosure implements a subset of all-to all communication mechanism utilizing dynamic QPs. The number of DQPs per UMC are limited, and SRQs exist to complete the connectivity graph. The number of SRQs per UMC is in one implementation equal to the number of remote nodes (rather than the number of remote endpoints, as in a DQP), and therefore scales well. However, writing to an SRQ typically must be performed through a KMC in the kernel, thus the transmit latency is higher.

Figure 44:
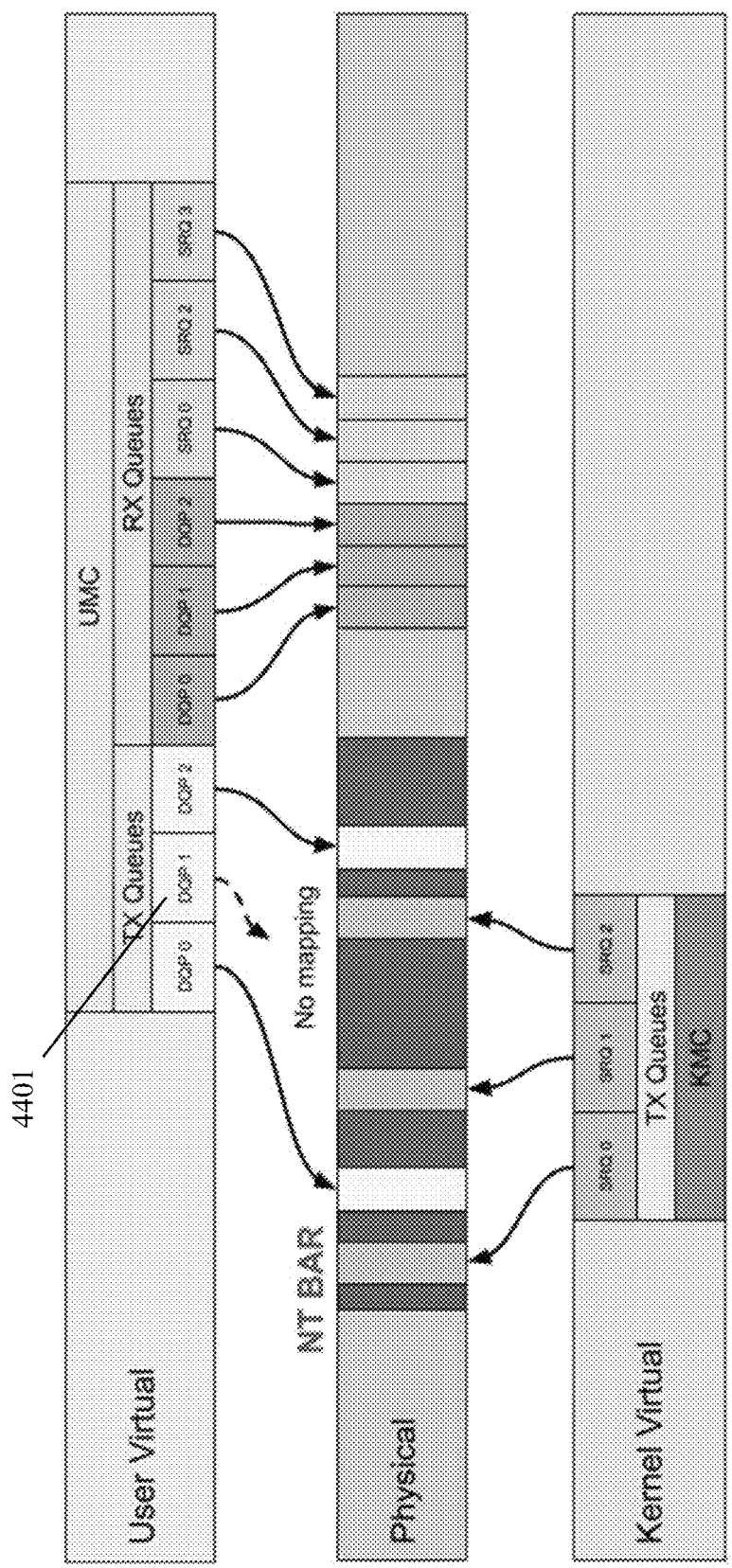
FIG. 44 is a graphical representation of an exemplary user virtual-to-physical mapping, and kernel virtual-to-physical mapping, according to one embodiment of the disclosure.

Referring to FIG. 44, the RX queues are backed by physical memory on the local node (which need not be contiguous). The TX side of the DQPs may map to queues on various different nodes. Not all slots need to be mapped if there has not yet been a need. For example, in FIG. 44, DQP 1 4401 is not yet mapped. The KMC is statically mapped (i.e., mapped once at setup time). In one implementation, a slot exists in the KMC for every remote UMC in the fabric.

In one embodiment, the "RX Queues" portion of the UMC is allocated and IO mapped to the fabric by the kernel at module load time. A simple array of UMC RX queue structures is allocated, whose length determines the maximum number of UMCs available in the system (the default length is given and explained in the next section). This simplifies assignment of queues at runtime. It may also be useful in future environments where the IOMMU is not enabled, since it would allow the kernel to allocate a large, physically contiguous chunk and simply report its base and limit to peers (vs. needing to exchange an SG list with peers. Note that it is convenient but not necessary for the region to be physically contiguous, since it will be accessed through the MMU). However, it's also possible that future designs may support a more dynamic allocation scheme for larger clusters as a memory conservation measure.

The size of each DQP region is in one implementation dictated by the following: (i) the number of DQPs per UMC; and (ii) the size of each queue.

Initially, each UMC will be bound to a single endpoint which supports enough DQPs that its frequent communication partners are able to use a DQP (this number may be quite a bit smaller than the total number of endpoints; for example, [1] suggests 2 log (n) as a reasonable number, as it supports common communication patterns. (As an example, a cluster with 1024 nodes, each with 16 cores: 2 log(1024≠16)=28)). More queues increases the cost of polling, since each queue must be polled.

The size of each queue in one implementation will be exposed to the user process via mmap( ), so it is 4 KiB aligned.

The default values of the exemplary embodiment are 32 DQPs per UMC, and 8 KiB per DQP. Therefore, each UMC is allocated 256 KiB for DQPs.

In the exemplary embodiment, the size of each SRQ region is dictated by the following: (i) the number of remote nodes; and (ii) the size of each queue. For example in one configuration, there is an SRQ allocated for all remote nodes that this UMC may ever receive a message from.

Cluster size may vary, however, the initial default is in one implementation 256 nodes. The default size for each SRQ is the minimum of 4 KiB. Therefore, each UMC devotes 1 MiB to SRQs.

Figure 45:
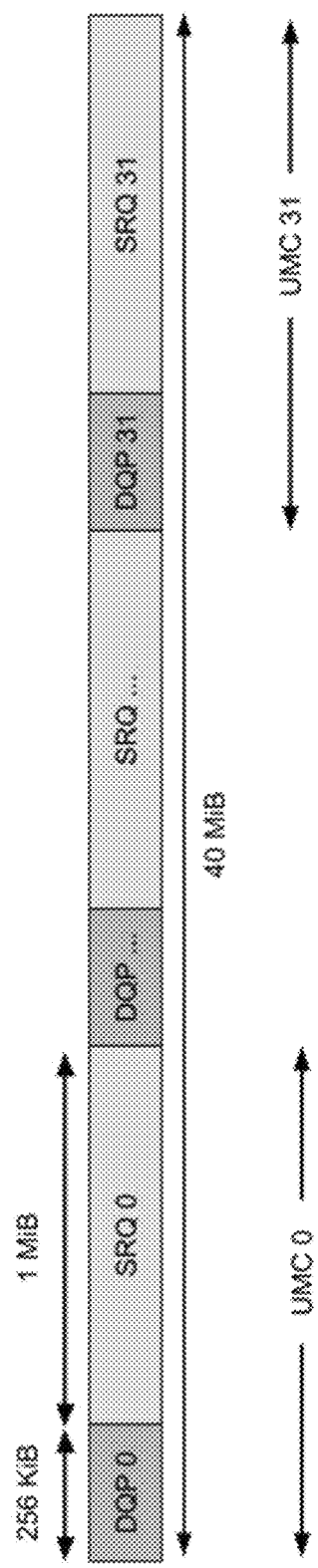
FIG. 45 is a graphical representation of an exemplary node memory allocation to the fabric according to the disclosure.

It will be appreciated that all of the values mentioned above can be tunable and/or dynamically assigned. However, for the exemplary embodiment, the total memory allocated and exported to the fabric by each node according to the defaults as given is (see FIG. 45):

(256 KiB+1 MiB)·32=40 MiB

In the exemplary embodiment, the KMC space must provide a path to every remote UMC on the system. As stated above, the initial defaults of one implementation support 256 nodes, each with 32 UMCs, with SRQs sized at 4 KiB. Therefore, the amount of memory the KMC must map from the NT BAR is:

4 KiB·255·32=31.875 MiB

The considerations for UMCs are different. Since unused TX DQP slots in the UMC do not map to memory, their cost is "free", in terms of imported fabric memory. However, if all DQP slots become occupied, the mapped memory must now be visible in the NT BAR. As given in the previous section, each UMC has 32 DQP slots at 8 KiB each, and each node has 32 UMCs. Therefore, the maximum amount of memory all UMIs must map from the NT BAR is:

32·32·8 KiB=8 MiB

Therefore, the maximum total amount of memory that must be reachable through the NT BAR is approximately 40 MiB in the illustrated example.

BAR Range—

The kernels of nodes that wish to communicate need to know where to find the UMC regions for their peer. For the exemplary embodiment, this is accomplished by "piggy-backing" on the address exchange that already takes place between KLPP peers. This exchange happens the first time a node's name is resolved for the purpose of exchanging numeric addresses. The nodes will additionally exchange the base IO address of their RX queue regions. The nodes also check that they are using the same size queues (in case tunable values have been adjusted on some nodes but not others).

Endpoint Binding—

As a brief aside, OpenFabrics Interfaces (OFI) is a framework enabling exporting fabric communication services to applications. OFI can be described as a collection of libraries and applications used to export fabric services, and salient components of OFI include application interfaces, provider libraries, kernel services, daemons, and test applications. Libfabric is a core component of OFI; it is the library that defines and exports the user-space API of OFI, and is often the only software that applications deal with directly. It works in conjunction with provider libraries, which are often integrated directly into libfabric.

Libfabric provides the concept of a "transmit context" and "receive context." Specifically, an endpoint must bind to one of each in order to send and receive messages. These contexts may be shared between endpoints (fi_stx_context/ fi_srx_context) or exclusive to one endpoint (fi_tx_context/ fi_rx_context). The sharing mode of the transmit side and the receive side need not match; e.g., an endpoint can bind to a shared transmit context and an exclusive receive context.

Similarly, a UMC is bound to an endpoint, and offers a similar shared/exclusive model, in which a UMC may be bound to one or many endpoints. However, the functionality of DQPs requires symmetric binding. This is because part of the queue pair is used for metadata sync between peers (see scratchpad description in "Producer (send side) Process for Eager Send"). This requires exactly one RX queue and one TX queue on each side, an invariant that asymmetric binding breaks.

DQP Assignment—

Figure 46:
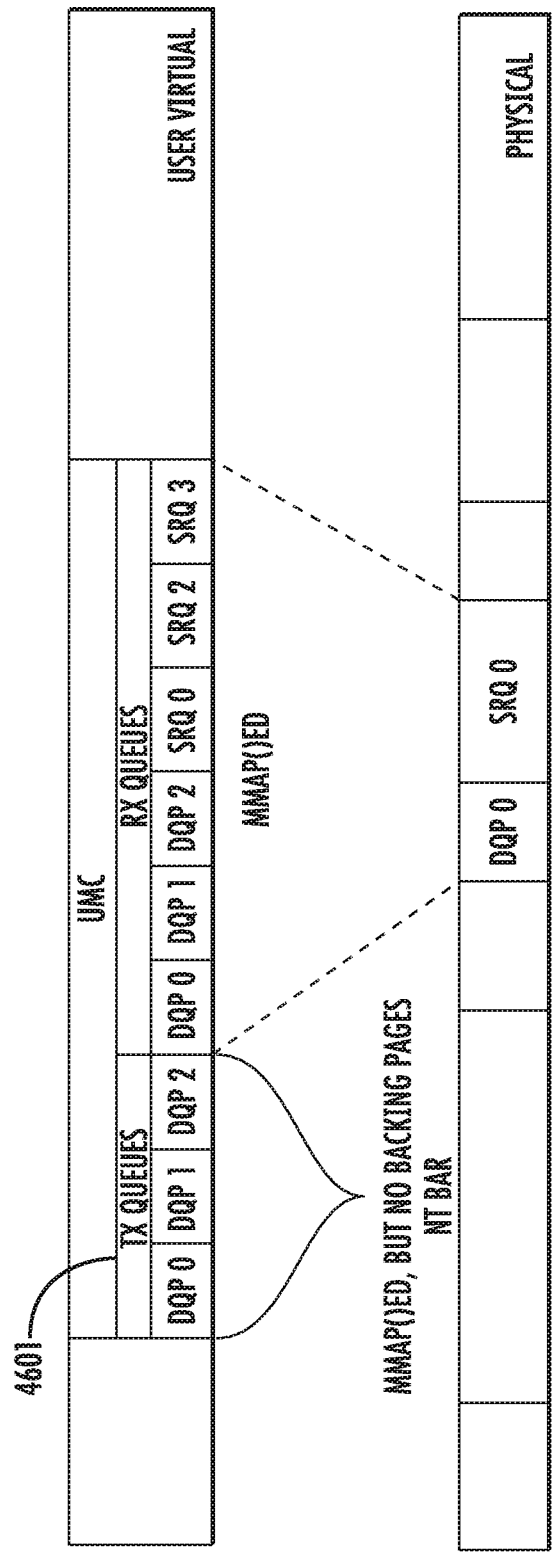
FIG. 46 is a graphical representation of an exemplary DQP assignment and mapping, according to one embodiment of the disclosure.

Initially, all DQPs are unassigned in the exemplary embodiment. The TX and RX regions are mapped into the user process; however the RX queues are all empty, and the TX queues 4601 have no backing pages. FIG. 46 is a simplified illustration of the structures with three (3) DQPs per UMC (the SRQ region is shown, but the details are omitted for clarity).

The mechanism for connection of a DQP is a DQP_REQUEST command. The possible replies include DQP_GRANTED and DQP_UNAVAIL. In one implementation, such a command is issued when: (i) an endpoint sends a message to a remote endpoint for which its bound UMC does not have a DQP assigned (i.e., it must use the KMC to send this message); (ii) the endpoint's bound UMC has a free DQP slot; and/or (iii) the remote UMC has not returned a DQP_UNAVAIL within the UNAVAIL_TTL.

When a UMC must refuse a DQP_REQUEST because it has no free DQP slots, it will return a TTL to the sender reporting when the sender may try again. This is to prevent a flood of repeated DQP_REQUESTs which cannot be satisfied.

In one implementation, the DQP_REQUEST is issued automatically by the kernel when a user makes use of the KMC (note that alternate configurations may allow for the user to skip this step and only assign DQPs when explicitly requested). The kernel will transmit the user's message via the KMC, and additionally send a DQP_REQUEST message to the remote system's kernel receive queue (ntb transport queue).

Figure 47:
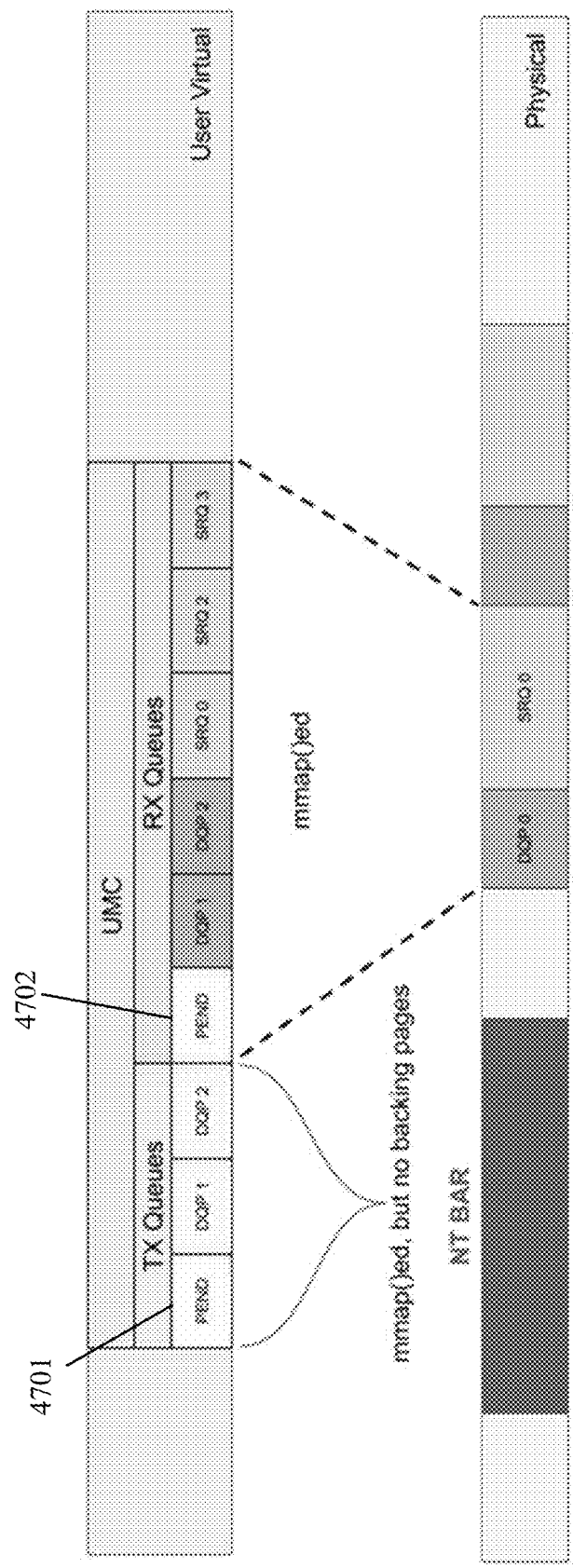
FIG. 47 is a graphical representation of a DQP_REQUEST command marking a next available slot as "pending" according to one embodiment of the disclosure.

When the kernel sends a DQP_REQUEST command, it marks the next available slot 4701, 4702 in both the TX and RX queues and NT as "pending" and reports that slot number in the DQP_REQUEST. The slot remains in this state until a reply is received. See FIG. 47.

A node that receives a DQP_REQUEST must check if the local UMC has an available slot. If so, it will assign the slot, and reply with DQP_GRANTED and the assigned slot index. Note that if there is no slot, it replies with DQP_UNAVAIL and the UNAVAIL_TTL.)

Figure 48:
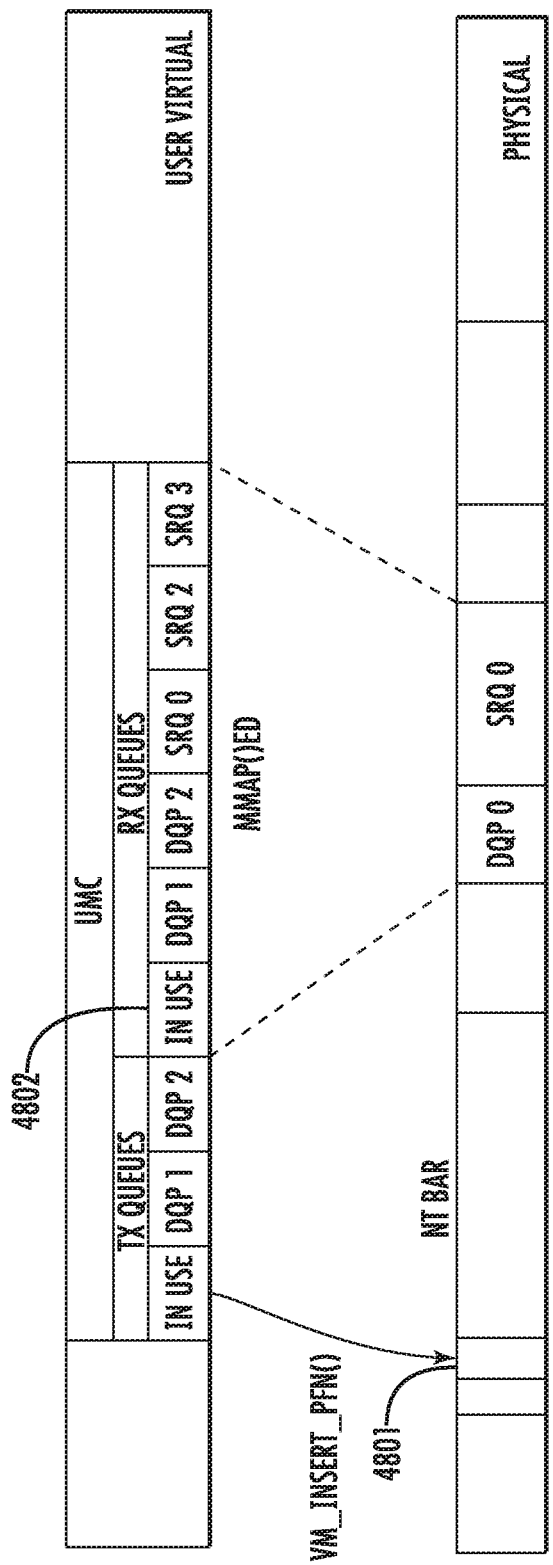
FIG. 48 is a graphical illustration of mapping of a TX queue into NT BAR space, and marking of the RX queue as in use according to one embodiment of the disclosure.

Both nodes will map the TX side into the NT BAR 4801, and will mark the RX side as in use 4802. See FIG. 48. The users are informed of the new DQP mapping by an event on the kernel-to-user queue. The address of the newly mapped DQP is provided by the kernel, allowing the user to identify the source of messages in the RX queue. If the UMC is shared by multiple endpoints, all associated addresses will be reported, with an index assigned to each. This index is used as a source identifier in messages.

Exemplary implementations of the foregoing and additional details are described in U.S. Provisional Patent Application Ser. No. 62/898,489 filed contemporaneously herewith on Sep. 10, 2019 and entitled "METHODS AND APPARATUS FOR NETWORK INTERFACE FABRIC SEND/RECEIVE OPERATIONS" which is incorporated herein by reference in its entirety.

Receiver Direct Buffer Management—

With typical network adapter cards based on e.g., Ethernet and InfiniBand (Mellanox), receive hardware and memory on the card is required to receive data from a sender. For example the receiver hardware is required to have a receive buffer and a receive DMA unit. The receive hardware receives data from the network in order to make the data available to a receive DMA unit; the DMA unit must obtain a receive DMA descriptors from a receive DMA descriptor ring, and the DMA unit must copy the received data to system memory identified by the receive DMA descriptor.

In networks based on e.g., PCI express (PCIe), an optimization is possible due to the load/store semantic of the fabric. Since the sender hardware moves data directly to a receiver's memory, the required receiver hardware as described above can be eliminated; i.e., the receive DMA buffer and the receive DMA unit. This reduces one-way latency as well due to elimination of store-and-forward functionality on the RX device.

Alternate Technologies

It will be appreciated that while aspects of the present disclosure are cast in terms of PCIe-based "fabrics" comprised of a plurality of devices interconnected via e.g., cabling or similar physical layer, the aspects of the disclosure may also be applied and adapted to other types of applications including, without limitation, memory or other data fabrics or even crossbar technologies, such as for example those utilizing CCIX (Cache Coherent Interconnect for Accelerators) or Gen-Z technology, or Nvidia NVSwitch/NVLink technology.

Cache Coherent Interconnect for Accelerators (CCIX) technology is intended to provide for faster interconnects than currently available technologies, with cache coherency allowing faster access to memory in a heterogeneous multi-processor system. Efforts within CCIX have focused largely to date on enabling hardware accelerators to use memory shared with multiple processors in a cache coherent manner. Applications for CCIX technology include for example machine learning, network processing, storage off-load, and in-memory database. Specifically, when multiple processors (e.g., CPUs or GPUs or DSPs) share a common memory space, performance gains can be realized via communicating the cached and/or cacheable state of portions of that memory. Hence, each CPU can safely work on a portion of a common data set without having to use highly latent software mechanisms (e.g., semaphores) to control memory access. CCIX technology extends this concept to agents other than CPUs, thereby enabling inter alia hardware accelerators to gain the same benefits. CCIX's coherence protocol is also vendor-independent, so CPUs, GPUs, DSPs, and other accelerators can each participate.

Specifically, in the context of the present disclosure, the various communication mechanisms and architectures described herein may advantageously be applied to CCIX-based applications (and vice versa) so as to enable, inter alia, efficient scaling of topologies. As such, the mechanisms and architectures described herein are equally applicable, with similar advantages, whether the components used to build the fabric supports the PCIe protocol, the CCIX protocol, or both.

Conversely, Gen-Z technology relates to an open systems interconnect designed to provide memory semantic access to data and devices via direct-attached, switched, or fabric topologies. Gen-Z technology is intended to support a wide range of new storage-class memory media, new hybrid computing technologies, new memory-centric solution architectures, and applications. Gen-Z technology utilizes memory media independence; i.e., Gen-Z technology abstracts the memory media to enable different types and mixes of volatile and non-volatile memory (NVM) to be directly accessed by applications or through block-semantic communications. It further uses a memory-semantic protocol that simplifies hardware and software designs, and supports a wide range of signaling rates and link widths. Multipath used within Gen-Z also increases aggregate component performance, enables very high signaling rates enables solution resiliency to prevent loss of data access, and enables traffic segregation to allow services and applications to be isolated from one another.

Another intended attribute of Gen-Z is scalability from the simple point-to-point solutions to rack-scale, switch-based topologies. Gen-Z is also intended be incorporated into any solution using a wide range of existing mechanical form factors and cables, and specifies a scalable connector configuration that ostensibly provides significant improvements in signal integrity and density. Gen-Z is further intended to support unmodified operating systems, unmodified applications and middleware and unmodified I/O device drivers to enable Gen-Z to be integrated into existing solutions.

The mechanisms and architectures described herein are accordingly equally applicable, with similar advantages, whether the components used to build the fabric supports the PCIe protocol, the Gen-Z protocol, or both.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I—GLOSSARY OF TERMS

Copyright © 2018-2019 GigaIO, Inc. All Rights Reserved

| TERM | MEANING |
| --- | --- |
| BAR | PCIe Base Address Register. |
| DSP | Downstream Port |
| EDGE Switch | Contains only NT EPs |
| FMM | Fabric Manager Master |
| GAS | Global Address Space - a memory region local to Switchtec Hardware that serves as the interface between switch function/firmware and an external agent like a connected Host. |
| HUB Switch | A Distribution Switch ("Director" in earlier diagrams) containing only NT Crosslinks. |
| Hybrid IO Switch | Contains one or more USPs & DSPs as well as one or more NT Eps. |
| IO Switch | Contains USPs & DSPs - no NT EPs |
| IOVA | IO Virtual Address. This often refers to an address space, which is allocated and protected by the IOMMU. |
| TR (letter) | Topology Record - a data structure used to manage the LEX |
| LUT | Look Up Table Entry. The term LUT is used to describe an entry within an individual Switchtec switch that allows address translation to take place and thereby performs a routing function. |
| MSIx | Message Signaled Interrupt Extended, which is an interrupt packet sent to a host over PCIe. |
| Node | A host connected to and participating in the PCIe fabric. |
| NT EP | Non Transparent End Point |
| RID | Requestor ID |
| Route | The path through which PCIe transactions flow from a source to |
| Terminal LUT | The Lookup Table associated with the ingress NT EP closest to a source node. |
| TLP | Transaction Layer Packet. This is the PCIe data structure with which PCIe transactions take place. |
| USP | Upstream Port |
| VEP | Virtual EP |

APPENDIX II—EXEMPLARY MESSAGES AND COMMANDS

Copyright © 2018-2019 GigaIO, Inc. All Rights Reserved

Fabric Manager Messages—

In one implementation, messages are sent between the Fabric Manager Master 1202 and its Minions 1204 over an administrative network or interface (e.g., Ethernet) using existing protocols such as e.g., TCP, HTTP, and REST. The FMM generally sends command messages to the Minions, and Minions send event messages to the Master. In one implementation, messages include a version number, sequence number, op-code, message type data, an ID of the FM Master, and ID of the FM Minion, a result code, handling code, and tag. Depending on the message type, the foregoing can also be appended with e.g., Topology Record (TR) data. Specifically:

1. The VERSION field indicates the current message format.

2. The SEQUENCE_NUMBER is incremented by each source on a message by message basis, except in the case of the command response message, which shares the same sequence number as the command for which the response is meant.

3. The MSG_TYPE field identifies the individual message as follows:

| MSG_TYPE | Message Type |
| --- | --- |
| 0 | Command Message |
| 1 | Command Response Event |
| 8 | Generic Event |

4. The OP_CODE identifies the specific kind of message within the message type that is being sent.

5. MASTER_ID identifies the FMM 1202 involved in the message either as the source or destination.

6. MINION_ID identifies the Minion 1204 involved in the message either as the source or the destination.

7. The RESULT_CODE is ZERO for successful commands; otherwise, it is a number that describes the error case.

8. The HANDLING_CODE, denoted "HNDLING" above, is a value that describes special handling for the message. For example, it may indicate that the TR is not included, or it may indicate that only portions of the TR are included. These codes can be defined for optimization or other special purposes.

9. The TAG is a 16-bit value for use by the source. The TR follows the fields mentioned above unless a HANDLING_CODE dictates otherwise.

Commands—

MSG_TYPE=0.

Commands in general are sent from the FMM 1202 to one or more of its minions. In response, minions send a command response event after the task has been completed. Individual command responses share the same "op_code" with the command to which they respond. In one implementation, the only difference in the first three words of the message packet between a command and its response is the MSG_TYPE ("0" for the command, and "1" for the command response).

CMD_REGISTER_NODE

OP_CODE: 0x01

This command is sent by the FMM to minions in response to an EVT_REGISTER_NODE event. Minions receiving this command update their route programming and address resolution information for the newly discovered node.
CMD_REMOVE_NODE
OP_CODE: 0x02

This command is sent by the FMM to minions in response to an EVT_REMOVE_NODE event. Minions receiving this command update their route programming and address resolution information for the newly removed node.
CMD_UPDATE_FABRIC
OP_CODE 0x03

The FMM sends this command to alert its minions of a change on the Fabric. This command might be sent to simply update the TR version as part of a heartbeat, but is also sent to announce node discovery or removal.
CMD_UPDATE_TR
OP_CODE 0x04

The FMM sends this command to the node minion who recently announced its presence with a REGISTER_NODE event. This command gives the node minion the latest copy of the TR and instructs the node to continue its registration tasks.
CMD_QUIESCE_FABRIC
OP_CODE 0x05

The FMM sends this command to node minions during the bring-up of a new topology. In response, Node Minions "gracefully" halt traffic on the fabric.
CMD_CONFIG_ROLE
OP_CODE 0x06

The FMM sends the CONFIG_ROLE command to its Switch Minions during switch validation, which is part of topology instantiation. The command instructs minions to configure their switches and assume the particular role assigned in the TR. Switches continue with tasks to validate their position within the fabric before sending the response.
CMD_VERIFY_IO
OP_CODE 0x07

This command is sent from the FMM to its switch minions during topology bring-up. It signals the beginning of the IO Path Validation phase and instructs the minions to carry out tasks meaningful during that phase such as restoration of dynamic configuration settings.
CMD_ABORT
OP_CODE 0x86

This command is sent by the FMM to Minions actively engaged in a command task in order to stop task processing. Early detection of an error during topology instantiation is one possible use-case. The FMM once alerted of an instantiation failure, can abort outstanding tasks and bring all actors to an idle state.

In one implementation, the CMD_ABORT message includes not one, but two headers. The first header is the header for the abort command itself. The second is the header for the command being aborted. In this case, the handling field of the command being aborted is ignored.

Note that the exemplary implementation of the abort command is designed to include the entire header of the command being aborted for the sake of simplicity—the FMM can simply copy an entire header into the body of the abort message. In some cases (when desirable to reduce bandwidth usage on the administrative network), some of the data of the header for the command being aborted may be removed, so long as enough is retained to unambiguously identify the operation that needs to be aborted.
Events—
MSG_TYPE=8.

Events are generated by fabric participants, FMM 1202, SM 1204a, and NM 1204b. They are asynchronous, however, in the case of command response events, they are "solicited" event. Another type of solicited event is a status update for a requested diagnostic. Unsolicited events may occur when a minion detects a problem with switch hardware.
EVT_<COMMND>_COMPLETION
OP_CODE (special—same as command for which the response is meant) Substitute the appropriate command in the <command> field above.
EVT_CMD_TIMEOUT
OP_CODE 0x40

A command timeout is a condition that may be detected by any fabric manager (minion or master) and reported to the Master or one or more Minions. An example is a Celery (or SALT) task timeout. The EVT_CMD_TIMEOUT may be sent from any fabric manager to the Master to report the detected timeout condition. The FMM will take appropriate action in response.
EVT_DIAGNOSTIC_UPDATE
OP_CODE 0x41

This event is sent from Minion to Master to convey data related to a requested diagnostic command. One possible use case is to use a handling code that indicates an offset to a data-block within the message. In some instances, TR data need not be present.
EVT_REGISTER_NODE
OP_CODE 0x42

This event is sent from a newly booted Node Minion 1204b to the FMM. The FMM sends a CMD_UPDATE_TR in response, which instructs the node to continue with its registration tasks.
EVT_NODE_REMOVED
OP_CODE 0x43

This event is sent by the Switch Minions, or potentially a Node Minion that wishes to withdraw from the fabric on its own. More likely, the Switch Minion detects a LINK_DOWN condition on local switch hardware and sends this event to the FMM to report that a node has gone down.
EVT_FABRIC_UPDATE
OP_CODE 0x44

This event is sent by the FMM to alert its Minions of a change in the TR, which may only be the version number that is updated periodically. A change in the TR may also indicate discovery or removal a node.
EVT_PORT_UNBOUND
OP_CODE 0x45

This event is sent by the Switch Minion to the FMM to report the success of a requested port unbinding command.
EVT_PORT_BOUND
OP_CODE 0x46

This event is sent by the Switch Minion to the FMM to report the success of a requested port binding command.
EVT_HEARTBEAT
OP_CODE 0x47

This event is sent by Minions to the FMM as a periodic check-in, which confirms the Minion's continued participation in the fabric.
EVT_AWAKENED
OP_CODE 0x48

This event is sent by Switch Minions to the FMM to announce their presence after power-on reset.
EVT_ACK
OP_CODE 0x49

This event is sent by FMM to a Minion to acknowledge an EVT_AWAKENED event.
EVT_REJECT
OP_CODE 0x50

This event is sent by the FMM to a Minion to reject its attempt to join the fabric after awakening. The REJECT may reflect that the FMM is in a BUSY state, or that the Switch Minion is not recognized by the Master as an accepted participant in the fabric topology.

REST Requests—

The FM provides an interface for requests from the administrator and replies to the administrator. In exemplary configurations, this is currently presumed to take the form of REST (Representational State Transfer) requests and responses. It will be appreciated, however, that REST is merely one convenient mechanism for handling requests and responses—another form of requests and responses (e.g., command line programs) may be used consistent with the present disclosure instead of or in addition to REST. In one implementation, REST requests are made as HTTP GET, POST, etc., operations. As such, a URL is associated with each request. The following provides an exemplary listing of general requests and provided information.

GET_TOPO_LIST

This resource is a list of available static topologies that are available.

GET_TR_TEMPLATE

This is a request for TR Template that is submitted with a SET_TOPOLOGY command. As such, it is associated with an individual available topology.

GET_TOPO_STATUS

This resource reports on the active state and status of the currently running topology.

GET_TOPO_UPDATE_PROGRESS

This resource reports on the progress of a pending SET_TOPOLOGY command.

GET_FABRIC_MANAGERS

This resource returns the hostnames and IP addresses of all minions and the master for the fabric.

SUBSCRIBE_EVENTS

This request subscribes the REST client to particular EVENT notifications. The mechanism for this feature can vary depending on, e.g., the application. For example, some may use WebSockets, while others use existing publish/subscribe mechanisms. The Fabric Manager itself is intended to be agnostic to the transport used for subscriptions.

RUN_DIAGNOSTIC

This request commands the fabric to run a particular diagnostic among available diagnostics.

RESET_FABRIC

This request asks the Fabric Master to reset the fabric. This assumes that the fabric is (or was) intact, and that the Master is acknowledged by all Minions involved in the reset.

Miscellaneous Commands—

CLEAR_TR

This command is performed by individual switches, and instructs the Minion to delete its current TR. This brings the affected switch into an "uninitialized" state, which allows it to participate in a new SET_TOPOLOGY command issued by any Master. If for example, the exemplary LEX switch had and older TR issued by a Master that no longer exists, it would refuse commands issued by any other Master since the IDs do not match. If the TR does not exist, the Minion is considered open.

APPENDIX III—EXEMPLARY MSI DB API

Copyright © 2018-2019 GigaIO, Inc. All Rights Reserved
1. Allocating Host Side—
Note the use of MSI handle, which is defined as:
    phys_addr_t MSI offset from the MSI base (currently 0xFEE0_0000)
    u32 MSI data
The handle can be used on both devices.
int ntb_msi_is_unsafe(struct ntb_dev *ntb)
    Analogous to ntb_db_is_unsafe( ).
    Returns zero (0) in GigaIO case.
int ntb_msi_alloc(struct ntb_dev *ntb, void **hdl, u32 *hdl_sz)
    Allocate an MSI (if available). Return the handle that is used as argument in other MSI API calls, and which is intended to be passed to the peer client for use in the ntb_peer_msi_set( ) call.
    Returns the MSI index and the handle.
int ntb_msi_free(struct ntb_dev *ntb, void *hdl)
    Frees an allocated MSI. Passes the MSI index. The caller does not retain the associated handle.
ntb_msi_set_mask(struct ntb_dev *ntb, void *hdl)
    Mask the IRQ for the indicated MSI index. The effect is to mask the indicated MSI.
    In one variant, the MSI is disabled from being able to call the ISR. Alternatively, the call can be masked to the NTB client callback function.
    struct irq_chip has irq enable/disable and mask/unmask ops, which may be appropriate in certain circumstances. Enable/disable may only be called in IRQ context.
ntb_msi_clear_mask(struct ntb_dev *ntb, void *hdl)
    Similar approach as set mask supra. This will clear the IRQ mask, allowing the MSI to occur and call any registered MSI callback function.
struct ntb_ctx_ops
    Currently the db_event(void *ctx, int db_vector) callback is defined in ntb_ctx_ops.
    A new msi_event(void *ctxc, void *hdl) callback may be added to the context ops.

```
struct ntb_ctx_ops {
    void (*link_event)(void *ctx);
    void (*db_event)(void *ctx, int db_vector);
    void (*msg_event)(void *ctx);
    void (*msi_event)(void *ctx, void *hdl);
};
```

Transmitting Host Side—
int ntb_peer_msi_set(struct ntb_dev *ntb, void *hdl)
    The handle has been given to a peer client instance via the client's own back-channel. The peer client instance then sets the MSI which causes the peer NTB plug-in to use the information to create the complete MSI (BAR or ioremapped) address and send the synthesized interrupt.
int ntb_peer_msi_addr(struct ntb_dev *ntb, void *hdl, phys_addr_t *msi_addr, u32 *data)
    Returns the _iomem BAR physical address and the 32-bit data for the MSI associated with msi_handle. This can be used for iowrite32(data, addr) or the address can be ioremapped to a virtual address and used that way. May be used for, inter alia, the case where a synthesized MSI is sent by a DMA engine (see bottom of FIG. 7a).

What is claimed is:

1. Network apparatus for use in a multi-host device system, the network apparatus configured to perform at least one of base address register (BAR) space hiding or BAR space conservation in order to enable accommodation of a plurality of host devices which would otherwise exceed a BAR space capability of the multi-host device system without either of said space hiding or BAR space conservation, the network apparatus comprising a storage medium with at least one computer program configured to, when executed by a digital processing device, cause the network apparatus to:

allocate data fabric address spaces to base address registers (BARs) of the plurality of host devices, wherein at least a portion of the data fabric address spaces comprises a private space not visible to the plurality of host devices; and assign unique IDs to the plurality of host devices, wherein at least a portion of the unique IDs are multiplexed to a single private ID via at least utilization of at least a first portion and a second portion of a transaction layer packet (TLP) comprising the single private ID, the first portion of the TLP used to enable the multiplexing.

2. A network architecture for use with a plurality of host devices and a plurality of processors each comprising at least one respective root complex, the network architecture comprising:

non-transparent bridge (NTB) data fabric connected to the plurality of host devices, the NTB data fabric comprising a plurality of edge switches and IO (input/output) switches; and computerized logic configured to utilize a known topology of the NTB data fabric to statically define a single common virtual address map associated with a shared interrupt memory space, wherein the shared interrupt memory space comprises portions of host device memory that are exposed to each of the plurality of host devices connected to the NTB data fabric;

wherein a first of the plurality of host devices may communicate one or more interrupts with a target one of the plurality of host devices via the NTB data fabric via dynamic software-based allocation of said one or more interrupts, said dynamic software-based allocation being without (i) access of a configuration space associated with the target one of the plurality of host devices, and (ii) use of an enumerated device to perform the dynamic software-based allocation.

3. The network architecture of claim 2, wherein each of the plurality of processors is configured to define how the memory space is translated via a respective input/output memory management unit (IOMMU).

4. A network architecture for use with a plurality of host devices and a plurality of processors each comprising at least one respective root complex, the network architecture configured to enable symmetric peer-to-peer communication between each of the plurality of host devices, the network architecture comprising:

non-transparent bridge (NTB) data fabric connected to the plurality of host devices, the NTB data fabric comprising a plurality of edge switches and IO (input/output) switches and configured to utilize a PCIe protocol for address-based routing of interrupts without use of doorbell registers; and computerized logic configured to utilize a known topology of the NTB data fabric to statically define a single common virtual address map associated with a shared memory space, wherein the shared memory space comprises portions of host device memory that are exposed to each of the plurality of host devices connected to the NTB data fabric, thereby enabling said symmetric peer-to-peer communication between at least any two of the plurality of host devices.

5. The network architecture of claim 4, wherein the symmetric peer-to-peer communication comprises each of (i) response to a request; and (ii) initiation of an unsolicited request.

6. The network architecture of claim 4, wherein the shared memory space comprises a plurality of ranges corresponding to respective ones of the plurality of host devices, and wherein the plurality of ranges can be assigned dynamically.

7. A method for using non-transparent bridge (NTBs) entities for transmitting interrupt data across a managed data fabric connected to a plurality of physically distributed, enumerated devices in support of networking functionality, the method comprising:

defining a common message signaled interrupt space within the managed data fabric, wherein the plurality of physically distributed, enumerated devices comprises at least a plurality of network ports and wherein the common message signaled interrupt space is shared by at least a portion of the plurality of network ports;

defining at least one virtual message signaled interrupt; and transmitting at least one instance of the at least one virtual message signaled interrupt from a first network port to at least one second network port of the at least portion of the plurality of network ports;

wherein the defining the at least one virtual message signaled interrupt comprises defining the at least one virtual message signaled interrupt without an enumerated device requesting the at least one virtual message signaled interrupt.

\* \* \* \* \*